(12) United States Patent
Yang et al.

(10) Patent No.: US 12,299,859 B2
(45) Date of Patent: May 13, 2025

(54) IMAGE TRANSFORMATION METHOD AND APPARATUS

(71) Applicant: Huawei Technologies Co., Ltd., Shenzhen (CN)

(72) Inventors: Chen Yang, Shenzhen (CN); Xiaoe Wang, Shenzhen (CN); Tizheng Wang, Shenzhen (CN); Chen Su, Shenzhen (CN); Zhaolei Xiao, Shenzhen (CN); Jingduo Tian, Shenzhen (CN); Shisheng Zheng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 18/147,391

(22) Filed: Dec. 28, 2022

(65) Prior Publication Data
US 2023/0162332 A1 May 25, 2023

Related U.S. Application Data

(63) Continuation of application No. PCT/CN2021/102002, filed on Jun. 24, 2021.

(30) Foreign Application Priority Data

Jun. 28, 2020 (CN) .......................... 202010602154.3
Oct. 22, 2020 (CN) .......................... 202011141042.9

(51) Int. Cl.
*G06T 5/80* (2024.01)
*G06T 17/00* (2006.01)
(Continued)

(52) U.S. Cl.
CPC ................ *G06T 5/80* (2024.01); *G06T 17/00* (2013.01); *G06T 19/20* (2013.01); *H04N 23/632* (2023.01);
(Continued)

(58) Field of Classification Search
CPC .......... G06T 5/80; G06T 17/00; G06T 19/20; G06T 2200/24; G06T 2207/30201;
(Continued)

(56) References Cited

U.S. PATENT DOCUMENTS

2008/0239107 A1 10/2008 Cho
2018/0232192 A1* 8/2018 Timoner .................. G09G 5/12

FOREIGN PATENT DOCUMENTS

CN 104994367 A 10/2015
CN 105405104 A 3/2016
(Continued)

OTHER PUBLICATIONS

Ohad Fried, "Perspective-aware manipulation of portrait photos", Jul. 11, 2016, ACM Transactions on Graphics, vol. 35, No. 4, , pp. 1-10, XP055547789, ISSN: 0730-0301, DOI: 10.1145/2897824.2925933.*

(Continued)

*Primary Examiner* — Christopher K Peterson
(74) *Attorney, Agent, or Firm* — Conley Rose, P.C.

(57) ABSTRACT

An image transformation method includes obtaining a first image for a target scenario by using a front-facing camera, where the target scenario includes a face of a target person; obtaining a target distance between the face of the target person and the front-facing camera; and when the target distance is less than a preset threshold, performing first processing on the first image to obtain a second image. The first processing includes performing distortion correction on the first image based on the target distance. The face of the target person in the second image is closer to a real appearance of the face of the target person than the face of the target person in the first image.

20 Claims, 30 Drawing Sheets

(51) Int. Cl.
*G06T 19/20* (2011.01)
*H04N 23/63* (2023.01)

(52) U.S. Cl.
CPC .............................. *G06T 2200/24* (2013.01); *G06T 2207/30201* (2013.01); *G06T 2219/2004* (2013.01); *G06T 2219/2021* (2013.01)

(58) Field of Classification Search
CPC ..... G06T 2219/2004; G06T 2219/2021; G06T 3/18; G06T 2207/30244; G06T 3/04; H04N 23/632; G06V 20/70; G06V 40/16
See application file for complete search history.

(56) References Cited

FOREIGN PATENT DOCUMENTS

| CN | 107124543 A | 9/2017 |
|---|---|---|
| CN | 107480613 A | 12/2017 |
| CN | 110189269 A | 8/2019 |
| CN | 110232667 A | 9/2019 |
| CN | 110602401 A | 12/2019 |
| CN | 111049973 A | 4/2020 |

OTHER PUBLICATIONS

Horacio Hernan Moraldo, "Virtual Camera Image Processing", Technical Disclosure Commons, Defensive Publications Series, Mar. 30, 2020, 10 pages.

Ohad Fried, "Perspective-aware manipulation of portrait photos," ACM Transactions on Graphics, vol. 35, No. 4, Jul. 11, 2016, 10 pages, XP055547789.

Yichang Shih et al: "Distortion-free wide-angle portraits on camera phones", ACM Transactions on Graphics, ACM, NY, US, vol. 38, No. 4, Jul. 12, 2019 (Jul. 12, 2019), pp. 1-12, XP058439456, ISSN: 0730-0301, DOI: 10.1145/3306346.3322948, 5 pages.

Yu Jieun et al: "SelfID: How to make personal ID photo using selfie", 2018 International Conference on Electronics, Information, and Communication (ICEIC), Institute of Electronics and Information Engineers, Jan. 24, 2018 (Jan. 24, 2018), pp. 1-4, XP033343222, DOI: 10.23919/ELINFOCOM.2018.8330711, 4 pages.

Zhao Yajie et al: "Learning Perspective Undistortion of Portraits", 2019 IEEE/CVF International Conference on Computer Vision (ICCV), IEEE, Oct. 27, 2019 (Oct. 27, 2019), pp. 7848-7858, XP033723717, DOI: 10.1109/ICCV.2019.00794, 11 pages.

\* cited by examiner

IMAGE TRANSFORMATION METHOD AND APPARATUS

CROSS-REFERENCE TO RELATED APPLICATIONS

This application is a continuation of International Patent Application No. PCT/CN2021/102002, filed on Jun. 24, 2021, which claims priority to Chinese Patent Application No. 202011141042.9, filed on Oct. 22, 2020, and Chinese Patent Application No. 202010602154.3, filed on Jun. 28, 2020. All of the aforementioned patent applications are hereby incorporated by reference in their entireties.

TECHNICAL FIELD

The present disclosure relates to image processing technologies, and in particular, to an image transformation method and apparatus.

BACKGROUND

Photography has become an important means of recording daily life. In recent years, taking a "selfie" with a front-facing camera of a mobile phone has become more popular among people. However, because a distance between the camera and a face is short during selfie-taking, a perspective distortion problem that "the face looks big when near and small when in a distance" becomes increasingly prominent. For example, when a portrait is taken at a short distance, a nose is usually larger and the face is elongated due to different distances between the camera and different parts of the face. This affects subjective effect of the portrait. Therefore, image transformation processing needs to be performed, for example, transformation of a distance, a pose, a position, and the like of an object in an image, to eliminate perspective distortion effect that "the object looks big when near and small when in a distance" while ensuring that authenticity of the portrait is not affected, to improve aesthetics of the portrait.

In an imaging process of the camera, a two-dimensional image of a three-dimensional object is obtained, and a common image processing algorithm is used for the two-dimensional image. Consequently, it is difficult to achieve effect of real transformation of the three-dimensional object based on an image obtained after transformation of the two-dimensional image.

SUMMARY

This application provides an image transformation method and apparatus, to improve photographing and imaging effect in a selfie scenario.

According to a first aspect, the present disclosure provides an image transformation method, including: obtaining a first image for a target scenario by using a front-facing camera, where the target scenario includes a face of a target person; obtaining a target distance between the face of the target person and the front-facing camera; and when the target distance is less than a preset threshold, performing first processing on the first image to obtain a second image. The first processing includes performing distortion correction on the first image based on the target distance. The face of the target person in the second image is closer to a real appearance of the face of the target person than the face of the target person in the first image.

The first image is obtained by a front-facing camera of a terminal in a scenario in which a user takes a selfie. There are two cases for the first image. In a first case, when the user does not trigger a shutter, the first image has not been imaged on an image sensor, and is only an original image obtained by the camera. In the other case, when the user triggers a shutter, the first image is an original image that has been imaged on an image sensor. Therefore, there are two cases for the second image compared with the first image. Corresponding to the former case, the second image is a corrected image obtained by performing distortion correction based on the original image obtained by the camera, and the image is also not imaged on the image sensor, and is used only as a preview image for the user to view. Corresponding to the latter case, the second image is a corrected image obtained by performing distortion correction based on the original image that has been imaged on the image sensor, and the terminal may store the corrected image in a gallery.

In the present disclosure, three-dimensional transformation effect of an image is implemented by using a three-dimensional model, and perspective distortion correction is performed on a face of a target person in an image photographed at a short distance, so that relative proportions and relative positions of facial features of the corrected face of the target person are closer to relative proportions and relative positions of the facial features of the face of the target person. This can significantly improve photographing and imaging effect in a selfie scenario.

In a possible implementation, the target distance includes a distance between a most front part on the face of the target person and the front-facing camera, or a distance between a specified part on the face of the target person and the front-facing camera, or a distance between a central position on the face of the target person and the front-facing camera.

The target distance between the face of the target person and the camera may be a distance between the most front part (for example, a nose) on the face of the target person and the camera. Alternatively, the target distance between the face of the target person and the camera may be a distance between the specified part (for example, an eye, a mouth, or a nose) on the face of the target person and the camera. Alternatively, the target distance between the face of the target person and the camera may be a distance between the central position (for example, a nose on a front photo of the target person, or a cheekbone position on a side photo of the target person) on the face of the target person and the camera. It should be noted that the target distance may be defined depending on a specific situation of the first image. This is not specifically limited in the present disclosure.

In a possible implementation, the obtaining a target distance between the face of the target person and the front-facing camera includes obtaining a screen-to-body ratio of the face of the target person in the first image; and obtaining the target distance based on the screen-to-body ratio and a field of view (FOV) of the front-facing camera.

In a possible implementation, the obtaining a target distance between the face of the target person and the front-facing camera includes obtaining the target distance by using a distance sensor. The distance sensor includes a time-of-flight (TOF) ranging sensor, a structured light sensor, or a binocular sensor.

In the present disclosure, the target distance may be obtained by calculating the screen-to-body ratio of the face, to be specific, the screen-to-body ratio (a ratio of a pixel area of the face to a pixel area of the first image) of the face of the target person in the first image is first obtained, and then the target distance is obtained based on the screen-to-body ratio and the FOV of the front-facing camera. Alternatively, the foregoing target distance may be obtained through measurement by using the distance sensor. Alternatively, the target distance may be obtained in another manner. This is not specifically limited in the present disclosure.

In a possible implementation, the preset threshold is less than 80 centimeters (cm).

In a possible implementation, the preset threshold is 50 cm.

In the present disclosure, a threshold is set. It is considered that when the target distance between the face of the target person and the front-facing camera is less than the threshold, the obtained first image including the face of the target person is distorted, and distortion correction needs to be performed on the first image. A value range of the preset threshold is within 80 cm. Optionally, the preset threshold may be set to 50 cm. It should be noted that a specific value of the preset threshold may be determined based on performance of the front-facing camera, photographing illumination, and the like. This is not specifically limited in the present disclosure.

In a possible implementation, the second image includes a preview image or an image obtained after the shutter is triggered.

The second image may be a preview image obtained by the front-facing camera. To be specific, before the shutter is triggered, the front-facing camera may obtain the first image facing a target scenario region, the terminal obtains the second image after performing perspective distortion correction on the first image by using the foregoing method, and the second image is displayed on a screen of the terminal. In this case, the second image viewed by the user is the preview image on which perspective distortion correction has been performed. Alternatively, the second image may be an image obtained after the shutter is triggered. To be specific, after the shutter is triggered, the first image is an image formed on the image sensor of the terminal, the terminal obtains the second image after performing perspective distortion correction on the first image by using the foregoing method, and the second image is stored and displayed on a screen of the terminal. In this case, the second image viewed by the user is an image that has been stored in the gallery and on which perspective distortion correction has been performed.

In a possible implementation, that the face of the target person in the second image is closer to the real appearance of the face of the target person than the face of the target person in the first image includes: relative proportions of facial features of the target person in the second image are closer to relative proportions of the facial features of the face of the target person than relative proportions of the facial features of the target person in the first image; and/or relative positions of the facial features of the target person in the second image are closer to relative positions of the facial features of the face of the target person than relative positions of the facial features of the target person in the first image.

When the first image is obtained, the target distance between the face of the target person and the front-facing camera is less than the preset threshold. It is very likely that the facial features of the face of the target person in the first image change in size, stretch, and the like due to a perspective distortion problem of the front-facing camera that "the face looks big when near and small when in a distance", the relative proportions and relative positions of the facial features of the target person deviate from relative proportions and relative positions of the real appearance of the face of the target person. In the second image obtained by performing perspective distortion correction on the first image, a case in which the facial features of the face of the target person change in size, stretch, and the like can be eliminated. Therefore, the relative proportions and the relative positions of the facial features of the face of the target person in the second image are close to or even restored to the relative proportions and the relative positions of the real appearance of the face of the target person.

In a possible implementation, the performing distortion correction on the first image based on the target distance includes: fitting the face of the target person in the first image and a standard face model based on the target distance to obtain depth information of the face of the target person; and performing perspective distortion correction on the first image based on the depth information to obtain the second image.

In a possible implementation, the performing perspective distortion correction on the first image based on the depth information to obtain the second image includes: establishing a first three-dimensional model of the face of the target person; transforming a pose and/or a shape of the first three-dimensional model to obtain a second three-dimensional model of the face of the target person; obtaining a pixel displacement vector field of the face of the target person based on the depth information, the first three-dimensional model, and the second three-dimensional model; and obtaining the second image based on the pixel displacement vector field of the face of the target person.

The three-dimensional model is established based on the face of the target person, and then the three-dimensional transformation effect of the image is implemented by using the three-dimensional model. The pixel displacement vector field of the face of the target person is obtained based on association between sampling points of the three-dimensional model before transformation and the three-dimensional model after transformation, to obtain a transformed two-dimensional image, and perspective distortion correction may be performed on the face of the target person in the image photographed at a short distance, so that the relative proportions and relative positions of the facial features of the corrected face of the target person are closer to the relative proportions and relative positions of the facial features of the face of the target person. This can significantly improve the photographing and imaging effect in the selfie scenario.

In a possible implementation, the obtaining a pixel displacement vector field of the face of the target person based on the depth information, the first three-dimensional model, and the second three-dimensional model includes: performing perspective projection on the first three-dimensional model based on the depth information to obtain a first coordinate set, where the first coordinate set includes coordinate values corresponding to a plurality of pixels in the first three-dimensional model; performing perspective projection on the second three-dimensional model based on the depth information to obtain a second coordinate set, where the second coordinate set includes coordinate values corresponding to a plurality of pixels in the second three-dimensional model; and calculating a coordinate difference between a first coordinate value and a second coordinate value to obtain the pixel displacement vector field of the face of the target person. The first coordinate value includes a coordinate value that is in the first coordinate set and that corresponds to a first pixel. The second coordinate value includes a coordinate value that is in the second coordinate set and that corresponds to the first pixel. The first pixel includes any one of a plurality of same pixels included in the first three-dimensional model and the second three-dimensional model.

According to a second aspect, the present disclosure provides an image transformation method, including: obtaining a first image, where the first image includes a face of a target person, and the face of the target person in the first image is distorted; displaying a distortion correction function menu; obtaining a transformation parameter entered by a user on the distortion correction function menu, where the transformation parameter includes at least an equivalent simulation photographing distance, and the equivalent simulation photographing distance is used to simulate a distance between the face of the target person and a camera when a photographing terminal photographs the face of the target person; and performing first processing on the first image to obtain a second image. The first processing includes performing distortion correction on the first image based on the transformation parameter. The face of the target person in the second image is closer to a real appearance of the face of the target person than the face of the target person in the first image.

In the present disclosure, perspective distortion correction is performed on the first image based on the transformation parameter to obtain the second image. The face of the target person in the second image is closer to the real appearance of the face of the target person than the face of the target person in the first image, to be specific, relative proportions and relative positions of facial features of the target person in the second image are closer to relative proportions and relative positions of the facial features of the face of the target person than relative proportions and the relative positions of the facial features of the target person in the first image.

In a possible implementation, the reason that the face of the target person in the first image is distorted is that: when a second terminal photographs the first image, a target distance between the face of the target person and the second terminal is less than a first preset threshold. The target distance includes a distance between a most front part on the face of the target person and the front-facing camera, or a distance between a specified part on the face of the target person and the front-facing camera, or a distance between a central position on the face of the target person and the front-facing camera.

In a possible implementation, the target distance is obtained based on a screen-to-body ratio of the face of the target person in the first image and an FOV of a camera of the second terminal. Alternatively, the target distance is obtained based on an equivalent focal length in exchangeable image file format (EXIF) information of the first image.

In a possible implementation, the distortion correction function menu includes an option for adjusting an equivalent simulation photographing distance. The obtaining a transformation parameter entered by a user on the distortion correction function menu includes obtaining the equivalent simulation photographing distance based on an instruction triggered by an operation performed by the user on a control or a slider in the option for adjusting an equivalent simulation photographing distance.

In a possible implementation, when the distortion correction function menu is initially displayed, a value of the equivalent simulation photographing distance in the option for adjusting an equivalent simulation photographing distance includes a default value or a pre-calculated value.

In a possible implementation, before the displaying a distortion correction function menu, the method further includes displaying a pop-up window when the face of the target person is distorted, where the pop-up window is used to provide a control for selecting whether to perform distortion correction; and responding to, when the user taps a distortion correction control in the pop-up window, an instruction generated by a user operation.

In a possible implementation, before the displaying a distortion correction function menu, the method further includes displaying a distortion correction control when the face of the target person is distorted, where the distortion correction control is used to open the distortion correction function menu; and responding to, when the user taps the distortion correction control, an instruction generated by a user operation.

In a possible implementation, the reason that the face of the target person in the first image is distorted is that: when the second terminal photographs the first image, the FOV of the camera is greater than a second preset threshold and a pixel distance between the face of the target person and an edge of the FOV is less than a third preset threshold. The pixel distance includes a quantity of pixels between the most front part on the face of the target person and the edge of the FOV, or a quantity of pixels between the specified part on the face of the target person and the edge of the FOV, or a quantity of pixels between the central position on the face of the target person and the edge of the FOV.

In a possible implementation, the FOV is obtained based on the EXIF information of the first image.

In a possible implementation, the second preset threshold is 90°, and the third preset threshold is a quarter of a length or a width of the first image.

In a possible implementation, the distortion correction function menu includes a displacement distance adjustment option. The obtaining a transformation parameter entered by a user on the distortion correction function menu includes obtaining an adjustment direction and a displacement distance based on an instruction triggered by an operation performed by the user on a control or a slider in the displacement distance adjustment option.

In a possible implementation, the distortion correction function menu includes an option for adjusting relative positions and/or relative proportions of facial features; and the obtaining a transformation parameter entered by a user on the distortion correction function menu includes: obtaining an adjustment direction, a displacement distance, and/or facial dimensions based on an instruction triggered by an operation performed by the user on a control or a slider in the option for adjusting relative positions and/or relative proportions of facial features.

In a possible implementation, the distortion correction function menu includes an angle adjustment option. The obtaining a transformation parameter entered by a user on the distortion correction function menu includes obtaining an adjustment direction and an adjustment angle based on an instruction triggered by an operation performed by the user on a control or a slider in the angle adjustment option. Alternatively, the distortion correction function menu includes an expression adjustment option. The obtaining a transformation parameter entered by a user on the distortion correction function menu includes obtaining a new expression template based on an instruction triggered by an operation performed by the user on a control or a slider in the expression adjustment option. Alternatively, the distortion correction function menu includes an action adjustment option. The obtaining a transformation parameter entered by a user on the distortion correction function menu includes obtaining a new action template based on an instruction triggered by an operation performed by the user on a control or a slider in the action adjustment option.

In a possible implementation, that the face of the target person in the second image is closer to the real appearance of the face of the target person than the face of the target person in the first image includes: relative proportions of facial features of the target person in the second image are closer to relative proportions of the facial features of the face of the target person than relative proportions of the facial features of the target person in the first image; and/or relative positions of the facial features of the target person in the second image are closer to relative positions of the facial features of the face of the target person than relative positions of the facial features of the target person in the first image.

In a possible implementation, the performing distortion correction on the first image based on the transformation parameter includes: fitting the face of the target person in the first image and a standard face model based on the target distance to obtain depth information of the face of the target person; and performing perspective distortion correction on the first image based on the depth information and the transformation parameter to obtain the second image.

In a possible implementation, the performing perspective distortion correction on the first image based on the depth information and the transformation parameter to obtain the second image includes: establishing a first three-dimensional model of the face of the target person; transforming a pose and/or a shape of the first three-dimensional model based on the transformation parameter to obtain a second three-dimensional model of the face of the target person; obtaining a pixel displacement vector field of the face of the target person based on the depth information, the first three-dimensional model, and the second three-dimensional model; and obtaining the second image based on the pixel displacement vector field of the face of the target person.

In a possible implementation, the obtaining a pixel displacement vector field of the face of the target person based on the depth information, the first three-dimensional model, and the second three-dimensional model includes: performing perspective projection on the first three-dimensional model based on the depth information to obtain a first coordinate set, where the first coordinate set includes coordinate values corresponding to a plurality of pixels in the first three-dimensional model; performing perspective projection on the second three-dimensional model based on the depth information to obtain a second coordinate set, where the second coordinate set includes coordinate values corresponding to a plurality of pixels in the second three-dimensional model; and calculating a coordinate difference between a first coordinate value and a second coordinate value to obtain the pixel displacement vector field of the face of the target person. The first coordinate value includes a coordinate value that is in the first coordinate set and that corresponds to a first pixel. The second coordinate value includes a coordinate value that is in the second coordinate set and that corresponds to the first pixel. The first pixel includes any one of a plurality of same pixels included in the first three-dimensional model and the second three-dimensional model.

According to a third aspect, the present disclosure provides an image transformation method. The method is applied to a first terminal. The method includes: obtaining a first image, where the first image includes a face of a target person, and the face of the target person in the first image is distorted; displaying a distortion correction function menu on a screen, where the distortion correction function menu includes one or more sliders and/or one or more controls; receiving a distortion correction instruction, where the distortion correction instruction includes a transformation parameter generated when a user performs a touch operation on the one or more sliders and/or the one or more controls, the transformation parameter includes at least an equivalent simulation photographing distance, and the equivalent simulation photographing distance is used to simulate a distance between the face of the target person and a camera when a photographing terminal photographs the face of the target person; and performing first processing on the first image based on the transformation parameter to obtain a second image. The first processing includes performing distortion correction on the first image. The face of the target person in the second image is closer to a real appearance of the face of the target person than the face of the target person in the first image.

According to a fourth aspect, the present disclosure provides an image transformation apparatus, including: an obtaining module configured to: obtain a first image for a target scenario by using a front-facing camera, where the target scenario includes a face of a target person, and obtain a target distance between the face of the target person and the front-facing camera; and a processing module configured to: when the target distance is less than a preset threshold, perform first processing on the first image to obtain a second image. The first processing includes performing distortion correction on the first image based on the target distance. The face of the target person in the second image is closer to a real appearance of the face of the target person than the face of the target person in the first image.

In a possible implementation, the target distance includes a distance between a most front part on the face of the target person and the front-facing camera, or a distance between a specified part on the face of the target person and the front-facing camera, or a distance between a central position on the face of the target person and the front-facing camera.

In a possible implementation, the obtaining module is further configured to obtain a screen-to-body ratio of the face of the target person in the first image, and obtain the target distance based on the screen-to-body ratio and a FOV of the front-facing camera.

In a possible implementation, the obtaining module is further configured to obtain the target distance by using a distance sensor. The distance sensor includes a TOF ranging sensor, a structured light sensor, or a binocular sensor.

In a possible implementation, the preset threshold is less than 80 cm.

In a possible implementation, the second image includes a preview image or an image obtained after a shutter is triggered.

In a possible implementation, that the face of the target person in the second image is closer to the real appearance of the face of the target person than the face of the target person in the first image includes: relative proportions of facial features of the target person in the second image are closer to relative proportions of the facial features of the face of the target person than relative proportions of the facial features of the target person in the first image; and/or relative positions of the facial features of the target person in the second image are closer to relative positions of the facial features of the face of the target person than relative positions of the facial features of the target person in the first image.

In a possible implementation, the processing module is further configured to fit the face of the target person in the first image and a standard face model based on the target distance to obtain depth information of the face of the target person, and perform perspective distortion correction on the first image based on the depth information to obtain the second image.

In a possible implementation, the processing module is further configured to establish a first three-dimensional model of the face of the target person, transform a pose and/or a shape of the first three-dimensional model to obtain a second three-dimensional model of the face of the target person, obtain a pixel displacement vector field of the face of the target person based on the depth information, the first three-dimensional model, and the second three-dimensional model, and obtain the second image based on the pixel displacement vector field of the face of the target person.

In a possible implementation, the processing module is further configured to perform perspective projection on the first three-dimensional model based on the depth information to obtain a first coordinate set, where the first coordinate set includes coordinate values corresponding to a plurality of pixels in the first three-dimensional model; perform perspective projection on the second three-dimensional model based on the depth information to obtain a second coordinate set, where the second coordinate set includes coordinate values corresponding to a plurality of pixels in the second three-dimensional model; and calculate a coordinate difference between a first coordinate value and a second coordinate value to obtain the pixel displacement vector field of the face of the target person. The first coordinate value includes a coordinate value that is in the first coordinate set and that corresponds to a first pixel. The second coordinate value includes a coordinate value that is in the second coordinate set and that corresponds to the first pixel. The first pixel includes any one of a plurality of same pixels included in the first three-dimensional model and the second three-dimensional model.

According to a fifth aspect, the present disclosure provides an image transformation apparatus, including: an obtaining module configured to obtain a first image, where the first image includes a face of a target person, and the face of the target person in the first image is distorted; a display module configured to: display a distortion correction function menu, where the obtaining module is further configured to obtain a transformation parameter entered by a user on the distortion correction function menu, the transformation parameter includes at least an equivalent simulation photographing distance, and the equivalent simulation photographing distance is used to simulate a distance between the face of the target person and a camera when a photographing terminal photographs the face of the target person; and a processing module configured to perform first processing on the first image to obtain a second image. The first processing includes performing distortion correction on the first image based on the transformation parameter. The face of the target person in the second image is closer to a real appearance of the face of the target person than the face of the target person in the first image.

In a possible implementation, the reason that the face of the target person in the first image is distorted is that: when a second terminal photographs the first image, a target distance between the face of the target person and the second terminal is less than a first preset threshold. The target distance includes a distance between a most front part on the face of the target person and the front-facing camera, or a distance between a specified part on the face of the target person and the front-facing camera, or a distance between a central position on the face of the target person and the front-facing camera.

In a possible implementation, the target distance is obtained based on a screen-to-body ratio of the face of the target person in the first image and an FOV of a camera of the second terminal. Alternatively, the target distance is obtained based on an equivalent focal length in EXIF information of the first image.

In a possible implementation, the distortion correction function menu includes an option for adjusting an equivalent simulation photographing distance. The obtaining module is further configured to obtain the equivalent simulation photographing distance based on an instruction triggered by an operation performed by the user on a control or a slider in the option for adjusting an equivalent simulation photographing distance.

In a possible implementation, when the distortion correction function menu is initially displayed, a value of the equivalent simulation photographing distance in the option for adjusting an equivalent simulation photographing distance includes a default value or a pre-calculated value.

In a possible implementation, the display module is further configured to: display a pop-up window when the face of the target person is distorted, where the pop-up window is used to provide a control for selecting whether to perform distortion correction; and when the user taps a distortion correction control in the pop-up window, respond to an instruction generated by a user operation.

In a possible implementation, the display module is further configured to: display a distortion correction control when the face of the target person is distorted, where the distortion correction control is used to open the distortion correction function menu; and when the user taps the distortion correction control, respond to an instruction generated by a user operation.

In a possible implementation, the reason that the face of the target person in the first image is distorted is that: when the second terminal photographs the first image, the FOV of the camera is greater than a second preset threshold and a pixel distance between the face of the target person and an edge of the FOV is less than a third preset threshold. The pixel distance includes a quantity of pixels between the most front part on the face of the target person and the edge of the FOV, or a quantity of pixels between the specified part on the face of the target person and the edge of the FOV, or a quantity of pixels between the central position on the face of the target person and the edge of the FOV.

In a possible implementation, the FOV is obtained based on the EXIF information of the first image.

In a possible implementation, the second preset threshold is 90°, and the third preset threshold is a quarter of a length or a width of the first image.

In a possible implementation, the distortion correction function menu includes a displacement distance adjustment option. The obtaining module is further configured to obtain an adjustment direction and a displacement distance based on an instruction triggered by an operation performed by the user on a control or a slider in the displacement distance adjustment option.

In a possible implementation, the distortion correction function menu includes an option for adjusting relative positions and/or relative proportions of facial features. The obtaining module is further configured to obtain an adjustment direction, a displacement distance, and/or facial dimensions based on an instruction triggered by an operation performed by the user on a control or a slider in the option for adjusting relative positions and/or relative proportions of facial features.

In a possible implementation, the distortion correction function menu includes an angle adjustment option. The obtaining module is further configured to obtain an adjustment direction and an adjustment angle based on an instruction triggered by an operation performed by the user on a control or a slider in the angle adjustment option. Alternatively, the distortion correction function menu includes an expression adjustment option. The obtaining module is further configured to obtain a new expression template based on an instruction triggered by an operation performed by the user on a control or a slider in the expression adjustment option. Alternatively, the distortion correction function menu includes an action adjustment option. The obtaining module is further configured to obtain a new action template based on an instruction triggered by an operation performed by the user on a control or a slider in the action adjustment option.

In a possible implementation, that the face of the target person in the second image is closer to the real appearance of the face of the target person than the face of the target person in the first image includes: relative proportions of facial features of the target person in the second image are closer to relative proportions of the facial features of the face of the target person than relative proportions of the facial features of the target person in the first image; and/or relative positions of the facial features of the target person in the second image are closer to relative positions of the facial features of the face of the target person than relative positions of the facial features of the target person in the first image.

In a possible implementation, the processing module is further configured to fit the face of the target person in the first image and a standard face model based on the target distance to obtain depth information of the face of the target person, and perform perspective distortion correction on the first image based on the depth information and the transformation parameter to obtain the second image.

In a possible implementation, the processing module is further configured to establish a first three-dimensional model of the face of the target person; transform a pose and/or a shape of the first three-dimensional model based on the transformation parameter to obtain a second three-dimensional model of the face of the target person; obtain a pixel displacement vector field of the face of the target person based on the depth information, the first three-dimensional model, and the second three-dimensional model; and obtain the second image based on the pixel displacement vector field of the face of the target person.

In a possible implementation, the processing module is further configured to perform perspective projection on the first three-dimensional model based on the depth information to obtain a first coordinate set, where the first coordinate set includes coordinate values corresponding to a plurality of pixels in the first three-dimensional model; perform perspective projection on the second three-dimensional model based on the depth information to obtain a second coordinate set, where the second coordinate set includes coordinate values corresponding to a plurality of pixels in the second three-dimensional model; and calculate a coordinate difference between a first coordinate value and a second coordinate value to obtain the pixel displacement vector field of the face of the target person. The first coordinate value includes a coordinate value that is in the first coordinate set and that corresponds to a first pixel. The second coordinate value includes a coordinate value that is in the second coordinate set and that corresponds to the first pixel. The first pixel includes any one of a plurality of same pixels included in the first three-dimensional model and the second three-dimensional model.

In a possible implementation, the apparatus further includes a recording module. The obtaining module is further configured to obtain a recording instruction based on a triggering operation performed by the user on a recording control. The recording module is configured to start, based on the recording instruction, recording of a process of obtaining the second image until a recording stop instruction generated by a triggering operation performed by the user on a recording stop control is received.

According to a sixth aspect, the present disclosure provides an image transformation apparatus, including: an obtaining module configured to obtain a first image, where the first image includes a face of a target person, and the face of the target person in the first image is distorted; a display module configured to: display a distortion correction function menu on a screen, where the distortion correction function menu includes one or more sliders and/or one or more controls; and receive a distortion correction instruction, where the distortion correction instruction includes a transformation parameter generated when a user performs a touch operation on the one or more sliders and/or the one or more controls, the transformation parameter includes at least an equivalent simulation photographing distance, and the equivalent simulation photographing distance is used to simulate a distance between the face of the target person and a camera when a photographing terminal photographs the face of the target person; and a processing module configured to perform first processing on the first image based on the transformation parameter to obtain a second image. The first processing includes performing distortion correction on the first image. The face of the target person in the second image is closer to a real appearance of the face of the target person than the face of the target person in the first image.

According to a seventh aspect, the present disclosure provides a device. The device includes one or more processors; and a memory configured to store one or more programs. When the one or more programs are executed by the one or more processors, the one or more processors are enabled to implement the method according to any one of the first aspect to the third aspect.

According to an eighth aspect, the present disclosure provides a computer-readable storage medium including a computer program. When the computer program is executed on a computer, the computer is enabled to perform the method according to any one of the first aspect to the third aspect.

According to a ninth aspect, the present disclosure further provides a computer program product, where the computer program product includes computer program code. When the computer program code is run on a computer, the computer is enabled to perform the method according to any one of the first aspect to the third aspect.

According to a tenth aspect, the present disclosure further provides an image processing method. The method includes obtaining a first image, where the first image includes a face of a target person, and the face of the target person in the first image is distorted; obtaining a target distance, where the target distance is used to represent a distance between the face of the target person and a photographing terminal when the first image is photographed; and performing first processing on the first image to obtain a second image. The first processing includes performing distortion correction on the face of the target person in the first image based on the target distance. The face of the target person in the second image is closer to a real appearance of the face of the target person than the face of the target person in the first image.

According to an eleventh aspect, the present disclosure further provides an image processing apparatus. The apparatus includes an obtaining module configured to obtain a first image, where the first image includes a face of a target person, and the face of the target person in the first image is distorted; and further configured to obtain a target distance, where the target distance is used to represent a distance between the face of the target person and a photographing terminal when the first image is photographed; and a processing module configured to perform first processing on the face of the target person in the first image to obtain a second image. The first processing includes performing distortion correction on the first image based on the target distance. The face of the target person in the second image is closer to a real appearance of the face of the target person than the face of the target person in the first image.

According to the tenth aspect or the eleventh aspect, in a possible design, the foregoing method or apparatus may be applied to a first terminal. If the first terminal photographs the first image in real time, the target distance may be understood as a distance between the first terminal and the target person, that is, a photographing distance between the first terminal and the target person. If the first image is an invoked historical image, the target distance may be understood as a distance between a second terminal and the target person in the first image when the second terminal photographs the first image. It should be understood that the first terminal and the second terminal may be a same terminal or different terminals.

According to the tenth aspect or the eleventh aspect, in a possible design, the first processing may further include more existing color processing methods or image processing methods, for example, conventional image signal processor (ISP) processing or specific filter processing.

According to the tenth aspect or the eleventh aspect, in a possible design, before the performing first processing on the first image to obtain a second image, the method further includes: determining that one or more of the following conditions are met:

Condition 1: In the first image, integrity of the face of the target person is greater than a preset integrity threshold. Alternatively, it is determined that facial features of the face of the target person are complete, that is, the terminal can identify a face scenario in which distortion correction can be performed.

Condition 2: A pitch angle at which the face of the target person deviates from a frontal face is within a first angle range, and a yaw angle at which the face of the target person deviates from the frontal face is within a second angle range. For example, the first angle range is [−30 degrees (°), 30°], and the second angle range is [−30°, 30°]. That is, a face image on which distortion correction is performed needs to be as close as possible to the frontal face.

Condition 3: Face detection is performed in a current photographing scenario. Only one valid face is detected, and the valid face is the face of the target person. That is, distortion correction may be performed for only one person subject.

Condition 4: It is determined that the target distance is less than or equal to a preset distortion photographing distance. The photographing distance is usually an important element for generating person distortion. For example, the distortion photographing distance is not greater than 60 cm, for example, 60 cm or 50 cm.

Condition 5: It is determined that a camera currently being enabled by the terminal is a front-facing camera. The front-facing camera is configured to capture the first image. Front-facing photographing is also an important cause for person distortion.

Condition 6: A current photographing mode of the terminal is a preset photographing mode, for example, a portrait photographing mode, a default photographing mode, or another specific photographing mode; or a distortion correction function is enabled; or the terminal enables a distortion correction function.

It should be understood that meeting of one or more of the foregoing conditions may be used as a determining condition for triggering distortion correction. If some conditions are not met, distortion correction may not be triggered. The foregoing conditions and free combination manners are various, which are not exhaustively described in the present disclosure, and may be flexibly defined based on an actual design requirement. Other possible free combination manners also fall within the protection scope of the present disclosure. Correspondingly, the apparatus further includes a determining module configured to determine whether the foregoing condition is met.

According to the tenth aspect or the eleventh aspect, in a possible design, the obtaining a first image includes: capturing a frame of image for a target scenario by using a camera, and obtaining the first image based on the frame of image; or capturing a plurality of frames of images for a target scenario by using a camera, and synthesizing the plurality of frames of images into the first image; or invoking the first image from images stored locally or on a cloud. The camera may be of the first terminal. In addition, the camera may be a front-facing camera or a rear-facing camera. Optionally, when the first terminal captures the first image, a photographing mode may be preset to a preset photographing mode or a distortion correction function may be enabled. Correspondingly, the method may be specifically performed by the obtaining module.

According to the tenth aspect or the eleventh aspect, in a possible design, the distance between the face of the target person and the photographing terminal is: a distance between the photographing terminal and a most front part, a central position, an eyebrow, an eye, a nose, a mouth, or an ear on the face of the target person. The obtaining a target distance includes obtaining a screen-to-body ratio of the face of the target person in the first image; and obtaining the target distance based on the screen-to-body ratio and a FOV of the first image; or obtaining the target distance based on EXIF information of the first image; or obtaining the target distance by using a distance sensor. The distance sensor includes a TOF ranging sensor, a structured light sensor, or a binocular sensor. Correspondingly, the method may be specifically performed by the obtaining module.

According to the tenth aspect or the eleventh aspect, in a possible design, the performing distortion correction on the first image based on the target distance includes: obtaining a correction distance, where, for a same target distance, a larger value of the correction distance indicates a greater distortion correction degree; obtaining a region of interest, where the region of interest includes at least one region of the eyebrow, the eye, the nose, the mouth, or the ear; and performing distortion correction on the first image based on the target distance, the region of interest, and the correction distance. Correspondingly, the method may be specifically performed by the processing module.

According to the tenth aspect or the eleventh aspect, in a possible design, the obtaining a correction distance includes:

obtaining, based on a correspondence between a preset photographing distance and the correction distance, the correction distance corresponding to the target distance. Correspondingly, the method may be specifically performed by the processing module.

According to the tenth aspect or the eleventh aspect, in a possible design, the obtaining a correction distance includes: displaying a distortion correction function menu; and receiving a control adjustment instruction entered by a user on the distortion correction function menu. The control adjustment instruction determines the correction distance. The displaying a distortion correction function menu includes displaying a distortion correction control, where the distortion correction control is used to open the distortion correction function menu; and displaying the distortion correction function menu in response to enabling of the distortion correction control by the user. The distortion correction function menu includes a control for determining the correction distance, and/or a control for selecting the region of interest, and/or a control for adjusting an expression, and/or a control for adjusting a posture, and may be one or a combination of a plurality of the controls. This is not enumerated one by one herein. All other possible manners shall fall within the protection scope of the present disclosure. Correspondingly, a display manner and an operation manner may be performed by a display module included in the apparatus.

According to the tenth aspect or the eleventh aspect, in a possible design, the performing distortion correction on the first image based on the target distance and the correction distance includes fitting the face of the target person in the first image and a standard face model based on the target distance to obtain a first three-dimensional model, where the first three-dimensional model is a three-dimensional model corresponding to the face of the target person; performing coordinate transformation on the first three-dimensional model based on the correction distance to obtain a second three-dimensional model; performing perspective projection on the first three-dimensional model based on a coordinate system of the first image to obtain a first group of projected points; performing perspective projection on the second three-dimensional model based on the coordinate system of the first image to obtain a second group of projected points; obtaining a displacement vector, where the displacement vector is obtained by aligning the first group of projected points with the second group of projected points; and transforming the first image based on the displacement vector to obtain the second image. Correspondingly, the method may be specifically performed by the processing module.

According to the tenth aspect or the eleventh aspect, in a possible design, the performing distortion correction on the first image based on the target distance, the region of interest, and the correction distance includes fitting the face of the target person in the first image and a standard face model based on the target distance to obtain a first three-dimensional model, where the first three-dimensional model is a three-dimensional model corresponding to the face of the target person; performing coordinate transformation on the first three-dimensional model based on the correction distance to obtain a second three-dimensional model; performing perspective projection on a model region that is in the first three-dimensional model and that corresponds to the region of interest, to obtain a first group of projected points; performing perspective projection on a model region that is in the second three-dimensional model and that corresponds to the region of interest, to obtain a second group of projected points; obtaining a displacement vector, where the displacement vector is obtained by aligning the first group of projected points with the second group of projected points; and transforming the first image based on the displacement vector to obtain the second image. Correspondingly, the method may be specifically performed by the processing module.

According to the tenth aspect or the eleventh aspect, in a possible design, when the target distance is within a first preset distance range, a smaller target distance indicates a greater distortion correction strength. The first preset distance range is less than or equal to the preset distortion photographing distance. A larger angle at which the face of the target person deviates from the frontal face indicates a smaller distortion correction strength.

According to a twelfth aspect, the present disclosure further provides a terminal device. The terminal device includes a memory, a processor, and a bus. The memory and the processor are connected through the bus. The memory is configured to store a computer program and instructions. The processor is configured to invoke the computer program and the instructions stored in the memory, so that the terminal device performs the method according to any one of the foregoing possible designs.

The present disclosure provides a plurality of flexible processing scenarios and concepts for distortion correction, so that a user can quickly implement face distortion correction when photographing in real time and browsing a gallery. It also provides the user with a plurality of independent choices, fresh interfaces, and play methods to improve user experience. Optional implementations in the present disclosure may be freely combined and changed without violating the laws of nature, which shall fall within the protection scope of the present disclosure.

DESCRIPTION OF EMBODIMENTS

To make the objectives, technical solutions, and advantages of the present disclosure clearer, the following clearly describes the technical solutions in the present disclosure with reference to the accompanying drawings in the present disclosure. Obviously, the described embodiments are some but not all of embodiments of the present disclosure. All other embodiments obtained by a person of ordinary skill in the art based on embodiments of the present disclosure without creative efforts shall fall within the protection scope of the present disclosure.

In the specification, embodiments, claims, and accompanying drawings of the present disclosure, terms "first", "second", and the like are merely intended for distinguishing and description, and shall not be understood as an indication or implication of relative importance or an indication or implication of an order. In addition, the terms "include", "have", or any other variant thereof are intended to cover a non-exclusive inclusion, for example, a series of steps or units. Methods, systems, products, or devices are not necessarily limited to those steps or units that are literally listed, but may include other steps or units that are not literally listed or that are inherent to such processes, methods, products, or devices.

It should be understood that in the present disclosure, "at least one piece (item)" refers to one or more and "a plurality of" refers to two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, "a and b", "a and c", "b and c", or "a, b, and c", where a, b, and c may be singular or plural.

This application provides an image transformation method, so that a transformed image, especially a target object in the image, implements real transformation effect in three-dimensional space.

Figure 1:
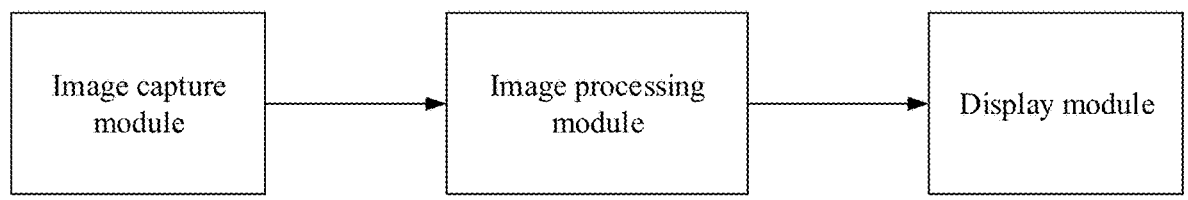
FIG. 1 is a schematic diagram of an example of an application architecture to which an image transformation method is applicable according to an embodiment of the present disclosure.

FIG. 1 is a schematic diagram of an example of an application architecture to which an image transformation method is applicable according to the present disclosure. As shown in FIG. 1, the architecture includes: an image capture module, an image processing module, and a display module. The image capture module is configured to photograph or obtain a to-be-processed image. The image capture module may be, for example, a device such as a camera or a video camera. The image processing module is configured to perform transformation processing on the to-be-processed image to implement distortion correction. The image processing module may be any device having an image processing capability, for example, a terminal or an image server, or may be any chip having an image processing capability, for example, a graphics processing unit (GPU) chip. The display module is configured to display an image. The display module may be, for example, a display, a screen of the terminal, a television set, or a projector.

In the present disclosure, all the image capture module, the image processing module, and the display module may be integrated into a same device. In this case, a processor of the device is used as a control module to control the image capture module, the image processing module, and the display module to perform respective functions. The image capture module, the image processing module, and the display module may alternatively be independent devices. For example, the image capture module uses a device such as a camera or a video camera, and the image processing module and the display module are integrated into one device. In this case, a processor of the integrated device is used as a control module to control the image processing module and the display module to perform respective functions. The integrated device may further have a wireless or wired transmission capability, to receive a to-be-processed image from the image capture module. The integrated device may be further provided with an input interface, to obtain the to-be-processed image through the input interface. For another example, the image capture module uses a device such as a camera or a video camera, the image processing module uses a device having an image processing capability, for example, a mobile phone, a tablet computer, or a computer, and the display module uses a device such as a screen or a television set. The image capture module, the image processing module, and the display module are connected in a wireless or wired manner to transmit image data. For another example, the image capture module and the image processing module are integrated into one device. The integrated device has image acquiring and image processing capabilities, for example, a mobile phone or a tablet computer. A processor of the integrated device is used as a control module to control the image capture module and the image processing module to perform respective functions. The device may further have a wireless or wired transmission capability, to transmit an image to the display module. The integrated device may be further provided with an output interface, to transmit an image through the output interface.

It should be noted that the foregoing application architecture may alternatively be implemented by using other hardware and/or software. This is not specifically limited in the present disclosure.

The image processing module is used as a core module of the present disclosure. A device including the image processing module may be a terminal (for example, a mobile phone or a tablet computer (pad)), a wearable device (for example, a smartwatch) having a wireless communication function, a computer having a wireless transceiver function, a virtual reality (VR) device, an augmented reality (AR) device, or the like. This is not limited in the present disclosure.

Figure 2:
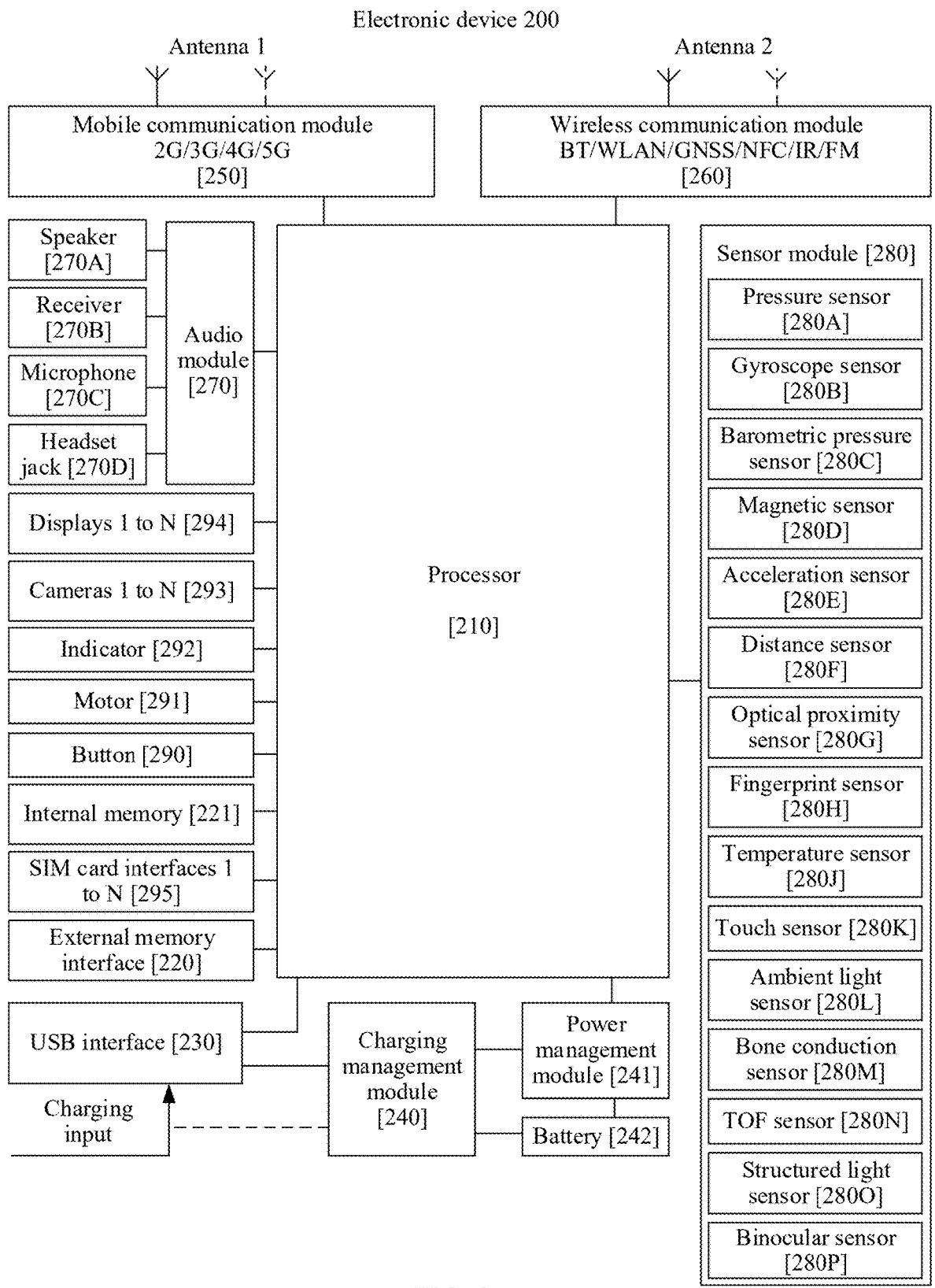
FIG. 2 is a schematic diagram of an example structure of a terminal 200 according to an embodiment of the present disclosure.

FIG. 2 is a schematic diagram of a structure of a terminal 200.

The terminal 200 may include a processor 210, an external memory interface 220, an internal memory 221, a universal serial bus (USB) port 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, a TOF sensor 280N, a structured light sensor 280O, a binocular sensor 280P, and the like.

It may be understood that an example structure shown in this embodiment of the present disclosure does not constitute a specific limitation on the terminal 200. In some other embodiments of the present disclosure, the terminal 200 may include more or fewer components than those shown in the figure, or may combine some components, or may split some components, or may have different component arrangements. The components shown in the figure may be implemented by hardware, software, or a combination of software and hardware.

The processor 210 may include one or more processing units. For example, the processor 210 may include an application processor (AP), a modem processor, a graphics processing unit (GPU), an ISP, a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 includes a cache memory. The memory may store instructions or data just used or cyclically used by the processor 210. If the processor 210 needs to use the instructions or the data again, the processor 210 may directly invoke the instructions or the data from the memory. This avoids repeated access, reduces waiting time of the processor 210, and improves system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and/or the like.

The I2C interface is a two-way synchronous serial bus, including a serial data line (SDA) and a serial clock line (SCL). In some embodiments, the processor 210 may include a plurality of groups of I2C buses. The processor 210 may be separately coupled to the touch sensor 280K, a charger, a flash, the camera 293, and the like through different I2C bus interfaces. For example, the processor 210 may be coupled to the touch sensor 280K through the I2C interface, so that the processor 210 communicates with the touch sensor 280K through the I2C bus interface, to implement a touch function of the terminal 200.

The I2S interface may be used for audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transfer an audio signal to the wireless communication module 260 through the I2S interface, to implement a function of answering a call through a Bluetooth headset.

The PCM interface may also be used to perform audio communication, and sample, quantize, and code an analog signal. In some embodiments, the audio module 270 may be coupled to the wireless communication module 260 through a PCM bus interface. In some embodiments, the audio module 270 may alternatively transfer an audio signal to the wireless communication module 260 through the PCM interface, to implement a function of answering a call by using a Bluetooth headset. Both the I2S interface and the PCM interface may be used for audio communication.

The UART interface is a universal serial data bus, and is used for asynchronous communication. The bus may include a two-way communication bus. The bus converts to-be-transmitted data between serial communication and parallel communication. In some embodiments, the UART interface is usually configured to connect the processor 210 and the wireless communication module 260. For example, the processor 210 communicates with a Bluetooth module in the wireless communication module 260 through the UART interface, to implement a Bluetooth function. In some embodiments, the audio module 270 may transfer an audio signal to the wireless communication module 260 through the UART interface, to implement a function of playing music by using a Bluetooth headset.

The MIPI interface may be configured to connect the processor 210 and a peripheral component such as the display 294 or the camera 293. The MIPI interface includes a camera serial interface (CSI), a display serial interface (DSI), and the like. In some embodiments, the processor 210 communicates with the camera 293 through the CSI interface, to implement a photographing function of the terminal 200. The processor 210 communicates with the display 294 through the DSI interface, to implement a display function of the terminal 200.

The GPIO interface may be configured by software. The GPIO interface may be configured as a control signal or a data signal. In some embodiments, the GPIO interface may be configured to connect the processor 210 to the camera 293, the display 294, the wireless communication module 260, the audio module 270, the sensor module 280, or the like. The GPIO interface may alternatively be configured as the I2C interface, the I2S interface, the UART interface, the MIPI interface, or the like.

The USB interface 230 is an interface that conforms to a USB standard specification, and may be specifically a mini-USB interface, a micro USB interface, a USB Type-C interface, or the like. The USB interface 230 may be configured to connect to the charger to charge the terminal 200, or may be configured to transmit data between the terminal 200 and a peripheral device, or may be configured to connect to a headset for playing audio through the headset. The interface may be further configured to connect to another terminal such as an AR device.

It may be understood that an interface connection relationship between the modules that is shown in this embodiment of the present disclosure is merely an example for description, and does not constitute a limitation on the structure of the terminal 200. In some other embodiments of the present disclosure, the terminal 200 may alternatively use an interface connection manner different from that in the foregoing embodiment, or use a combination of a plurality of interface connection manners.

The charging management module 240 is configured to receive a charging input from the charger. The charger may be a wireless charger or a wired charger. In some embodiments of wired charging, the charging management module 240 may receive a charging input of the wired charger through the USB interface 230. In some embodiments of wireless charging, the charging management module 240 may receive a wireless charging input via a wireless charging coil of the terminal 200. When charging the battery 242, the charging management module 240 may further charge the terminal by using the power management module 241.

The power management module 241 is configured to connect to the battery 242, the charging management module 240, and the processor 210. The power management module 241 receives an input of the battery 242 and/or the charging management module 240, and supplies power to the processor 210, the internal memory 221, the display 294, the camera 293, the wireless communication module 260, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same component.

A wireless communication function of the terminal 200 may be implemented through the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the terminal 200 may be configured to cover one or more communication bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communication module 250 may provide a wireless communication solution that includes 2G/3G/4G/5G or the like and that is applied to the terminal 200. The mobile communication module 250 may include at least one filter, a switch, a power amplifier, a low-noise amplifier (LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some functional modules in the mobile communication module 250 may be disposed in the processor 210. In some embodiments, at least some functional modules of the mobile communication module 250 and at least some modules of the processor 210 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 270A, the phone receiver 270B, or the like), or displays an image or a video by using the display 294. In some embodiments, the modem processor may be an independent component. In some other embodiments, the modem processor may be independent of the processor 210, and disposed in a same component as the mobile communication module 250 or another functional module.

The wireless communication module 260 may provide wireless communication solutions applied to the terminal 200, including a wireless local area network (WLAN) (such as a wireless fidelity (Wi-Fi) network), Bluetooth (BT), a global navigation satellite system (GNSS), frequency modulation (FM), near-field communication (NFC), an infrared (IR) technology, or the like. The wireless communication module 260 may be one or more components integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, the antenna 1 and the mobile communication module 250 of the terminal 200 are coupled, and the antenna 2 and the wireless communication module 260 are coupled, so that the terminal 200 can communicate with a network and another device by using a wireless communication technology. The wireless communication technology may include a Global System for Mobile Communications (GSM), a general packet radio service (GPRS), code-division multiple access (CDMA), wideband code-division multiple access (WCDMA), time-division code-division multiple access (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite based augmentation system (SBAS).

The terminal 200 implements the display function through the GPU, the display 294, the application processor, and the like. The GPU is a microprocessor for image processing, and is connected to the display 294 and the application processor. The GPU is configured to: perform mathematical and geometric computation, and render an image. The processor 210 may include one or more GPUs that execute program instructions to generate or change display information.

The display 294 is configured to display an image, a video, or the like. The display 294 includes a display panel. The display panel may be a liquid-crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal 200 may include one or N displays 294, where N is a positive integer greater than 1.

The terminal 200 can implement a photographing function by using the ISP, the camera 293, the video codec, the GPU, the display 294, the application processor, and the like.

The ISP is configured to process data fed back by the camera 293. For example, during photographing, a shutter is touched, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, blue and green (RGB) or luma/brightness (Y), blue projection (U), and red projection (V). In some embodiments, the terminal 200 may include one or N cameras 293, where N is a positive integer greater than 1. One or more cameras 293 may be disposed on a front side of the terminal 200, for example, a middle position at a top of a screen, and may be understood as a front-facing camera of the terminal, or a device corresponding to a binocular sensor, or may have two front-facing cameras. Alternatively, one or more cameras 293 may be disposed on a back side of the terminal 200, for example, an upper left corner on the back side of the terminal, and may be understood as a rear-facing camera of the terminal.

The digital signal processor is configured to process a digital signal, and may process another digital signal in addition to a digital image signal. For example, when the terminal 200 selects a frequency, the digital signal processor is configured to perform Fourier transform and the like on frequency energy.

The video codec is configured to compress or decompress a digital video. The terminal 200 may support one or more video codecs. In this way, the terminal 200 can play or record videos in a plurality of coding formats, for example, Moving Picture Experts Group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the terminal 200, such as image recognition, facial recognition, speech recognition, and text understanding, can be implemented through the NPU.

The external memory interface 220 may be configured to connect to an external memory card such as a micro SD card, to extend a storage capability of the terminal 200. The external memory card communicates with the processor 210 through the external memory interface 220, to implement a data storage function. For example, files such as music and videos are stored in the external memory card.

The internal memory 221 may be configured to store computer-executable program code. The executable program code includes instructions. The internal memory 221 may include a program storage region and a data storage region. The program storage region may store an operating system, an application used by at least one function (for example, a sound playing function or an image playing function), and the like. The data storage region may store data (such as audio data and a phone book) created during use of the terminal 200, and the like. In addition, the internal memory 221 may include a high-speed random-access memory, or may include a nonvolatile memory, for example, at least one magnetic disk storage device, a flash memory, or a universal flash storage (UFS). The processor 210 runs the instructions stored in the internal memory 221 and/or the instructions stored in the memory disposed in the processor, to execute various function applications of the terminal 200 and data processing.

The terminal 200 may implement audio functions such as music playing and recording through the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to encode and decode an audio signal. In some embodiments, the audio module 270 may be disposed in the processor 210, or some functional modules in the audio module 270 are disposed in the processor 210.

The speaker 270A, also referred to as a "horn", is configured to convert an audio electrical signal into a sound signal. The terminal 200 may be used to listen to music or answer a hands-free call through the speaker 270A.

The receiver 270B, also referred to as an "earpiece", is configured to convert an audio electrical signal into a sound signal. When a call is answered or an audio message is received through the terminal 200, the receiver 270B may be put close to a human ear to listen to voice.

The microphone 270C, also referred to as a "mike" or a "mic", is configured to convert a sound signal into an electrical signal. When making a call or sending a voice message, a user may make a sound near the microphone 270C through the mouth, to input a sound signal to the microphone 270C. At least one microphone 270C may be disposed in the terminal 200. In some other embodiments, two microphones 270C may be disposed in the terminal 200, to collect a sound signal and further implement a noise reduction function. In some other embodiments, three, four, or more microphones 270C may alternatively be disposed in the terminal 200, to collect a sound signal, reduce noise, further identify a sound source, implement a directional recording function, and the like.

The headset jack 270D is configured to connect to a wired headset. The headset jack 270D may be the USB interface 230, or may be a 3.5 mm Open Mobile Terminal Platform (OMTP) standard interface or a CTIA standard interface.

The pressure sensor 280A is configured to sense a pressure signal, and may convert the pressure signal into an electrical signal. In some embodiments, the pressure sensor 280A may be disposed on the display 294. There is a plurality of types of pressure sensors 280A, such as a resistive pressure sensor, an inductive pressure sensor, and a capacitive pressure sensor. The capacitive pressure sensor may include at least two parallel plates made of conductive materials. When a force is applied to the pressure sensor 280A, capacitance between electrodes changes. The terminal 200 determines pressure strength based on a capacitance change. When a touch operation is performed on the display 294, the terminal 200 detects touch operation strength by using the pressure sensor 280A. The terminal 200 may also calculate a touch position based on a detection signal of the pressure sensor 280A. In some embodiments, touch operations that are performed in a same touch position but have different touch operation strengths may correspond to different operation instructions. For example, when a touch operation whose touch operation strength is less than a first pressure threshold is performed on an SMS message application icon, an instruction for viewing an SMS message is executed. When a touch operation whose touch operation strength is greater than or equal to the first pressure threshold is performed on the SMS message application icon, an instruction for creating a new SMS message is executed.

The gyroscope sensor 280B may be configured to determine a moving posture of the terminal 200. In some embodiments, an angular velocity of the terminal 200 around three axes (namely, x, y, and z axes) may be determined by using the gyroscope sensor 280B. The gyroscope sensor 280B may be configured to implement image stabilization during photographing. For example, when the shutter is touched, the gyroscope sensor 280B detects an angle at which the terminal 200 jitters, calculates, based on the angle, a distance for which a lens module needs to compensate, and allows the lens to cancel the jitter of the terminal 200 through reverse motion, to implement image stabilization. The gyroscope sensor 280B may also be used in a navigation scenario and a somatic game scenario.

The barometric pressure sensor 280C is configured to measure barometric pressure. In some embodiments, the terminal 200 calculates an altitude through a barometric pressure value measured by the barometric pressure sensor 280C, to assist positioning and navigation.

The magnetic sensor 280D includes a Hall sensor. The terminal 200 may detect opening and closing of a flip leather case by using the magnetic sensor 280D. In some embodiments, when the terminal 200 is a clamshell phone, the terminal 200 may detect opening and closing of a flip cover by using the magnetic sensor 280D. Further, a feature such as automatic unlocking upon opening of the flip cover is set based on a detected opening or closing state of the flip cover.

The acceleration sensor 280E may detect values of accelerations in various directions (usually on three axes) of the terminal 200. When the terminal 200 is still, a value and a direction of gravity may be detected. The acceleration sensor 280E may be further configured to identify a posture of the terminal, and is used in an application such as a pedometer or screen switching between a landscape mode and a portrait mode.

The distance sensor 280F is configured to measure a distance. The terminal 200 may measure a distance through infrared light or a laser. In some embodiments, in a photographing scenario, the terminal 200 may use the range sensor 280F to measure a distance, to implement quick focusing.

The optical proximity sensor 280G may include, for example, a light-emitting diode (LED) and an optical detector, for example, a photodiode. The light-emitting diode may be an infrared light-emitting diode. The terminal 200 emits infrared light by using the light-emitting diode. The terminal 200 detects infrared reflected light from a nearby object by using the photodiode. When sufficient reflected light is detected, it may be determined that there is an object near the terminal 200. When insufficient reflected light is detected, the terminal 200 may determine that there is no object near the terminal 200. The terminal 200 may detect, by using the optical proximity sensor 280G, that the terminal 200 held by the user is close to an ear for a call, to automatically perform screen-off for power saving. The optical proximity sensor 280G may also be used in a leather case mode or a pocket mode to automatically perform screen unlocking or locking.

The ambient light sensor 280L is configured to sense ambient light brightness. The terminal 200 may adaptively adjust brightness of the display 294 based on the sensed ambient light brightness. The ambient light sensor 280L may also be configured to automatically adjust white balance during photographing. The ambient light sensor 280L may further cooperate with the optical proximity sensor 280G to detect whether the terminal 200 is in a pocket to prevent an accidental touch.

The fingerprint sensor 280H is configured to collect a fingerprint. The terminal 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the terminal 200 executes a temperature processing policy based on the temperature detected by the temperature sensor 280J. For example, when the temperature reported by the temperature sensor 280J exceeds a threshold, the terminal 200 lowers performance of a processor located near the temperature sensor 280J, to reduce power consumption to implement thermal protection. In some other embodiments, when the temperature is less than another threshold, the terminal 200 heats the battery 242 to avoid an abnormal shutdown of the terminal 200 caused by a low temperature. In some other embodiments, when the temperature is less than still another threshold, the terminal 200 boosts an output voltage of the battery 242 to avoid abnormal shutdown caused by a low temperature.

The touch sensor 280K is also referred to as a "touch control device". The touch sensor 280K may be disposed in the display 294. The touch sensor 280K and the display 294 form a touchscreen, which is also referred to as a "touchscreen". The touch sensor 280K is configured to detect a touch operation performed on or near the touch sensor 280K. The touch sensor may transfer the detected touch operation to the application processor to determine a type of a touch event. The display 294 may provide a visual output related to the touch operation. In some other embodiments, the touch sensor 280K may alternatively be disposed on a surface of the terminal 200 at a position different from that of the display 294.

The bone conduction sensor 280M may obtain a vibration signal. In some embodiments, the bone conduction sensor 280M may obtain a vibration signal of a vibration bone of a human vocal-cord part. The bone conduction sensor 280M may also contact a pulse of a human body and receive a blood pressure beating signal. In some embodiments, the bone conduction sensor 280M may alternatively be disposed in the headset, to combine into a bone conduction headset. The audio module 270 may obtain a voice signal through parsing based on the vibration signal that is of the vibration bone of the vocal-cord part and that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, or the like. The button 290 may be a mechanical button, or may be a touch button. The terminal 200 may receive a button input, and generate a button signal input related to a user setting and function control of the terminal 200.

The motor 291 may generate a vibration prompt. The motor 291 may be configured to provide an incoming call vibration prompt or a touch vibration feedback. For example, touch operations performed on different applications (for example, photographing and audio playing) may correspond to different vibration feedback effect. The motor 291 may also correspond to different vibration feedback effect for touch operations performed on different regions of the display 294. Different application scenarios (for example, a time reminder, information receiving, an alarm clock, and a game) may also correspond to different vibration feedback effect. Touch vibration feedback effect may be further customized.

The indicator 292 may be an indicator light, and may be configured to indicate a charging state and a power change, or may be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the terminal 200. The terminal 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or different types. The SIM card interface 295 may be compatible with different types of SIM cards. The SIM card interface 295 may also be compatible with the external storage card. The terminal 200 interacts with a network via the SIM card, to implement functions such as calling and data communication. In some embodiments, the terminal 200 uses an embedded SIM (eSIM), namely, an embedded SIM card. The eSIM card may be embedded in the terminal 200, and cannot be separated from the terminal 200.

Figure 3:
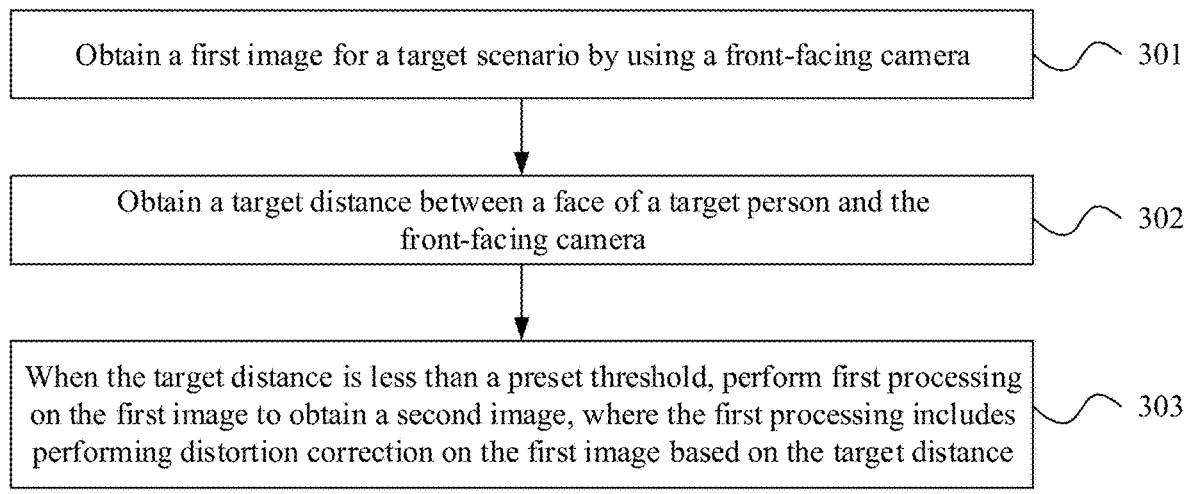
FIG. 3 is a flowchart of Embodiment 1 of an image transformation method according to an embodiment of the present disclosure.

FIG. 3 is a flowchart of Embodiment 1 of an image transformation method according to the present disclosure. As shown in FIG. 3, the method in this embodiment may be applied to the application architecture shown in FIG. 1, and may be performed by the terminal shown in FIG. 2. The image transformation method may include the following steps.

Step 301: Obtain a first image for a target scenario by using a front-facing camera.

The first image in the present disclosure is obtained by a front-facing camera of a terminal in a scenario in which a user takes a selfie. Generally, an FOV of the front-facing camera is set to 70° to 110°, for example 90°. A region facing the front-facing camera is a target scenario. The target scenario includes a face of a target person (that is, a user).

Optionally, the first image may be a preview image that is obtained by the front-facing camera of the terminal and displayed on a screen. In this case, a shutter is not triggered, and the first image has not been formed on an image sensor. Alternatively, the first image may be an image that is obtained by the terminal but is not displayed on a screen. In this case, a shutter is not triggered, and the first image is not formed on a sensor. Alternatively, the first image may be an image that is obtained by the terminal after a shutter is triggered and that has been formed on an image sensor.

It should be noted that the first image may also be obtained by using a rear-facing camera of the terminal. This is not specifically limited.

Step 302: Obtain a target distance between the face of the target person and the front-facing camera.

The target distance between the face of the target person and the front-facing camera may be a distance between a most front part (for example, a nose) on the face of the target person and the front-facing camera. Alternatively, the target distance between the face of the target person and the front-facing camera may be a distance between a specified part (for example, an eye, a mouth, or a nose) on the face of the target person and the front-facing camera. Alternatively, the target distance between the face of the target person and the front-facing camera may be a distance between a central position (for example, a nose on a front photo of the target person, or a cheekbone position on a side photo of the target person) on the face of the target person and the front-facing camera. It should be noted that the target distance may be defined depending on a specific situation of the first image. This is not specifically limited in the present disclosure.

Figure 4:
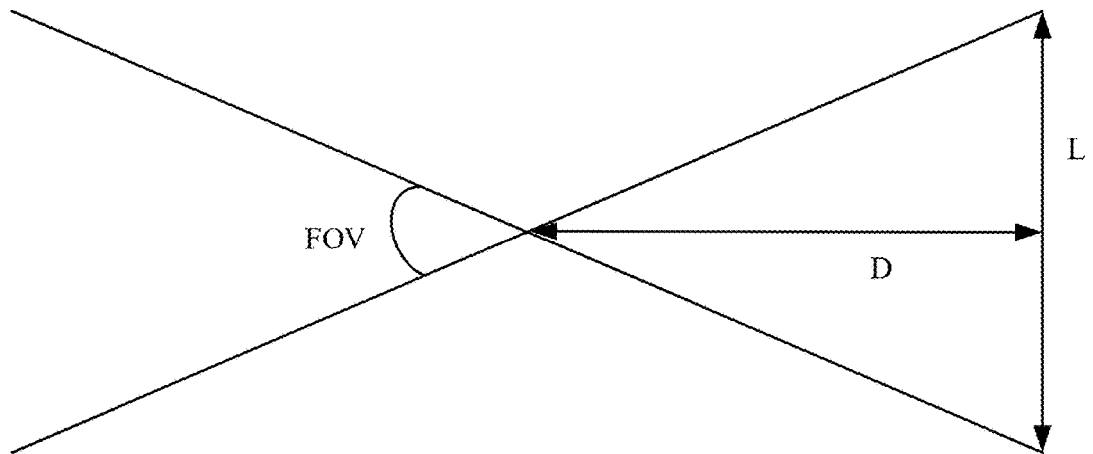
FIG. 4 is a schematic diagram of an example of a distance obtaining method according to an embodiment of the present disclosure.

In a possible implementation, the terminal may obtain the target distance by calculating a screen-to-body ratio of a face, to be specific, first obtain a screen-to-body ratio (a ratio of a pixel area of the face to a pixel area of the first image) of the face of the target person in the first image, and then obtain the distance based on the screen-to-body ratio and the FOV of the front-facing camera. FIG. 4 is a schematic diagram of an example of a distance obtaining method. As shown in FIG. 4, it is assumed that an average length of the face is 20 cm and an average width is 15 cm. A real area $S=20\times15/P$ cm$^2$ of an entire field of view of the first image at the target distance D between the face of the target person and the front-facing camera may be estimated based on the screen-to-body ratio P of the face. A diagonal length L of the first image may be obtained based on an aspect ratio of the first image. For example, when the aspect ratio of the first image is 1:1, the diagonal length is $L=S^{0.5}$. Based on the imaging relationship shown in the preceding figure, the target distance is $D=L/(2\times\tan(0.5\times FOV))$.

In a possible implementation, the terminal may further obtain the target distance by using a distance sensor, to be specific, when the user takes a selfie, may obtain the distance between the front-facing camera and the face of the target person ahead through measurement by using the distance sensor on the terminal. The distance sensor may include, for example, a TOF ranging sensor, a structured light sensor, or a binocular sensor.

Step 303: When the target distance is less than a preset threshold, perform first processing on the first image to obtain a second image. The first processing includes performing distortion correction on the first image based on the target distance.

Generally, because a distance between a face and a front-facing camera is small during selfie-taking, there is a perspective distortion problem that "the face looks big when near and small when in a distance". For example, when the distance between the face of the target person and the front-facing camera is excessively small, the nose on the face may be larger and the face may be elongated due to different distances between the camera and different parts of the face. However, when the distance between the face of the target person and the front-facing camera is large, the foregoing problems may be reduced. Therefore, in the present disclosure, a threshold is set. It is considered that when the target distance between the face of the target person and the front-facing camera is less than the threshold, the obtained first image including the face of the target person is distorted, and distortion correction needs to be performed on the first image. A value range of the preset threshold is within 80 cm. Optionally, the preset threshold may be set to 50 cm. It should be noted that a specific value of the preset threshold may be determined based on performance of the front-facing camera, photographing illumination, and the like. This is not specifically limited in the present disclosure.

The terminal performs perspective distortion correction on the first image to obtain the second image. The face of the target person in the second image is closer to the real appearance of the face of the target person than the face of the target person in the first image, to be specific, relative proportions and relative positions of facial features of the target person in the second image are closer to relative proportions and relative positions of the facial features of the face of the target person than relative proportions and the relative positions of the facial features of the target person in the first image.

As described above, when the first image is obtained, the distance between the face of the target person and the front-facing camera is less than the preset threshold. It is very likely that the facial features of the face of the target person in the first image change in size, stretch, and the like due to the perspective distortion problem of the front-facing camera that "the face looks big when near and small when in a distance", the relative proportions and relative positions of the facial features of the target person deviate from relative proportions and relative positions of the real appearance of the face of the target person. In the second image obtained by performing perspective distortion correction on the first image, a case in which the facial features of the face of the target person change in size, stretch, and the like can be eliminated. Therefore, the relative proportions and the relative positions of the facial features of the face of the target person in the second image are close to or even restored to the relative proportions and the relative positions of the real appearance of the face of the target person.

Optionally, the second image may be a preview image obtained by the front-facing camera. In an embodiment, before the shutter is triggered, the front-facing camera may obtain the first image facing a target scenario region (the first image is displayed on the screen as a preview image, or the first image does not appear on the screen), the terminal obtains the second image after performing perspective distortion correction on the first image by using the foregoing method, and the second image is displayed on the screen of the terminal. In this case, the second image viewed by the user is the preview image on which perspective distortion correction has been performed, the shutter is not triggered, and the second image has not yet been formed on the image sensor. Alternatively, the second image may be an image obtained after the shutter is triggered. To be specific, after the shutter is triggered, the first image is an image formed on the image sensor of the terminal, the terminal obtains the second image after performing perspective distortion correction on the first image by using the foregoing method, and the second image is stored and displayed on a screen of the terminal. In this case, the second image viewed by the user is an image that has been stored in a gallery and on which perspective distortion correction has been performed.

In the present disclosure, a process of performing perspective distortion correction on the first image to obtain the second image may include: The face of the target person in the first image is first fitted with the standard face model based on the target distance to obtain depth information of the face of the target person, and then perspective distortion correction is performed on the first image based on the depth information to obtain the second image. The standard face model is a pre-created face model including facial features. A shape transformation coefficient, an expression transformation coefficient, and the like are set on the standard face model. An expression or a shape of the face model may be changed by adjusting these coefficient values. D represents a value of the target distance. It is assumed that the standard three-dimensional face model is placed in front of a camera of the terminal. A target distance between the standard three-dimensional face model and the camera is D, and a specified point (for example, a nose tip or a center point of the face model) on the standard three-dimensional face model corresponds to an origin O of a three-dimensional coordinate system. A two-dimensional projected point set A of feature points on the standard three-dimensional face model is obtained through perspective projection, and a point set B of two-dimensional feature points of the face of the target person in the first image is obtained. Each point in the point set A corresponds to a unique matching point in the point set B. A sum F of distance differences of two-dimensional coordinates of all matching points is calculated. To obtain a real three-dimensional model of the face of the target person, a plane position (that is, the specified point moves up and down and left and right away from the origin O), a shape, relative proportions of facial features, and the like of the standard three-dimensional face model may be adjusted for a plurality of times, so that the sum F of the distance differences is minimized or even close to 0, that is, the point set A and the point set B are almost exactly coincident. A real three-dimensional model of the face of the target person corresponding to the first image may be obtained based on the foregoing method. Coordinates (x, y, z+D) of any pixel on the real three-dimensional model of the face of the target person relative to the camera can be obtained based on coordinates (x, y, z) of any pixel on the real three-dimensional model relative to the origin O and the target distance D between the origin O and the camera. In this case, depth information of any pixel of the face of the target person in the first image may be obtained through perspective projection. Optionally, the depth information may alternatively be directly obtained by using the TOF sensor, the structured light sensor, or the like.

Based on the foregoing fitting process, the terminal may establish the first three-dimensional model of the face of the target person. In the foregoing fitting process, a facial feature point fitting manner, a deep learning fitting manner, a TOF camera deep fitting manner and the like may be used. The first three-dimensional model may be presented in a three-dimensional point cloud manner. The first three-dimensional model corresponds to a two-dimensional image of the face of the target person, and presents a same facial expression, the relative proportions and relative positions of the facial features of the face, and the like.

Figure 5:
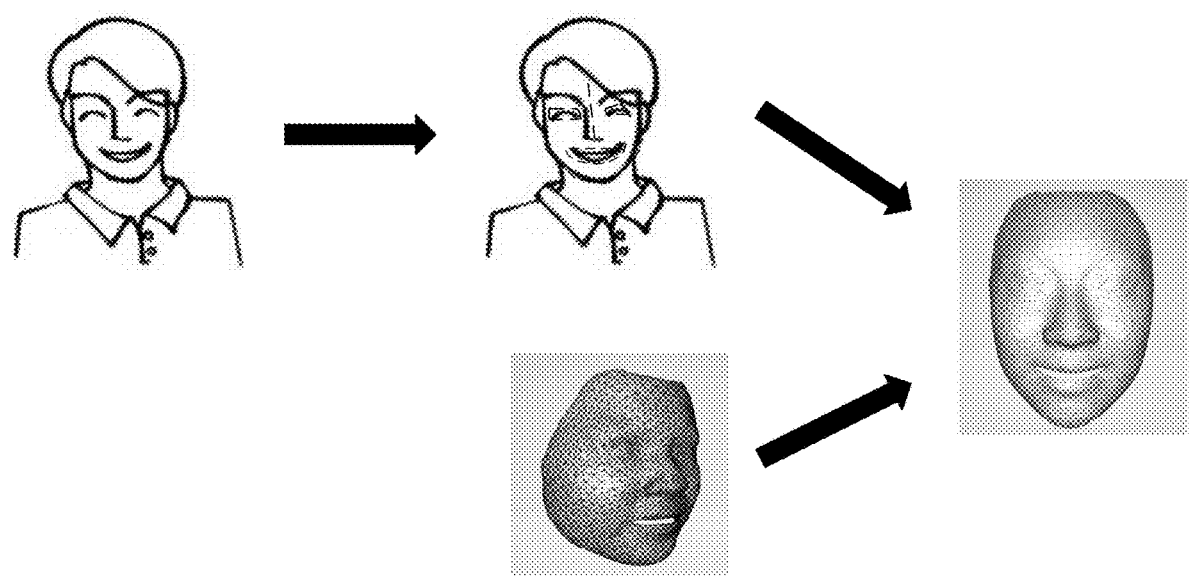
FIG. 5 is a schematic diagram of an example of a process of creating a three-dimensional face model according to an embodiment of the present disclosure.

For example, the three-dimensional model of the face of the target person is established in the facial feature point fitting manner. FIG. 5 is a schematic diagram of an example of a process of creating the three-dimensional face model. As shown in FIG. 5, feature points of parts such as facial features and a contour of the face are first obtained from an input image, and then a deformable basic three-dimensional face model is used to perform fitting of a real face form based on correspondences between 3D key points of the face model and the obtained feature points and based on fitting parameters (such as a target distance and an FOV coefficient) and fitting optimization items (such as face rotation, translation, and scaling parameters and a face model deformation coefficient). Because a corresponding position of the feature point of the contour of the face on the three-dimensional face model changes with a rotation angle of the face, correspondences at different rotation angles may be selected, and iterations of fittings are used to ensure fitting precision. Three-dimensional spatial coordinates of each point on the three-dimensional point cloud fitted to the face of the target person are finally output through fitting. A distance between the camera and the nose is obtained. A three-dimensional face model is established based on the distance. The standard model is placed at this distance for projection. The distance difference of coordinates of two corresponding points (in a photo and a two-dimensional projection) is minimized. Projection is continuously performed to obtain a three-dimensional head. The depth information is a vector. The shape may be fitted. In addition, spatial positions of the model on x and y axes may be fitted.

The terminal transforms a pose and/or a shape of the first three-dimensional model of the face of the target person to obtain a second three-dimensional model of the face of the target person. Optionally, the terminal performs coordinate transformation on the first three-dimensional model based on the correction distance to obtain a second three-dimensional model.

When the pose and/or the shape of the first three-dimensional model are/is adjusted and coordinate transformation is performed on the first three-dimensional model, adjustment needs to be performed based on the distance between the face of the target person and the front-facing camera. Because the distance between the face of the target person in the first image and the front-facing camera is less than the preset threshold, the first three-dimensional model may be moved backward to obtain the second three-dimensional model of the face of the target person. Adjustment of the face of the target person in the real world may be simulated based on adjustment of the three-dimensional model. Therefore, the adjusted second three-dimensional model may present a result that the face of the target person is moved backward relative to the front-facing camera.

In a possible implementation, the first three-dimensional model is moved backward along an extension line between the first three-dimensional model and the camera to a position twice an original distance, to obtain the second three-dimensional model. To be specific, if a spatial coordinate position of the original first three-dimensional model is (x, y, z), a position of the second three-dimensional model is (2x, 2y, 2z). That is, there is a doubled mapping relationship.

In a possible implementation, when the second three-dimensional model is obtained by moving the position of the first three-dimensional model, angle compensation is performed on the second three-dimensional model.

Figure 6:
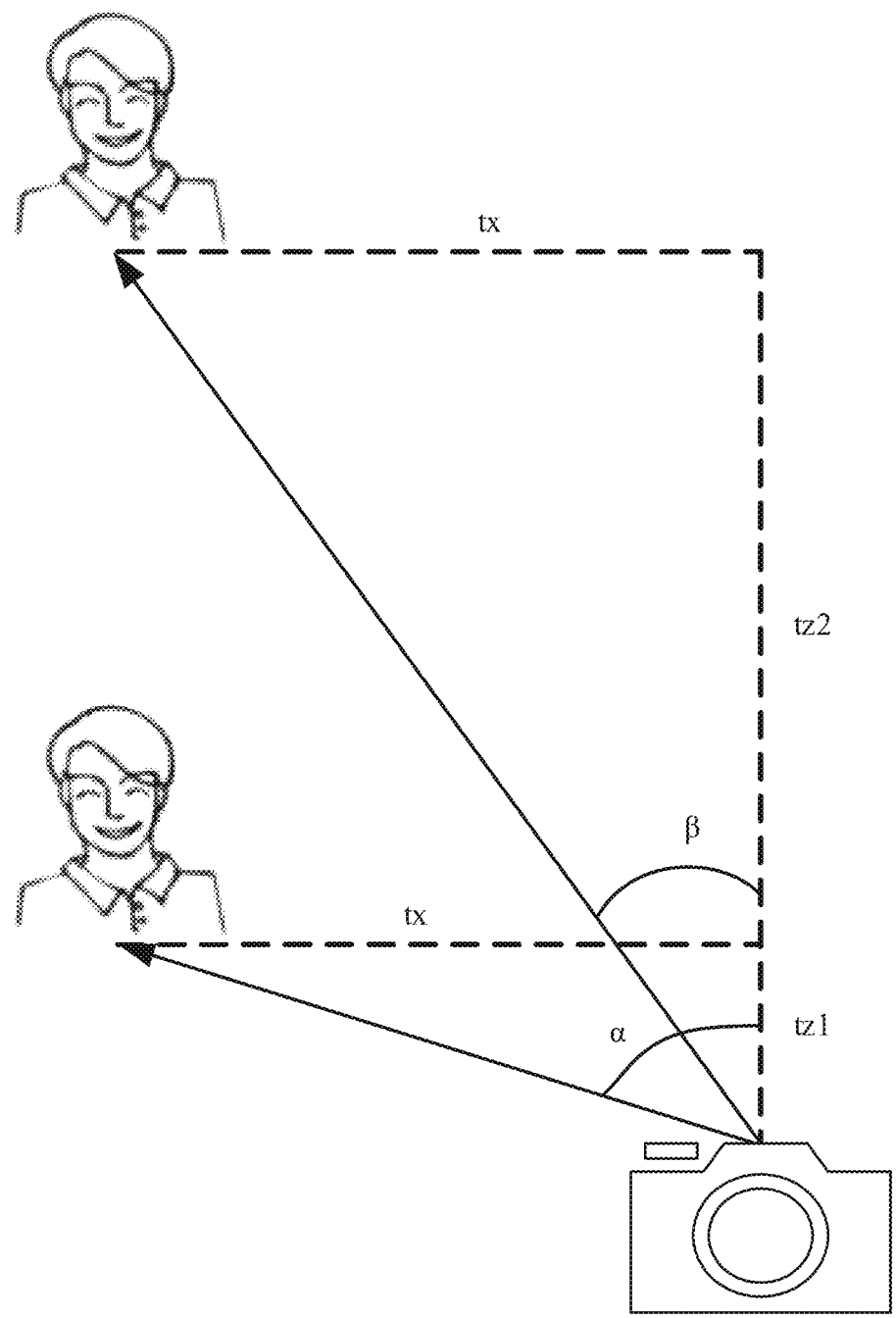
FIG. 6 is a schematic diagram of an example of an angle change caused by position movement according to an embodiment of the present disclosure.

In the real world, when the face of the target person moves backward relative to the front-facing camera, an angle of the face of the target person may change relative to the camera. In this case, if an angle change caused by backward movement is not expected to be retained, angle compensation may be performed. FIG. 6 is a schematic diagram of an example of the angle change caused by position movement. As shown in FIG. 6, an initial distance between the face of the target person and the front-facing camera is less than the preset threshold, the angle of the face of the target person relative to the front-facing camera is $\alpha$, a vertical distance between the face of the target person and the front-facing camera is tz1, and a horizontal distance between the face of the target person and the front-facing camera is tx. When the face of the target person moves backward, the angle of the face relative to the front-facing camera changes to $\beta$, the vertical distance between the face and the front-facing camera changes to tz2, and the horizontal distance between the face and the front-facing camera is still tx. Therefore, the change angle of the face of the target person relative to the front-facing camera is $\Delta\theta=\beta-\alpha=\arctan(tx/tz2)-\arctan(tx/tz1)$. In this case, if only the first three-dimensional model is moved backward, effect of an angle change caused by backward movement of the two-dimensional image obtained based on the second three-dimensional model is generated. Angle compensation needs to be performed on the second three-dimensional model, that is, the second three-dimensional model is rotated at an angle of $\Delta\theta$, so that the two-dimensional image finally obtained based on the second three-dimensional model and the corresponding two-dimensional image (that is, the face of the target person in the initial image) before backward movement maintain a same posture.

The terminal obtains a pixel displacement vector field of the target object based on the first three-dimensional model and the second three-dimensional model.

Optionally, after two three-dimensional models (the first three-dimensional model and the second three-dimensional model) before and after transformation are obtained, in the present disclosure, perspective projection is performed on the first three-dimensional model based on the depth information to obtain a first coordinate set. The first coordinate set includes corresponding two-dimensional coordinate values obtained by projecting a plurality of sampling points in the first three-dimensional model. Perspective projection is performed on the second three-dimensional model based on the depth information to obtain a second coordinate set. The second coordinate set includes corresponding two-dimensional coordinate values obtained by projecting a plurality of sampling points in the second three-dimensional model.

Optionally, after two three-dimensional models (the first three-dimensional model and the second three-dimensional model) before and after transformation are obtained, perspective projection is performed on the first three-dimensional model based on a coordinate system of the first image to obtain a first group of projected points. Perspective projection is performed on the second three-dimensional model based on the coordinate system of the first image to obtain a second group of projected points. The first group of projected points include corresponding two-dimensional coordinate values obtained by projecting a plurality of sampling points in the first three-dimensional model. The second group of projected points include corresponding two-dimensional coordinate values obtained by projecting a plurality of sampling points in the second three-dimensional model.

Figure 7:
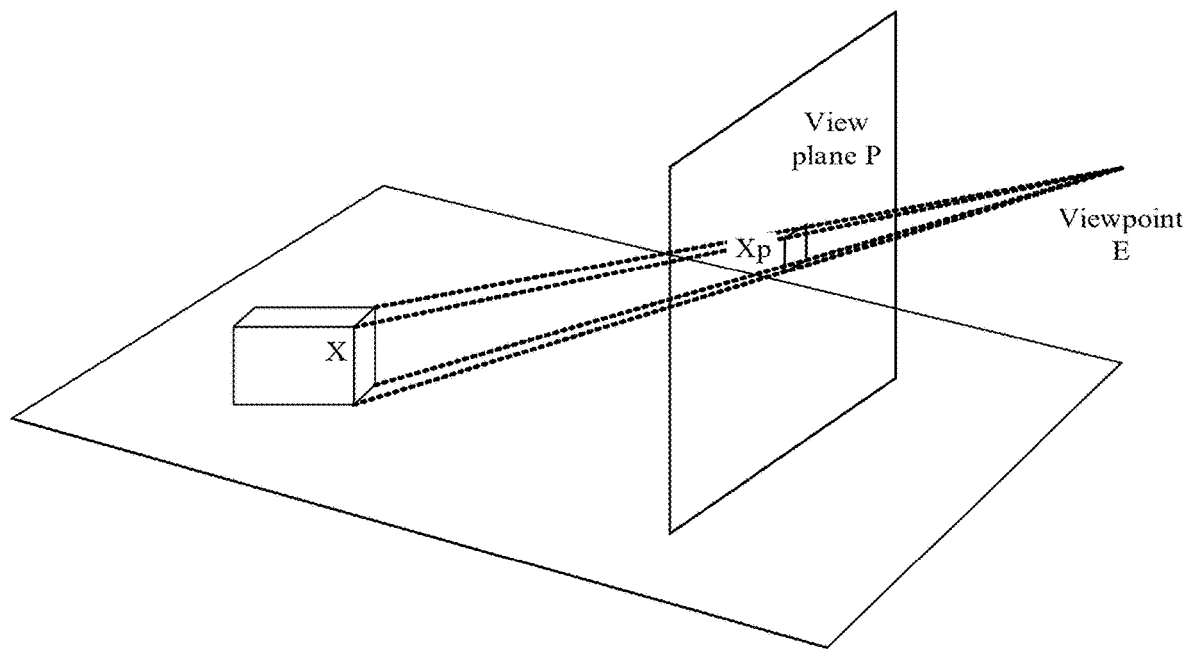
FIG. 7 is a schematic diagram of an example of perspective projection according to an embodiment of the present disclosure.

Projection is a method of transforming three-dimensional coordinates into two-dimensional coordinates. Common projection methods include orthogonal projection and perspective projection. Perspective projection is used as an example, a basic perspective projection model includes two parts: a viewpoint E and a view plane P, and the viewpoint E is not on the view plane P. The viewpoint E may be considered as a position of the camera. The view plane P is a two-dimensional plane for rendering a perspective view of a three-dimensional target object. FIG. 7 is a schematic diagram of an example of perspective projection. As shown in FIG. 7, for any point X in the real world, a ray whose start point is the viewpoint E and that passes through the point X is constructed. An intersection point Xp of the ray and the view plane P is perspective projection of the point X. An object in the three-dimensional world may be considered to be formed by a point set {Xi}. In this way, rays Ri whose start point is the viewpoint E and that pass through points Xi are respectively constructed. A set of intersection points of these rays Ri and the view plane P is a two-dimensional projected image of the object in the three-dimensional world at the viewpoint E.

Based on the foregoing principle, all sampling points of the three-dimensional model are respectively projected to obtain corresponding pixels on the two-dimensional plane. These pixels on the two-dimensional plane may be represented by using coordinate values on the two-dimensional plane, to obtain a coordinate set corresponding to the sampling points of the three-dimensional model. In the present disclosure, the first coordinate set corresponding to the first three-dimensional model and the second coordinate set corresponding to the second three-dimensional model may be obtained.

Optionally, to keep a size and a position of the face of the target person consistent, a proper alignment point and scaling scale may be selected to perform translation or scaling adjustment on the coordinate values in the second coordinate set. A principle of translation or scaling adjustment may be that displacement of an edge of the face of the target person relative to a surrounding region is as small as possible. The surrounding region includes a background region or a field of view edge region. For example, when a lowest point in the first coordinate set is located at a boundary of the field of view edge region and a lowest point in the second coordinate set excessively deviates from the boundary, the second coordinate set is translated so that the lowest point coincides with the boundary of the field of view edge region.

A coordinate difference between a first coordinate value and a second coordinate value is calculated to obtain the pixel displacement vector field of the face of the target person. The first coordinate value is a coordinate value that is in the first coordinate set and that corresponds to a first sampling point. The second coordinate value is a coordinate value that is in the second coordinate set and that corresponds to the first sampling point. The first sampling point is any one point of a plurality of same point clouds included in the first three-dimensional model and the second three-dimensional model.

The second three-dimensional model is obtained by transforming the pose and/or the shape of the first three-dimensional model. Therefore, the second three-dimensional model and the first three-dimensional model include a large quantity of same sampling points, and even sampling points included in the second three-dimensional model and the first three-dimensional model are exactly the same. In this way, a plurality of groups of coordinate values in the first coordinate set and the second coordinate set correspond to a same sampling point, that is, a sampling point corresponds to one coordinate value in the first coordinate set, and also corresponds to one coordinate value in the second coordinate set. A coordinate difference between the first coordinate value and the second coordinate value obtained after translation or scaling is calculated, to be specific, a coordinate difference between the first coordinate value and the second coordinate value on the x axis and a coordinate difference between the first coordinate value and the second coordinate value on the y axis are respectively calculated to obtain a coordinate difference of a first pixel. The pixel displacement vector field of the face of the target person may be obtained by calculating coordinate differences of all same sampling points included in the first three-dimensional model and the second three-dimensional model. The pixel displacement vector field includes the coordinate differences of all the sampling points.

In a possible implementation, when a coordinate difference between a coordinate value of a pixel in the surrounding region and a coordinate value that is in the second coordinate set and that corresponds to a pixel at an edge position of the face of the target person in the image is greater than the preset threshold, translation or scaling adjustment is performed on the coordinate value in the second coordinate set. The surrounding region is adjacent to the face of the target person.

Figure 8A:
FIG. 8A and FIG. 8B respectively illustrate examples of face projection effect at object distances of 30 cm and 55 cm according to an embodiment of the present disclosure.
Figure 8B:
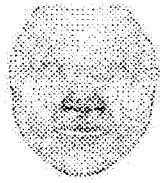

To keep the size and the position of the face of the target person consistent, when a background is distorted due to excessively large displacement (which may be measured based on the preset threshold) of the edge position of the face of the target person, a proper alignment point and scaling scale may be selected to perform translation or scaling adjustment on the coordinate values in the second coordinate set. FIG. 8A and FIG. 8B respectively illustrate examples of face projection effect at object distances of 30 cm and 55 cm.

The terminal obtains a transformed image based on the pixel displacement vector field of the face of the target person.

In a possible implementation, algorithm constraint correction is performed on the face of the target person, the field of view edge region, and the background region based on the pixel displacement vector field of the face of the target person to obtain the transformed image. The field of view edge region is a strip region located at an edge of the image. The background region is another region other that the face of the target person and the field of view edge region in the image.

The image is divided into three regions: a region occupied by the face of the target person, an edge region (that is, the field of view edge region) of the image, and a background region (that is, a background part outside the face of the target person, where the part does not include the edge region of the image).

In the present disclosure, initial image matrices respectively corresponding to the face of the target person, the field of view edge region, and the background region may be determined based on the pixel displacement vector field of the face of the target person. Constraint terms respectively corresponding to the face of the target person, the field of view edge region, and the background region are constructed, and a regular constraint term used in an image is constructed. Pixel displacement matrices respectively corresponding to the face of the target person, the field of view edge region, and the background region are obtained based on the regular constraint term, the constraint terms respectively corresponding to the face of the target person, the field of view edge region, and the background region, and a weight coefficient corresponding to each constraint term. The transformed image is obtained by color mapping based on the initial image matrices respectively corresponding to the face of the target person, the field of view edge region, and the background region, and the pixel displacement matrices respectively corresponding to the face of the target person, the field of view edge region, and the background region.

In a possible implementation, the pixel displacement vector field of the face of the target person is expanded by using an interpolation algorithm, to obtain a pixel displacement vector field of a mask region. The mask region includes the face of the target person. Algorithm constraint correction is performed on the mask region, the field of view edge region, and the background region based on the pixel displacement vector field of the mask region to obtain the transformed image.

The interpolation algorithm may include assigning a pixel displacement vector of the first sampling point to a second sampling point as a pixel displacement vector of the second sampling point. The second sampling point is any sampling point that is outside a face region of the target person and that is in the mask region. The first sampling point is a pixel that is on a boundary contour of the face of the target person and that is closest to a second pixel.

Figure 9:
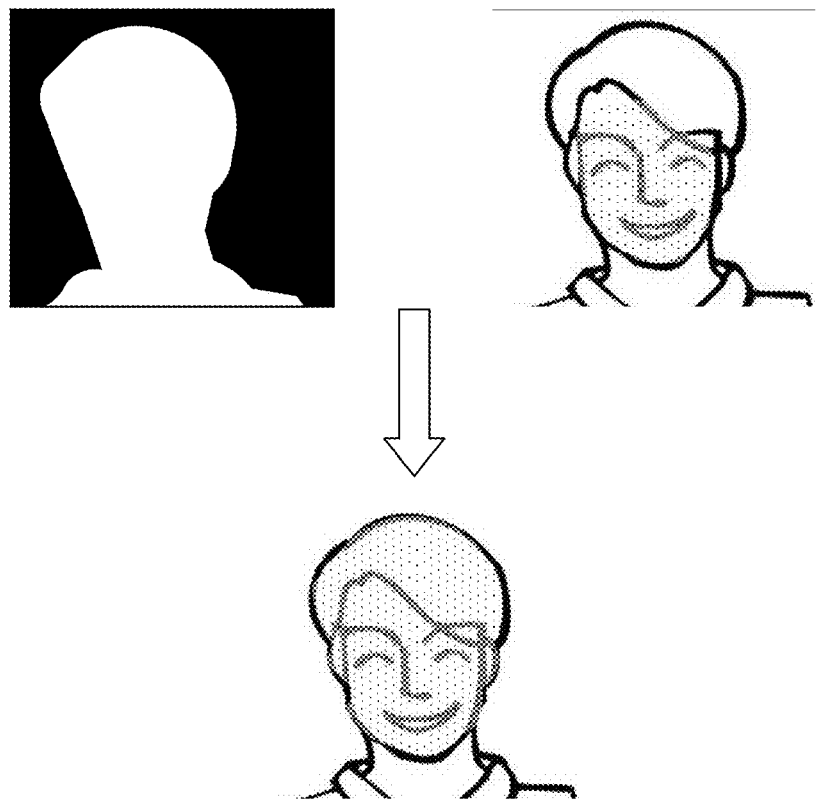
FIG. 9 is a schematic diagram of an example of a pixel displacement vector expansion method according to an embodiment of the present disclosure.

FIG. 9 is a schematic diagram of an example of a pixel displacement vector expansion method. As shown in FIG. 9, a target region is the face of the person, and the mask region is a head region of the person. The mask region includes the face of the person. The pixel displacement vector field of the face is expanded to the entire mask region by using the foregoing interpolation algorithm, to obtain the pixel displacement vector field of the mask region.

The image is divided into four regions. One is a region occupied by the face, and another is a partial region related to the face. The partial region may be correspondingly transformed as a pose and/or a shape of the target object changes. For example, when the face rotates, a head of the corresponding person also rotates. The face and the foregoing partial region form the mask region. The third is an edge region of the image (that is, the field of view edge region), and the fourth is a background region (that is, a background part outside the target object, where the part does not include the edge region of the image).

In the present disclosure, initial image matrices respectively corresponding to the mask region, the field of view edge region, and the background region may be determined based on the pixel displacement vector field of the mask region. Constraint terms respectively corresponding to the mask region, the field of view edge region, and the background region are constructed, and a regular constraint term used in an image is constructed. Pixel displacement matrices respectively corresponding to the mask region, the field of view edge region, and the background region are obtained based on the regular constraint term, the constraint terms respectively corresponding to the mask region, the field of view edge region, and the background region, and a weight coefficient corresponding to each constraint term. The transformed image is obtained by color mapping based on the initial image matrices respectively corresponding to the mask region, the field of view edge region, and the background region, and the pixel displacement matrices respectively corresponding to the mask region, the field of view edge region, and the background region.

The following separately describes the constraint terms corresponding to the mask region, the background region, and the field of view edge region, and the regular constraint term used in the global image.

(1) The constraint term corresponding to the mask region is used to constrain a target image matrix corresponding to the mask region in the image to approximate an image matrix obtained after geometric transformation is performed by using the pixel displacement vector field of the mask region in the foregoing step, to correct distortion in the mask region. The geometric transformation represents spatial mapping, that is, a pixel displacement vector field is mapped into another image matrix through transformation. The geometric transformation in the present disclosure may be at least one of image translation transformation (Translation), image scaling transformation (Scale), and image rotation transformation (Rotation).

For ease of description, the constraint term corresponding to the mask region may be referred to as a mask constraint term. When there is a plurality of target objects in the image, different target objects may correspond to different mask constraint terms.

The mask constraint term may be denoted as Term1, and a formula expression of Term1 is as follows:

$$\text{Term1}(i, j) = \text{SUM}_{(i,j) \in HeadRegionk} \|M0(i, j) + Dt(i, j) - \text{Func1}_k[M1(i, j)]\|$$

For an image matrix $M0(i,j)$ of a pixel located in the head region (in other words, $(i,j) \in \text{HeadRegionk}$), a coordinate value obtained after transformation of the target object is $M1(i, j) = [u1(i,j), v1(i, j)]^T$. $Dt(i, j)$ represents a displacement matrix corresponding to $M0(i, j)$, k represents a $k^{th}$ mask region of the image, $\text{Func1}_k$ represents a geometric transformation function corresponding to the $k^{th}$ mask region, and $\| \ldots \|$ represents a vector 2 norm.

It needs to be ensured, by using the mask constraint term Term1$(i, j)$, that under the action of the displacement matrix $Dt(i, j)$, the image matrix $M0(i, j)$ tends to be obtained by performing appropriate geometric transformation on $M1(i, j)$. The geometric transformation includes at least one transformation operation of image rotation, image translation, and image scaling.

The geometric transformation function $\text{Func1}_k$ corresponding to the $k^{th}$ mask region represents that all points in the $k^{th}$ mask region share a same geometric transformation function $\text{Func1}_k$, and different mask regions correspond to different geometric transformation functions. The geometric transformation function $\text{Func1}_k$ may be specifically represented as follows:

$$\text{Func1}_k[M_1(i, j)] = \begin{bmatrix} u1'(i, j) \\ v1'(i, j) \end{bmatrix} = \rho_{1k} \times \begin{bmatrix} \cos\theta_{1k} & -\sin\theta_{1k} \\ \sin\theta_{1k} & \cos\theta_{1k} \end{bmatrix} \times \begin{bmatrix} u1(i, j) \\ v1(i, j) \end{bmatrix} + \begin{bmatrix} TX_{1k} \\ TY_{1k} \end{bmatrix}$$

Herein, $\rho_{1k}$ represents a scaling coefficient of the $k^{th}$ mask region, $\theta_{1k}$ represents a rotation angle of the $k^{th}$ mask region, and $TX_{1k}$ and $TY_{1k}$ respectively represent horizontal displacement and longitudinal displacement of the $k^{th}$ mask region.

Term1($i, j$) may be specifically represented as follows:

$$\begin{aligned}\text{Term1}(i, j) &= SUM_{(i,j)\in HeadRegionk}\left\|\begin{bmatrix}u0(i, j)\\v0(i, j)\end{bmatrix}+\begin{bmatrix}du(i, j)\\dv(i, j)\end{bmatrix}-\begin{bmatrix}u1'(i, j)\\v1'(i, j)\end{bmatrix}\right\|\\
&= SUM_{(i,j)\in HeadRegionk}\left\|\begin{bmatrix}u0(i, j)+du(i, j)-u1'(i, j)\\v0(i, j)+dv(i, j)-v1'(i, j)\end{bmatrix}\right\|\\
&= SUM_{(i,j)\in HeadRegionk}\left\{\sqrt{(u0(i, j)+du(i, j)-u1'(i, j))^2+(v0(i, j)+dv(i, j)-v1'(i, j))^2}\right\}\end{aligned}$$

Herein, du(i, j) and dv(i, j) are unknown quantities that need to be solved. When a constraint equation is subsequently solved, it needs to be ensured that this term is as small as possible.

(2) The constraint term corresponding to the field of view edge region is used to constrain a pixel in the initial image matrix corresponding to the field of view edge region in the image to be displaced along an edge of the image or toward an outer side of the image, to maintain or expand the field of view edge region.

For ease of description, the constraint term corresponding to the field of view edge region may be referred to as a field of view edge constraint term. The field of view edge constraint term may be denoted as Term3, and a formula expression of Term3 is as follows:

Term3($i, j$)=SUM$_{(i, j)\in EdgeRegion}$∥M0($i, j$)+Dt($i, j$)−Fun3$_{(i, j)}$[M0($i, j$)]∥

M0($i, j$) represents image coordinates of a pixel located in the field of view edge region (in other words, $(i, j) \in EdgeRegion$), Dt(i, j) represents a displacement matrix corresponding to M0($i, j$), Func3$_{(i, j)}$ represents a displacement function of M0($i, j$), and ∥ . . . ∥ represents the vector 2 norm.

It needs to be ensured, by using the field of view edge constraint term, that under the action of the displacement matrix Dt(i, j), the image matrix M0($i, j$) tends to be obtained after the coordinate value M0($i, j$) is approximately displaced. A displacement rule is to approximately move the pixel only along the edge region or toward an outer side of the edge region, and avoid moving the pixel toward an inner side of the edge region, so that an image information loss caused by subsequent cropping into a rectangular shape can be minimized, and image content in the field of view edge region can even be expanded.

It is assumed that image coordinates of a pixel A located in the field of view edge region in the image are [u0, v0]$^T$, a tangential vector of the pixel A along a field of view boundary is represented as y(u0, v0), and a normal vector toward an outer side of the image is represented as x(u0, v0). When a boundary region is known, x(u0, v0) and y(u0, v0) are also known. In this case, Func3$_{(i, j)}$ presented as follows:

$$Func3_{(i,j)}[M_0(i, j)] = \begin{bmatrix}u0(i, j)+\alpha(u0(i, j), v0(i, j))\times x(u0(i, j), v0(i, j))\\v0(i, j)+\beta(u0(i, j), v0(i, j))\times y(u0(i, j), v0(i, j))\end{bmatrix}$$

Herein, α(u0(i, j), v0(i, j)), needs to be limited to not less than 0, to ensure that the pixel is not displaced toward the inside of the field of view edge. A positive or negative value of β(u0(i, j), v0(i, j)) does not need to be limited. α(u0(i, j), v0(i, j)) and β(u0(i, j), v0(i, j)) are intermediate unknown quantities for which solving does not need to be displayed.

Term3($i, j$) may be specifically represented as follows:

$$\begin{aligned}\text{Term3}(i, j) &= SUM_{(i,j)\in HeadRegion}\left\|\begin{bmatrix}u0(i, j)\\v0(i, j)\end{bmatrix}+\begin{bmatrix}du(i, j)\\dv(i, j)\end{bmatrix}-\begin{bmatrix}u0(i, j)+\alpha(u0, v0)\times x(u0, v0)\\v0(i, j)+\beta(u0, v0)\times y(u0, v0)\end{bmatrix}\right\|\\
&= SUM_{(i,j)\in HeadRegion}\left\|\begin{bmatrix}u0(i, j)+du(i, j)-u0(i, j)-\alpha(u0, v0)\times x(u0, v0)\\v0(i, j)+dv(i, j)-v0(i, j)-\beta(u0, v0)\times y(u0, v0)\end{bmatrix}\right\|\\
&= SUM_{(i,j)\in HeadRegion}\left\{\sqrt{(u0(i, j)+du(i, j)-u0(i, j)-\alpha(u0, v0)\times x(u0, v0))^2+(v0(i, j)+dv(i, j)-v0(i, j)-\beta(u0, v0)\times y(u0, v0))^2}\right\}\end{aligned}$$

Herein, du(i, j) and dv(i, j) are unknown quantities that need to be solved. When the constraint equation is subsequently solved, it needs to be ensured that this term is as small as possible.

(3) The constraint term corresponding to the background region is used to constrain a pixel in the image matrix corresponding to the background region in the image to be displaced and a first vector corresponding to the pixel before displacement and a second vector corresponding to the pixel after displacement to be parallel to each other as much as possible, so that the image content in the background region is smooth and consecutive, and the image content throughout a portrait in the background region is consecutive and consistent in human vision. The first vector represents a vector between the pixel before displacement and a neighboring pixel corresponding to the pixel before displacement. The second vector represents a vector between the pixel after displacement and a neighboring pixel corresponding to the pixel after displacement.

For ease of description, the constraint term corresponding to the background region may be referred to as a background constraint term. The background constraint term may be denoted as Term4, and a formula expression of Term4 is as follows:

Term4($i, j$)=SUM$_{(i, j)\in BkgRegion}$\{Fun4$_{(i, j)}$(M0($i, j$), M0($i, j$)+Dt($i, j$))\}

M0($i, j$) represents image coordinates of a pixel located in the background region (in other words, $(i, j) \in BkgRegion$), Dt(i, j) represents a displacement matrix corresponding to M0($i, j$), Func4$_{(i, j)}$ represents a displacement function of M0($i, j$), and ∥ . . . ∥ represents a vector 2 norm.

It needs to be ensured, by using the background constraint term, that under the action of the displacement matrix Dt(i, j), the coordinate value M0($i, j$) tends to be obtained after the coordinate value M0($i, j$) is approximately displaced. In the present disclosure, pixels in the background region may be divided into different control regions. A size, a shape, and a quantity of control regions are not limited in the present disclosure. In particular, a control region of a background pixel located at a boundary between the target object and the background needs to extend across the target object to the other end of the target object. It is assumed that there is a background pixel A and a control region, namely, a pixel set {Bi}, of the pixel A, the control region is a neighborhood of the pixel A, and the control region of the pixel A extends across a middle mask region to the other end of the mask region. Bi represents a neighborhood pixel of A, and A and Bi are respectively moved to ' and {'} when A and Bi are displaced. A displacement rule is that the background constraint term is used to constrain a vector and a vector " to be parallel to each other as much as possible in terms of a direction, so that it can be ensured that smooth transition is implemented between the target object and the background region, and the image content throughout the portrait in the background region can be consecutive and consistent in human vision, to avoid a phenomenon such as distortion/deformation, a hole, or a phenomenon of interlacing in a background image. In this case, $Func4_{(i,j)}$ may be specifically represented as follows:

$$Func4_{(i,j)}[M_0(i,j), M_0(i,j) + t(i,j)] = Func4_{(i,j)}\left[\begin{bmatrix} u0(i,j) \\ v0(i,j) \end{bmatrix}, \begin{bmatrix} u0(i,j) + du(i,j) \\ v0(i,j) + dv(i,j) \end{bmatrix}\right]$$
$$= SUM_{(i+di,j+dj)\in CtrlRegion}\{angle[vec1, vec2]\}$$

where $$vec1 = \begin{bmatrix} u0(i,j) - u0(i+di, j+dj) \\ v0(i,j) - v0(i+di, j+dj) \end{bmatrix},$$

$$vec2 = \begin{bmatrix} u0(i,j) + du(i,j) - u0(i+di, j+dj) - du(i+di, j+dj) \\ v0(i,j) + dv(i,j) - v0(i+di, j+dj) - dv(i+di, j+dj) \end{bmatrix}, \text{ and}$$

$$angle[vec1, vec2] = \arccos\left(\frac{vec1 \cdot vec2}{|vec1| \cdot |vec2|}\right).$$

Herein, angle[] represents an included angle between two vectors, vec1 represents a vector that includes a background pixel $[i, j]^T$ before correction and a point in a control region of the pixel, vec2 represents a vector that includes the background pixel $[i, j]^T$ after correction and a pixel after correction in the control region of the pixel, and $SUM_{(i+di, j+dj)\in CtrlRegion}$ represents summation of included angles between all vectors in the control region.

Term4(i, j) may be specifically represented as follows:

Term4(i, j)=$SUM_{(i,j)\in Bkg\ Region}\{SUM_{(i+di,\ j+dj)\in Ctrl\ Region}$ {angle[vec1 ,vec2]}}

Herein, du(i, j) and dv(i, j) are unknown quantities that need to be solved. When the constraint equation is subsequently solved, it needs to be ensured that this term is as small as possible.

(4) The regular constraint term is used to constrain a difference between displacement matrices of any two adjacent pixels in the displacement matrices respectively corresponding to the background region, the mask region, and the field of view edge region in the image to be less than the preset threshold, so that global image content of the image is smooth and consecutive.

The regular constraint term may be denoted as Term5, and a formula expression of Term5 is as follows:

Term5(i, j)=$SUM_{(i,\ j)\in AllRegion}\{Func5_{(i,\ j)}(Dt(i,j))\}$

For a pixel $M_0(i, j)$ in an entire image range (in other words $^{(i,\ j)\ \in\ AllRegion}$), it needs to be ensured, by using the regular constraint term, that displacement matrices Dt(i, j) of adjacent pixels are smooth and consecutive, to avoid a great local change. A constraint principle is that a difference between displacement at a pixel $[i, j]^T$ and displacement at a neighbor pixel (i+di, j+dj) should be as small as possible (that is, less than a threshold). In this case, $Func5_{(i,j)}$ may be specifically represented as follows:

$$Func5_{(i,j)}(Dt(i,j)) = SUM_{(i+di,j+dj)\in NeighborRegion}$$
$$\left\{\sqrt{(du(i,j) - du(i+di, j+dj))^2 + (dv(i,j) - dv(i+di, j+dj))^2}\right\}$$

Term5(i, j) may be specifically represented as follows:

$$Term5(i,j) = SUM_{(i,j)\in AllRegion}\Big\{SUM_{(i+di,j+dj)\in NeighborRegion}$$
$$\left\{\sqrt{(du(i,j) - du(i+di, j+dj))^2 + (dv(i,j) - dv(i+di, j+dj))^2}\right\}\Big\}$$

Herein, du(i, j) and dv(i, j) are unknown quantities that need to be solved. When the constraint equation is subsequently solved, it needs to be ensured that this term is as small as possible.

Displacement matrices respectively corresponding to all regions are obtained based on all constraint terms and weight coefficients corresponding to the constraint terms.

Specifically, the weight coefficients may be set for the regular constraint term and the constraint terms corresponding to the mask region, the field of view edge region, and the background region, the constraint equation is established based on the constraint terms and the corresponding weight coefficients, and the constraint equation is solved. In this way, an offset of each position point in each region may be obtained.

It is assumed that a coordinate matrix (which may also be referred to as a target image matrix) of an image obtained after algorithm constraint correction is Mt(i, j). Mt(i, j)=[ut (i, j), vt(i, j)]$^T$. A displacement matrix of the image with respect to the image matrix $M0(i, j)$ is Dt(i, j). Dt(i, j)=[du(i, j), dv(i, j)]$^T$. In other words, Mt(i, j)=M0(i, j)+Dt(i, j), ut(i, j)=u0(i, j)+du(i, j), and vt(i, j)=v0(i, j)+dv(i, j).

The weight coefficients are assigned to the constraint terms, and the following constraint equation is constructed:

$$Dt(i, j) = (du(i, j), dv(i, j))$$
$$= \arg\min(\alpha 1(i, j) \times \text{Term1}(i, j) + \alpha 2(i, j) \times \text{Term2}(i, j) + \alpha 3(i, j) \times \text{Term3}(i, j) + \alpha 4(i, j) \times \text{Term4}(i, j) + \alpha 5(i, j) \times \text{Term5}(i, j))$$

Herein, $\alpha 1(i, j)$ to $\alpha 5(i, j)$ are the weight coefficients (weight matrices) respectively corresponding to Term1 to Term5.

The constraint equation is solved by using a least square method, a gradient descent method, or various improved algorithms to finally obtain a displacement matrix Dt(i, j) of each pixel in the image. The transformed image may be obtained based on the displacement matrix Dt(i, j).

In the present disclosure, three-dimensional transformation effect of an image is implemented by using a three-dimensional model, and perspective distortion correction is performed on a face of a target person in an image photographed at a short distance, so that relative proportions and relative positions of facial features of the corrected face of the target person are closer to relative proportions and relative positions of the facial features of the face of the target person. This can significantly improve photographing and imaging effect in a selfie scenario.

In a possible implementation, for a video recording scenario, the terminal may separately perform distortion correction processing on a plurality of image frames in a recorded video by using the method in the embodiment shown in FIG. 3, to obtain a video after distortion correction. The terminal may directly play the video after distortion correction on the screen, or the terminal may display, in a split-screen manner, the video before distortion correction in a part of a region on the screen, and the video after distortion correction in another part of the region on the screen. Refer to FIG. 12F.

Figure 10:
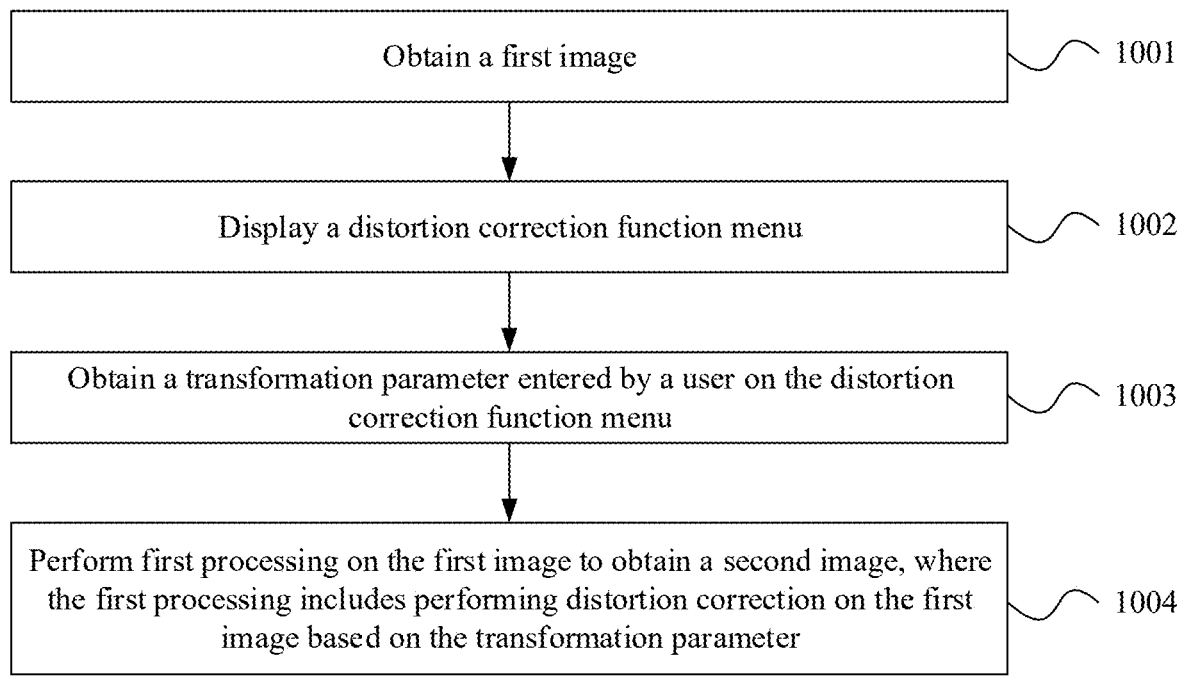
FIG. 10 is a flowchart of Embodiment 2 of an image transformation method according to an embodiment of the present disclosure.

FIG. 10 is a flowchart of Embodiment 2 of an image transformation method according to the present disclosure. As shown in FIG. 10, the method in this embodiment may be applied to the application architecture shown in FIG. 1, and may be performed by the terminal shown in FIG. 2. The image transformation method may include the following steps.

Step 1001: Obtain a first image.

In the present disclosure, the first image has been stored in a gallery of a second terminal. The first image may be a photo taken by the second terminal, or may be a frame of image in a video photographed by the second terminal. A manner of obtaining the first image is not specifically limited in the present disclosure.

It should be noted that a first terminal and the second terminal that currently perform distortion correction processing on the first image may be a same device, or may be different devices.

In a possible implementation, as a device for obtaining the first image, the second terminal may be any device having a photographing function, for example, a camera or a video camera. The second terminal stores the photographed image locally or in a cloud. As a processing device for performing distortion correction on the first image, the first terminal may be any device having an image processing function, for example, a mobile phone, a computer, or a tablet computer. The first terminal may receive the first image from the second terminal or the cloud in a wired or wireless communication manner. The first terminal may alternatively obtain, by using a storage medium (for example, a USB flash drive), the first image photographed by the second terminal.

In a possible implementation, the first terminal has both a photographing function and an image processing function, and may be, for example, a mobile phone or a tablet computer. The first terminal obtains the first image from a local gallery. Alternatively, the first terminal photographs and obtains the first image based on an instruction triggered when a shutter is touched.

In a possible implementation, the first image includes a face of a target person. The reason that the face of the target person in the first image is distorted is that: when the second terminal photographs the first image, a target distance between the face of the target person and the second terminal is less than a first preset threshold, that is, when the second terminal photographs the first image, a target distance between the face of the target person and a camera is small. Generally, because a distance between a face and a front-facing camera is small when the front-facing camera is used to take a selfie, there is a perspective distortion problem that "the face looks big when near and small when in a distance". For example, when a target distance between the face of the target person and the front-facing camera is excessively small, a nose on the face may be larger and the face may be elongated due to different distances between the camera and different parts of the face. However, when the distance between the face of the target person and the front-facing camera is large, the foregoing problems may be reduced. Therefore, in the present disclosure, a threshold is set. It is considered that when the distance between the face of the target person and the front-facing camera is less than the threshold, the obtained first image including the face of the target person is distorted, and distortion correction needs to be performed on the first image. A value range of the preset threshold is within 80 cm. Optionally, the preset threshold may be set to 50 cm. It should be noted that a specific value of the preset threshold may be determined based on performance of the front-facing camera, photographing illumination, and the like. This is not specifically limited in the present disclosure.

The target distance between the face of the target person and the camera may be a distance between a most front part (for example, a nose) on the face of the target person and the camera. Alternatively, the target distance between the face of the target person and the camera may be a distance between a specified part (for example, an eye, a mouth, or a nose) on the face of the target person and the camera. Alternatively, the target distance between the face of the target person and the camera may be a distance between a central position (for example, a nose on a front photo of the target person, or a cheekbone position on a side photo of the target person) on the face of the target person and the camera. It should be noted that the target distance may be defined depending on a specific situation of the first image. This is not specifically limited in the present disclosure.

The terminal may obtain the target distance based on a screen-to-body ratio of the face of the target person in the first image and an FOV of a camera of the second terminal. It should be noted that, when the second terminal includes a plurality of cameras, after the first image is photographed, information about a camera that photographs the first image is recorded in EXIF information. Therefore, the FOV of the second terminal is an FOV of the camera recorded in the EXIF information. For a principle of obtaining the target distance, refer to the foregoing step 302. Details are not described herein again. The FOV may be obtained based on the FOV in the EXIF information of the first image, or may be calculated based on an equivalent focal length in the EXIF information, for example, fov=2.0×a tan(43.27/2f). 43.27 is a diagonal length of a 135 mm film, and f represents the equivalent focal length. Alternatively, the terminal may obtain the target distance based on a target photographing distance stored in the EXIF information of the first image. An EXIF is specially set for a photo from a digital camera, and may record attribute information and photographing data of the digital photo. The terminal may directly read, from the EXIF information, data such as the target photographing distance, the FOV, or the equivalent focal length during photographing of the first image, to obtain the target distance. For a principle of obtaining the target distance, refer to the foregoing step 302. Details are not described herein again.

In a possible implementation, the first image includes the face of the target person. The reason that the face of the target person in the first image is distorted is that: when the second terminal photographs the first image, the FOV of the camera is greater than a second preset threshold and a pixel distance between the face of the target person and an edge of the FOV is less than a third preset threshold. If the camera of the terminal is a wide-angle camera, distortion is also caused when the face of the target person is located at an edge position of the FOV of the camera, and distortion is reduced or even disappears when the face of the target person is located at a middle position of the FOV of the camera. Therefore, in the present disclosure, two thresholds are set. It is considered that when the FOV of the camera of the terminal is greater than a corresponding threshold and the pixel distance between the face of the target person and the edge of the FOV is less than a corresponding threshold, the obtained first image including the face of the target person is distorted, and distortion correction needs to be performed on the first image. The threshold corresponding to the FOV is 90°, and the threshold corresponding to the pixel distance is one quarter of a length or a width of the first image. It should be noted that a specific value of the threshold may be determined based on performance of the camera, photographing illumination, and the like. This is not specifically limited in the present disclosure.

The pixel distance may be a quantity of pixels between the most front part on the face of the target person and a boundary of the first image. Alternatively, the pixel distance is a quantity of pixels between the specified part on the face of the target person and a boundary of the first image. Alternatively, the pixel distance is a quantity of pixels between a central position on the face of the target person and a boundary of the first image.

Step 1002: Display a distortion correction function menu.

When the face of the target person is distorted, the terminal displays a pop-up window. The pop-up window is used to provide a control for selecting whether to perform distortion correction, for example, as shown in FIG. 13C. Alternatively, the terminal displays a distortion correction control. The distortion correction control is used to open the distortion correction function menu, for example, as shown in FIG. 12D. When a user taps a "Yes" control, or taps the distortion correction control, the distortion correction function menu is displayed in response to an instruction generated by a user operation.

Figure 11:
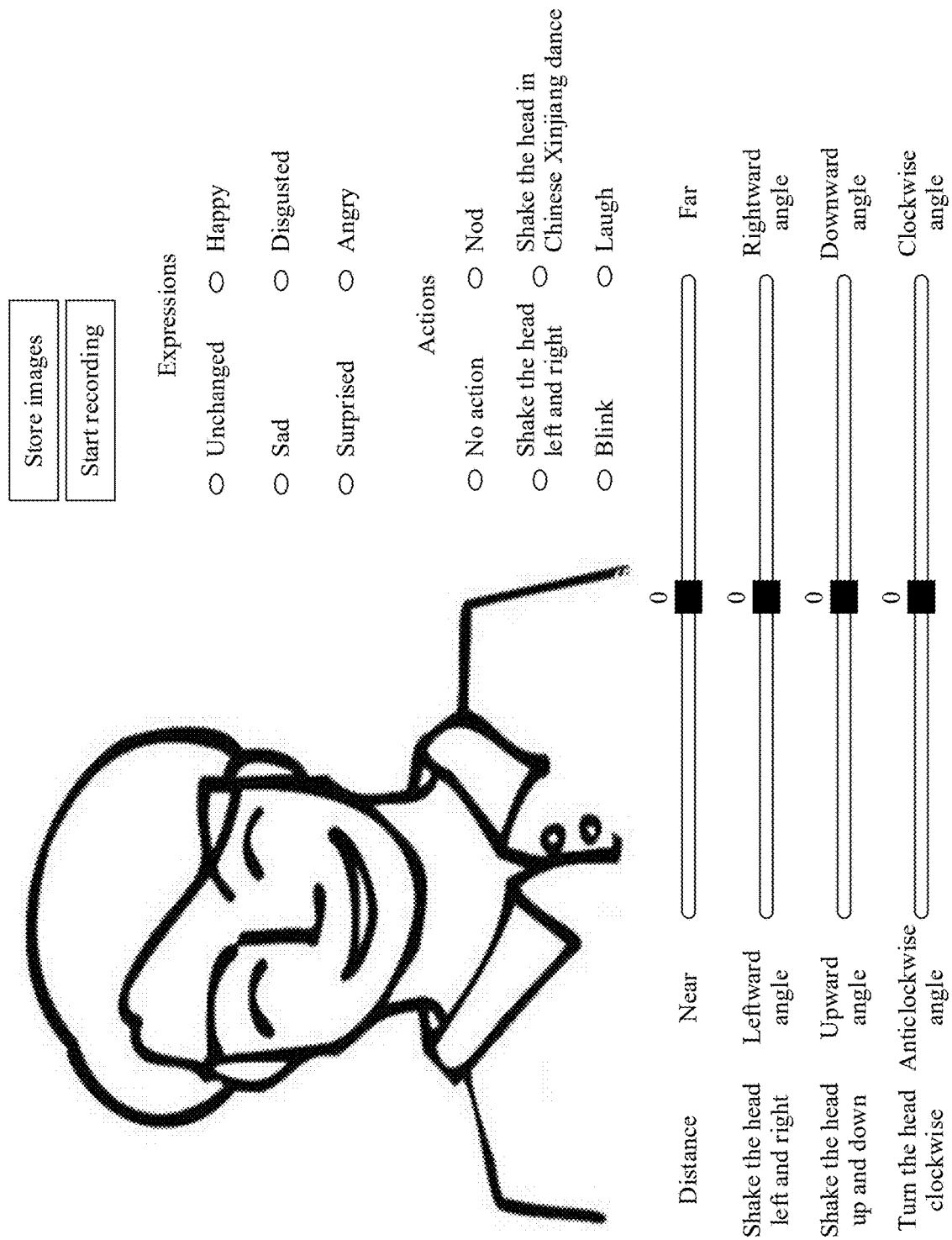
FIG. 11 is a schematic diagram of an example of a distortion correction function menu; according to an embodiment of the present disclosure

This application provides the distortion correction function menu. The function menu includes an option for changing a transformation parameter, for example, an option for adjusting an equivalent simulation photographing distance, a displacement distance adjustment option, and an option for adjusting relative positions and/or relative proportions of facial features. For these options, a corresponding transformation parameter may be adjusted in a manner of a slider or a control, to be specific, a value of the transformation parameter may be changed by adjusting a position of a slider, or a selected value of the transformation parameter may be determined by triggering a control. When the distortion correction function menu is initially displayed, a value of the transformation parameter in each option on the menu may be a default value, or may be a pre-calculated value. For example, a slider corresponding to the equivalent simulation photographing distance may be initially located at a position whose value is 0, as shown in FIG. 11. Alternatively, the terminal obtains an adjustment value of the equivalent simulation photographing distance according to an image transformation algorithm, and displays a slider at a position of a value corresponding to the adjustment value, as shown in FIG. 13E.

FIG. 11 is a schematic diagram of an example of the distortion correction function menu. As shown in FIG. 11, the function menu includes four regions: A left part of the function menu is used to display the first image, and the first image is placed under a coordinate axis including x, y and z axes. An upper right part of the function menu includes two controls, one is used to store an image, and the other is used to start a transformation process of a recorded image, so that a corresponding operation can be enabled by triggering the control. A lower right part of the function menu includes expression controls and action controls. Available expression templates below the expression controls include six expressions: unchanged, happy, sad, disgusted, surprised, and angry. When the user taps a corresponding expression control, it indicates that this expression template is selected, and the terminal may change the relative proportions and the relative positions of the facial features of the face in the left image based on the selected expression template. For example, if the person is happy, the eyes on the face usually become smaller, and corners of the mouth stretch up. If the person is surprised, the eyes and mouth usually become bigger. If the person is angry, eyebrows are usually frown, and both the corners of the eyes and the corners of the mouth stretch down. Available action templates below the action controls include six actions: No action, nod, shake the head left and right, shake the head in Chinese Xinjiang dance, blink, and laugh. When the user taps a corresponding action control, it indicates that this action template is selected, and the terminal may change the facial features of the face in the left image based on the selected action template for a plurality of times according to the sequence of actions. For example, nod usually includes two actions: lowering the head and raising the head. Shake the head left and right usually includes two actions: shake the head to the left and shake the head to the right. Blink usually includes two actions: closing the eyes and opening the eyes. A lower part of the function menu includes four sliders, which respectively correspond to distance, shake the head left and right, shake the head up and down, and turn the head clockwise. The distance between the face and the camera may be adjusted by moving, left and right, a position of the slider corresponding to distance. A direction (leftward or rightward) and an angle of shaking the head on the face may be adjusted by moving, left and right, a position of the slider corresponding to shake the head left and right. A direction (upward or downward) and an angle of shaking the head on the face may be adjusted by moving, left and right, a position of the slider corresponding to shake the head up and down. An angle of turning the head on the face clockwise or anticlockwise may be adjusted by moving, left and right, a position of the slider corresponding to turn the head clockwise. The user may adjust values of corresponding transformation parameters by controlling the foregoing one or more sliders or controls. The terminal obtains the value of the corresponding transformation parameter after detecting a user operation.

Step 1003: Obtain a transformation parameter entered by the user on the distortion correction function menu.

The transformation parameter is obtained based on an operation performed by the user on an option included in the distortion correction function menu (for example, a dragging operation performed by the user on a slider associated with the transformation parameter, and/or a triggering operation performed by the user on a control associated with the transformation parameter).

In a possible implementation, the distortion correction function menu includes the displacement distance adjustment option. Obtaining the transformation parameter entered by the user on the distortion correction function menu includes obtaining an adjustment direction and a displacement distance based on an instruction triggered by an operation performed by the user on a control or a slider in the displacement distance adjustment option.

In a possible implementation, the distortion correction function menu includes the option for adjusting relative positions and/or relative proportions of facial features. Obtaining the transformation parameter entered by the user on the distortion correction function menu includes obtaining an adjustment direction, a displacement distance, and/or facial dimensions based on an instruction triggered by an operation performed by the user on a control or a slider in the option for adjusting relative positions and/or relative proportions of facial features.

In a possible implementation, the distortion correction function menu includes an angle adjustment option. Obtaining the transformation parameter entered by the user on the distortion correction function menu includes obtaining an adjustment direction and an adjustment angle based on an instruction triggered by an operation performed by the user on a control or a slider in the angle adjustment option.

In a possible implementation, the distortion correction function menu includes an expression adjustment option. Obtaining the transformation parameter entered by the user on the distortion correction function menu includes obtaining a new expression template based on an instruction triggered by an operation performed by the user on a control or a slider in the expression adjustment option.

In a possible implementation, the distortion correction function menu includes an action adjustment option. Obtaining the transformation parameter entered by the user on the distortion correction function menu includes obtaining a new action template based on an instruction triggered by an operation performed by the user on a control or a slider in the action adjustment option.

Step 1004: Perform first processing on the first image to obtain a second image. The first processing includes performing distortion correction on the first image based on the transformation parameter.

The terminal performs perspective distortion correction on the first image based on the transformation parameter to obtain the second image. The face of the target person in the second image is closer to a real appearance of the face of the target person than the face of the target person in the first image, to be specific, relative proportions and relative positions of facial features of the target person in the second image are closer to relative proportions and relative positions of the facial features of the face of the target person than relative proportions and the relative positions of the facial features of the target person in the first image.

In the second image obtained by performing perspective distortion correction on the first image, a case in which the facial features of the face of the target person change in size, stretch, and the like can be eliminated. Therefore, the relative proportions and the relative positions of the facial features of the face of the target person in the second image are close to or even restored to the relative proportions and the relative positions of the real appearance of the face of the target person.

In a possible implementation, the terminal may further obtain a recording instruction based on a triggering operation performed by the user on a recording start control, and then start recording of a process of obtaining the second image. In this case, the recording start control changes to a recording stop control. The user triggers the recording stop control, and the terminal may receive a recording stop instruction to stop recording.

A recording process in the present disclosure may include at least two scenarios as follows:

In a scenario, for the first image, before starting distortion correction, the user taps the recording start control, and the terminal enables a screen recording function in response to an instruction generated by this operation, that is, records a screen of the terminal. In this case, the user taps the control on the distortion correction function menu or drags the slider on the distortion correction function menu to set the transformation parameter. With the user operation, the terminal performs distortion correction processing or other transformation processing on the first image based on the transformation parameter, and then displays the processed second image on the screen. A process of the operation performed on the control or the slider on the distortion correction function menu to a transformation process from the first image to the second image are all recorded by the screen recording function of the terminal. After the user taps the recording stop control, the terminal disables the screen recording function. In this case, the terminal obtains the video of the foregoing processes.

In another scenario, for a video, before starting distortion correction, the user taps the recording start control, and the terminal enables a screen recording function in response to an instruction generated by this operation, that is, records a screen of the terminal. In this case, the user taps the control on the distortion correction function menu or drags the slider on the distortion correction function menu to set the transformation parameter. With the user operation, the terminal separately performs distortion correction processing or other transformation processing on a plurality of image frames in the video based on the transformation parameter, and then plays the processed video on the screen. A process of the operation performed on the control or the slider on the distortion correction function menu to a process of playing the processed video are all recorded by the screen recording function of the terminal. After the user taps the recording stop control, the terminal disables the screen recording function. In this case, the terminal obtains the video of the foregoing processes.

In a possible implementation, the terminal may further obtain a storage instruction based on a triggering operation performed by the user on an image storage control, and then store a currently obtained image in the gallery.

In the present disclosure, for a process of performing perspective distortion correction on the first image to obtain the second image, refer to the description in the step 303. A difference lies in that: In the present disclosure, in addition to image transformation performed for backward movement of the face of the target person, image transformation may be further performed for other transformations of the face of the target person, for example, shaking the head, changing an expression, or changing an action. On this basis, in addition to distortion correction performed on the first image, any transformation may be further performed on the first image. Even if the first image is not distorted, the face of the target person may also be transformed based on the transformation parameter entered by the user on the distortion correction function menu, so that the face of the target person in the transformed image is closer to an appearance under the transformation parameter selected by the user.

In a possible implementation, in the step 1001, in addition to obtaining the first image including the face of the target person, annotation data of the first image may be further obtained, for example, an image segmentation mask, an annotation box position, and a feature point position. In the step 1003, after the transformed second image is obtained, the annotation data may be further transformed in a transformation manner that is the same as that in the step 1003, to obtain a new annotation file.

In this way, the gallery with annotation data may be expanded, that is, various transformed images are generated by using one image, and the transformed image does not need to be manually labeled again. In addition, the transformed image is natural and authentic, and is greatly different from the original image. This facilitates deep learning training.

In a possible implementation, in the step 1003, a transformation manner for a first three-dimensional model is specified. For example, it is specified that the first three-dimensional model is moved leftwards or rightwards by about 6 cm (a distance between a left eye and a right eye on a face). After the transformed second image is obtained, the first image and the second image are respectively used as inputs of a left eye and a right eye of a VR device, so that three-dimensional display effect of a target subject can be implemented.

In this way, a common two-dimensional image or video may be converted into a VR input source, to implement three-dimensional display effect of the face of the target person. Because a depth of the three-dimensional model is considered, the three-dimensional effect of the entire target object can be implemented.

In the present disclosure, three-dimensional transformation effect of an image is implemented by using a three-dimensional model, and perspective distortion correction is performed on a face of a target person in an image that is in the gallery and that is photographed at a short distance, so that relative proportions and relative positions of facial features of the corrected face of the target person are closer to relative proportions and relative positions of the facial features of the face of the target person. This can change imaging effect. Further, corresponding transformation is performed on the face of the target person based on the transformation parameter entered by the user, so that diversified transformation of the face can be implemented, and virtual transformation of the image can be implemented.

It should be noted that, in the foregoing embodiment, the three-dimensional model is established for the face of the target person in the image, to implement distortion correction of the face. The image transformation method provided in the present disclosure may be further applied to distortion correction of any other target object. A difference lies in that an object for establishing the three-dimensional model changes from the face of the target person to the target object. Therefore, an object of image transformation is not specifically limited in the present disclosure.

The following describes the image transformation method in the present disclosure by using two specific embodiments.

Embodiment 1: FIG. 12A to FIG. 12F illustrate examples of a distortion correction process performed by the terminal in a selfie scenario.

Figure 12A:
FIG. 12A to FIG. 12F illustrate examples of a distortion correction process performed by a terminal in a selfie scenario according to an embodiment of the present disclosure.

As shown in FIG. 12A, the user taps a camera icon on a desktop of the terminal to enable a camera.

Figure 12B:
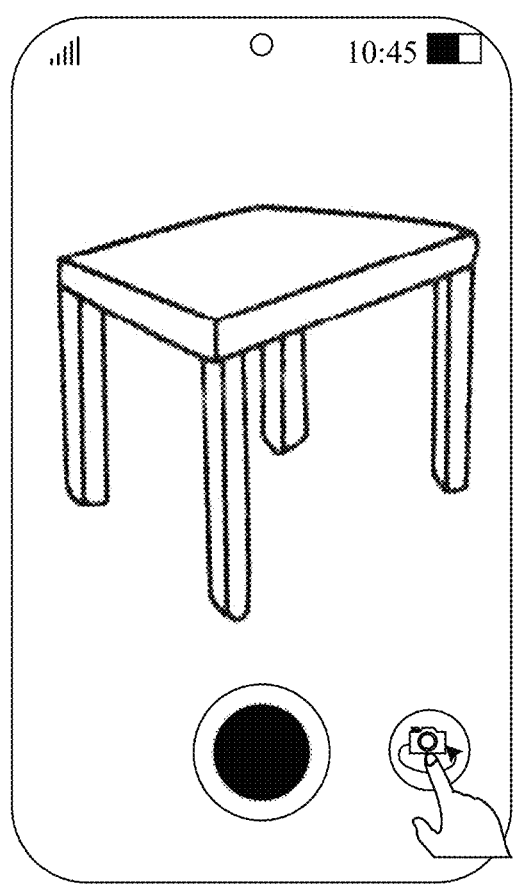

As shown in FIG. 12B, a rear-facing camera of the camera is enabled by default, and an image that is of a target scenario and that is obtained by the rear-facing camera is displayed on the screen of the terminal. The user taps a camera conversion control on a photographing function menu, to switch the camera to the front-facing camera.

Figure 12C:
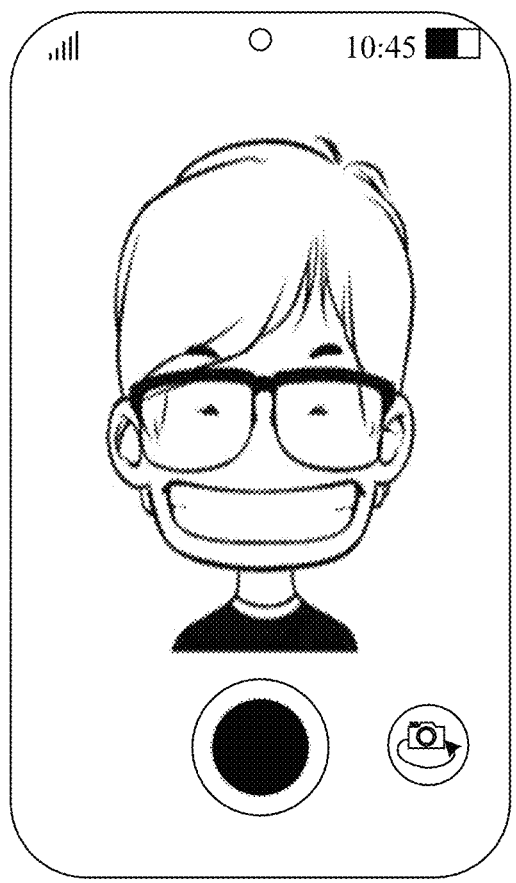
Figure 12D:
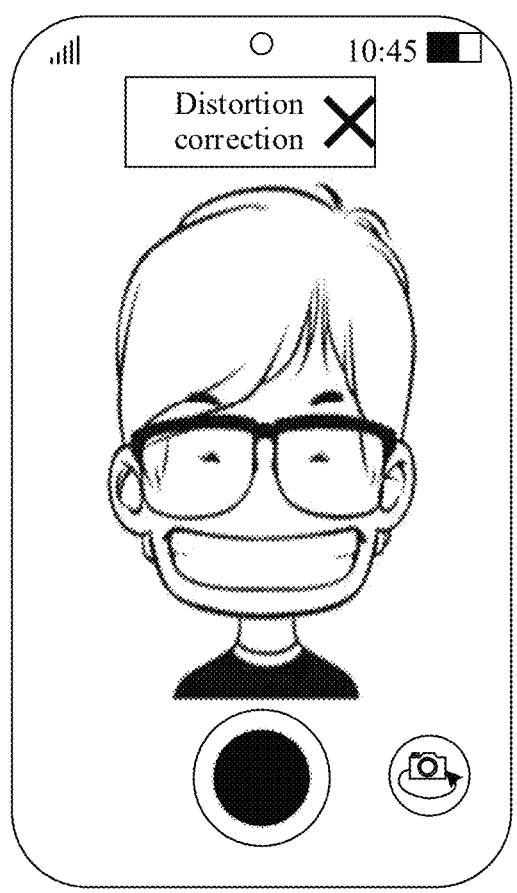

As shown in FIG. 12C, a first image that is of the target scenario and that is obtained by the front-facing camera is displayed on the screen of the terminal. The target scenario includes the face of the user.

When the distance between the face of the target person in the first image and the front-facing camera is less than the preset threshold, there are three cases as follows:

In one case, the terminal performs distortion correction on the first image by using the image transformation method in the embodiment shown in FIG. 3 to obtain the second image. Because the shutter is not triggered, the second image is displayed as a preview image on the screen of the terminal. As shown in FIG. 12D, in this case, the terminal displays "distortion correction" on the screen, and displays a close control. If the user does not need to display the corrected preview image, the user may tap the close control. After the terminal receives a corresponding instruction, the first image is displayed as the preview image on the screen.

Figure 12E:
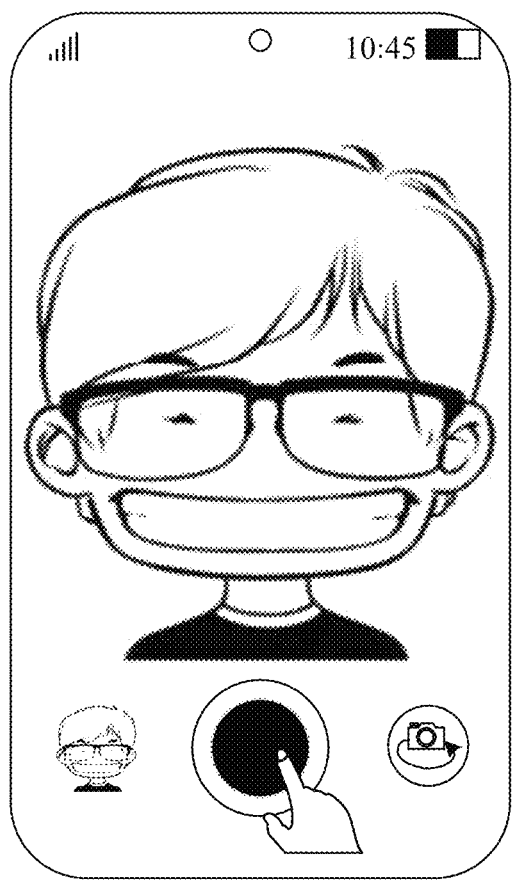
Figure 12F:
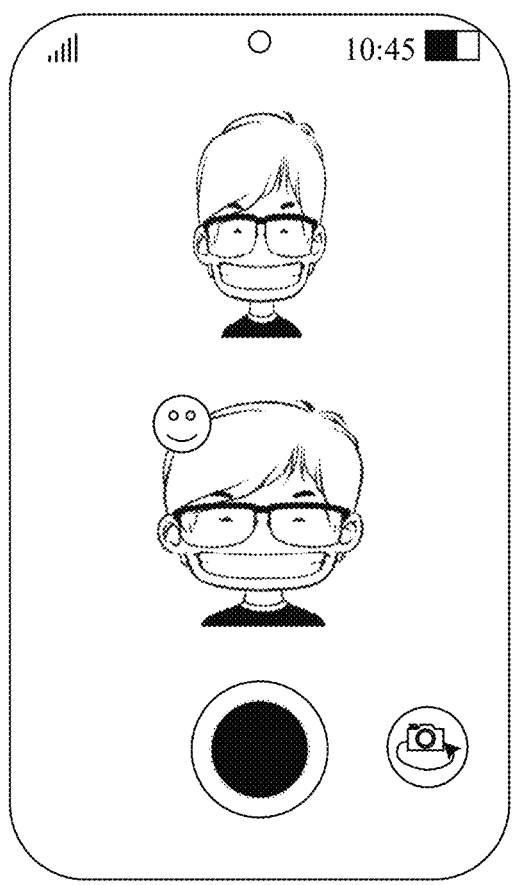

In another case, as shown in FIG. 12E, the user taps a shutter control on the photographing function menu, and the terminal performs distortion correction on the photographed image (the first image) by using the method in the embodiment shown in FIG. 3, to obtain the second image. In this case, the second image is stored in the gallery.

In a third case, as shown in FIG. 12F, the terminal performs distortion correction on the first image by using the method in the embodiment shown in FIG. 3 to obtain the second image. Because the shutter is not triggered, the terminal displays both the first image and the second image as preview images on the screen of the terminal, the user may intuitively see a difference between the first image and the second image.

Embodiment 2: FIG. 13A to FIG. 13H illustrate an example of a distortion correction process of an image in the gallery.

Figure 13A:
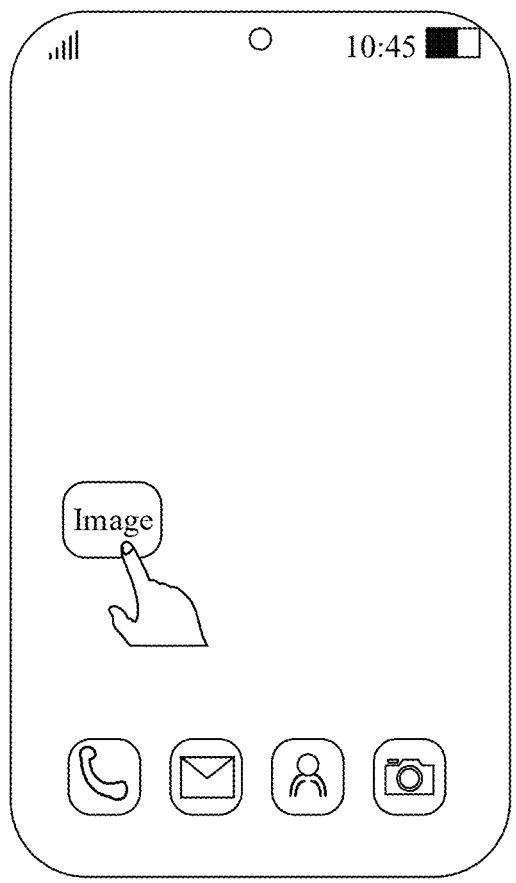
FIG. 13A to FIG. 13N illustrate examples of possible interfaces in a distortion correction process of an image according to an embodiment of the present disclosure.

As shown in FIG. 13A, the user taps a gallery icon on a desktop of the terminal to start the gallery.

Figure 13B:
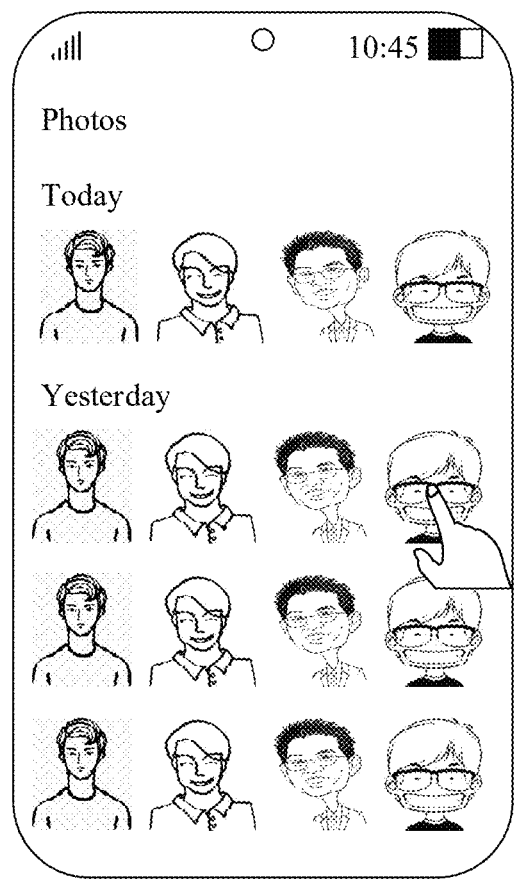
Figure 13C:
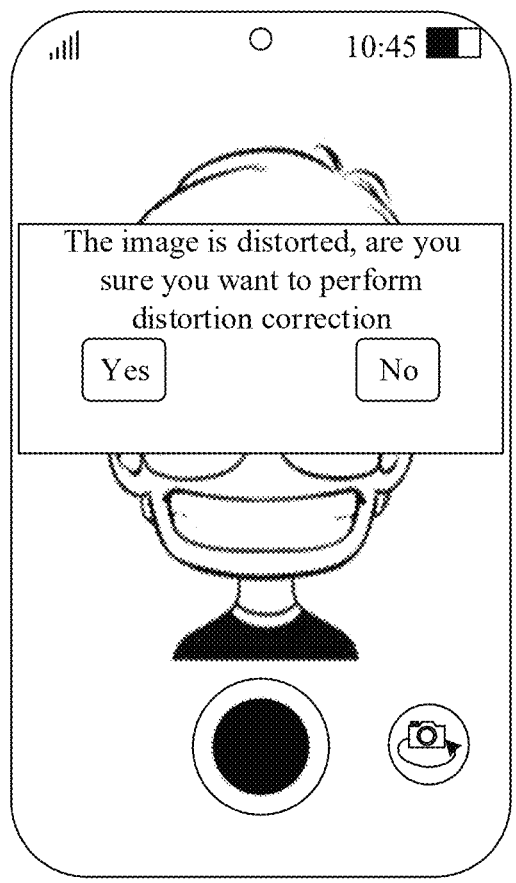

As shown in FIG. 13B, the user selects, from the gallery, the first image on which distortion correction needs to be performed. When the first image is photographed, the distance between the face of the target person and the camera is less than the preset threshold. Information about the distance may be obtained by using the distance obtaining method in the method embodiment shown in FIG. 10, and details are not described herein again.

As shown in FIG. 13C, when the terminal detects that the face of the target person in the currently displayed image is distorted, a pop-up window may be displayed on the screen. "The image is distorted, are you sure you want to perform distortion correction" is displayed on the pop-up window, and "Yes" and "No" controls are displayed below this line of words. When the user taps "Yes", the distortion correction function menu is displayed. It should be noted that FIG. 13C provides an example of the pop-up window for the user to select whether to perform distortion correction, and does not constitute a limitation on an interface or displayed content on the pop-up window. For example, word content, a word size, and a word font displayed on the pop-up window, content on the two "Yes" and "No" controls, and the like may be implemented in another manner. An implementation of the pop-up window is not specifically limited in the present disclosure.

When the terminal detects that the face of the target person in the currently displayed image is distorted, a control may alternatively be displayed on the screen, as shown in FIG. 12D. The control is used to open or close the distortion correction function menu. It should be noted that FIG. 12D provides an example of a triggering control on the distortion correction function menu, and does not constitute a limitation on an interface or displayed content on the pop-up window. For example, a position of the control, content on the control, and the like may be implemented in another manner. An implementation of the control is not specifically limited in the present disclosure.

Figure 13D:
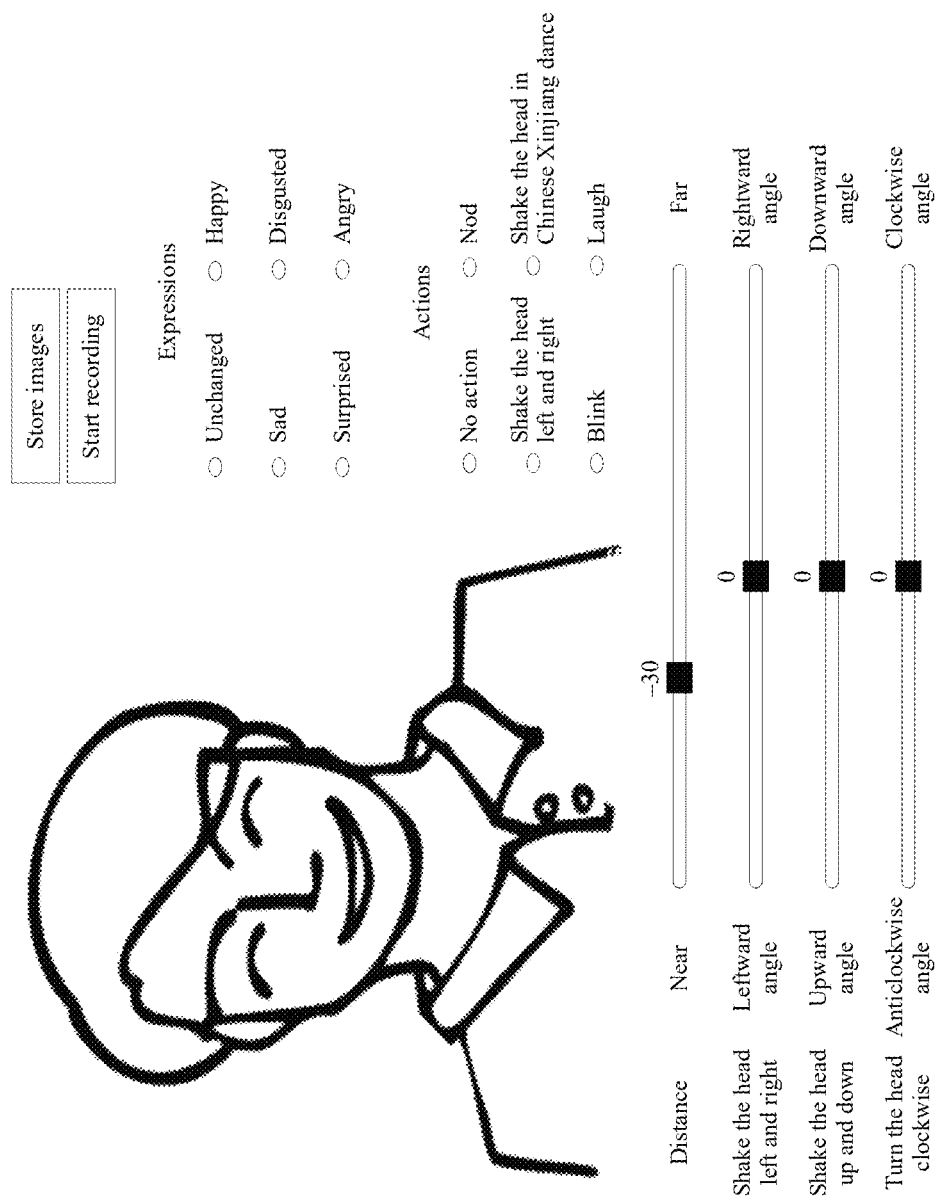
Figure 13E:
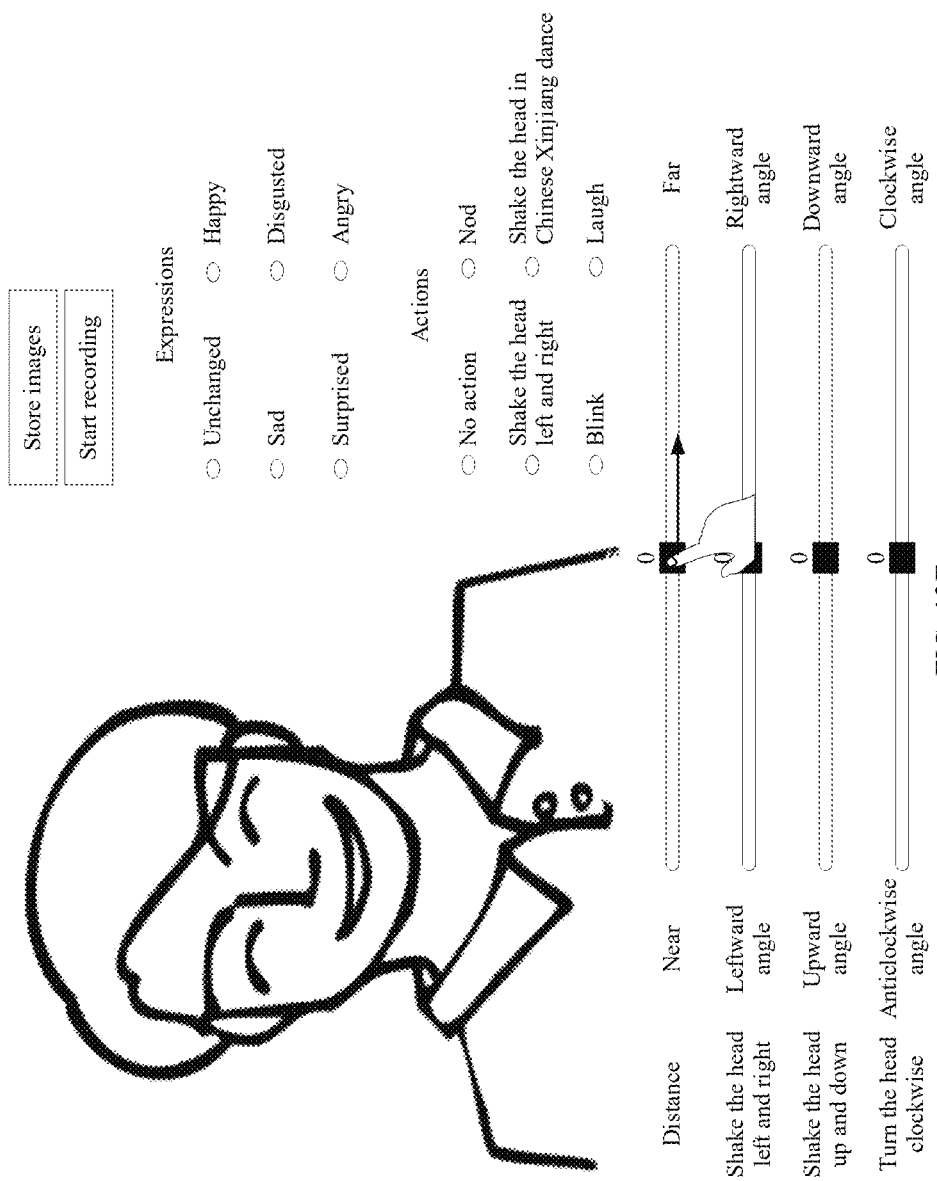
Figure 13F:
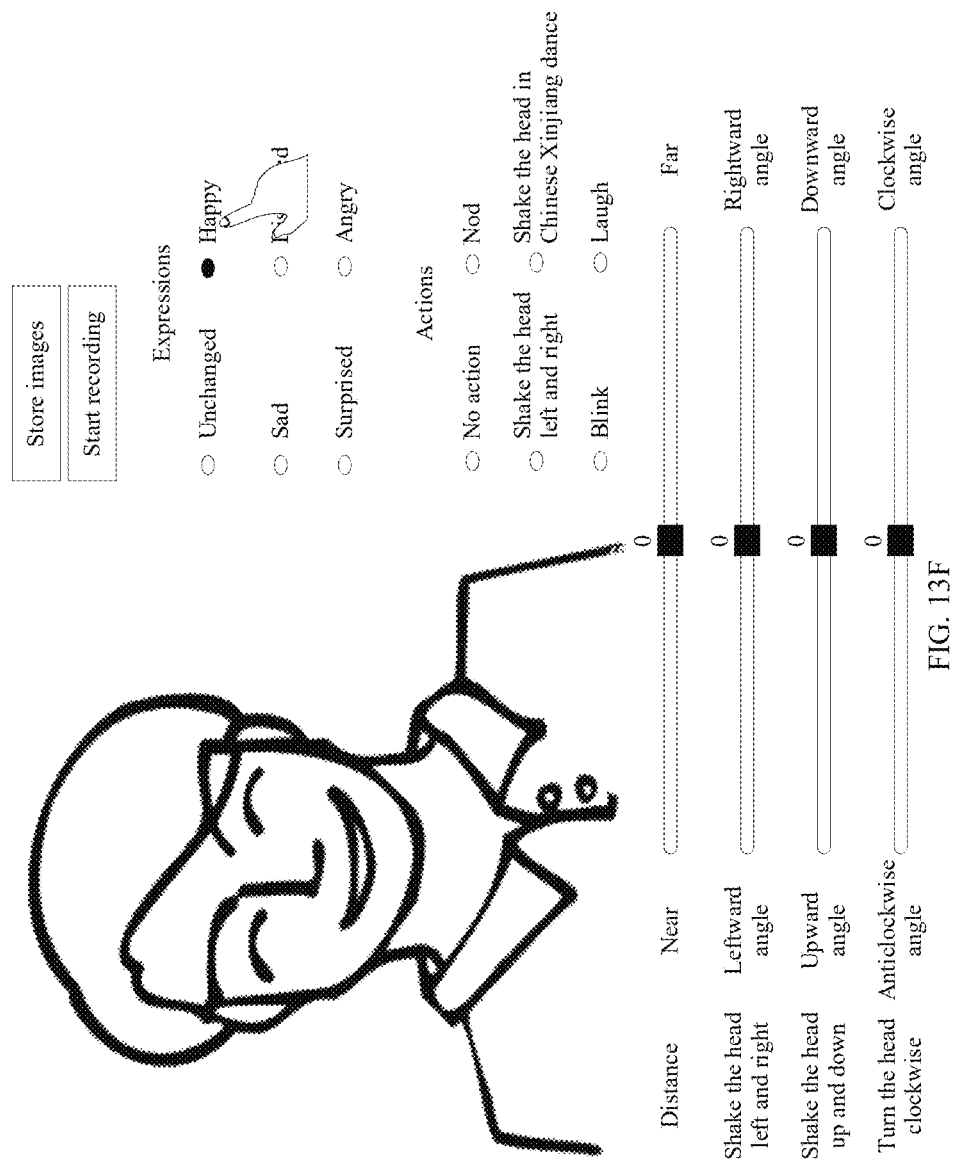
Figure 13G:
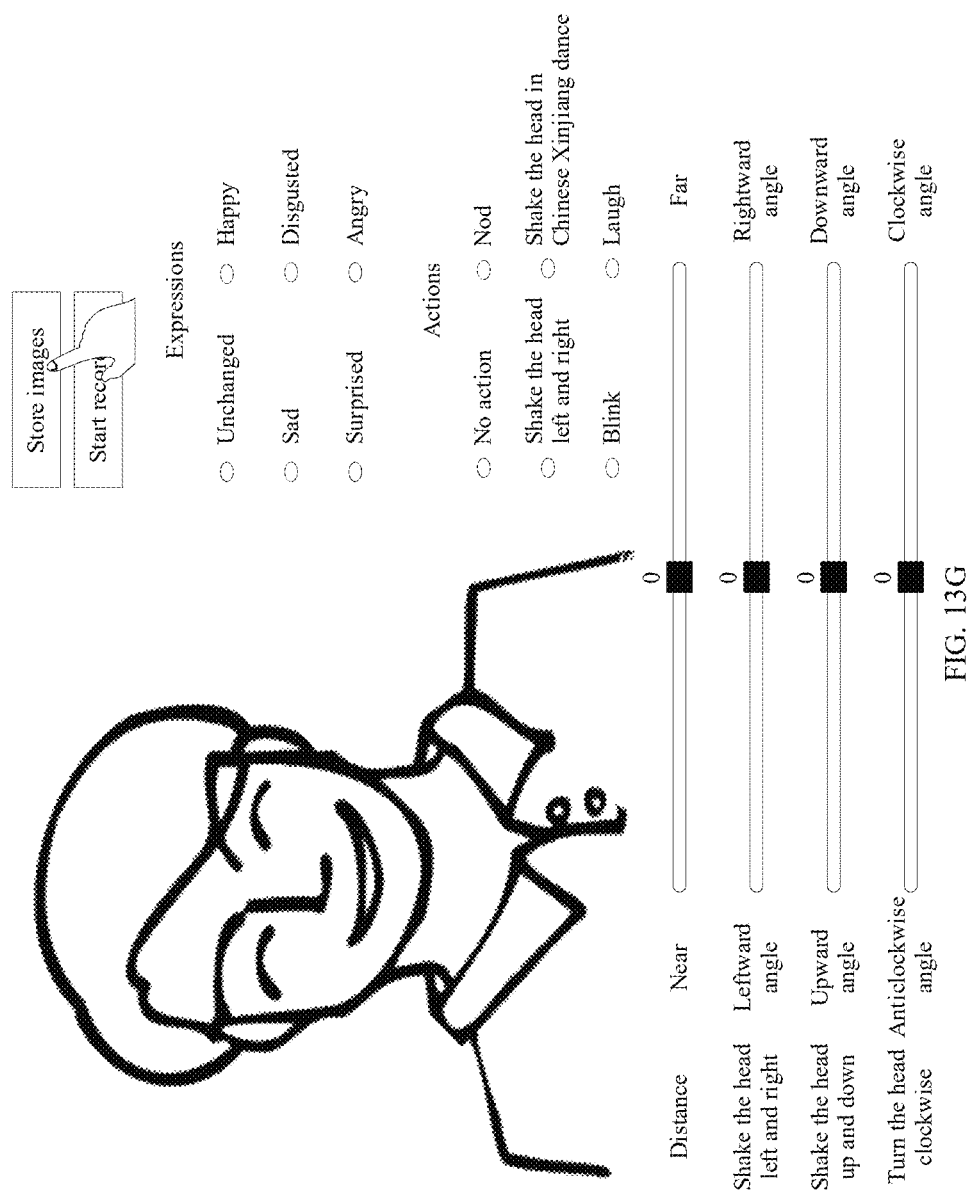
Figure 13H:
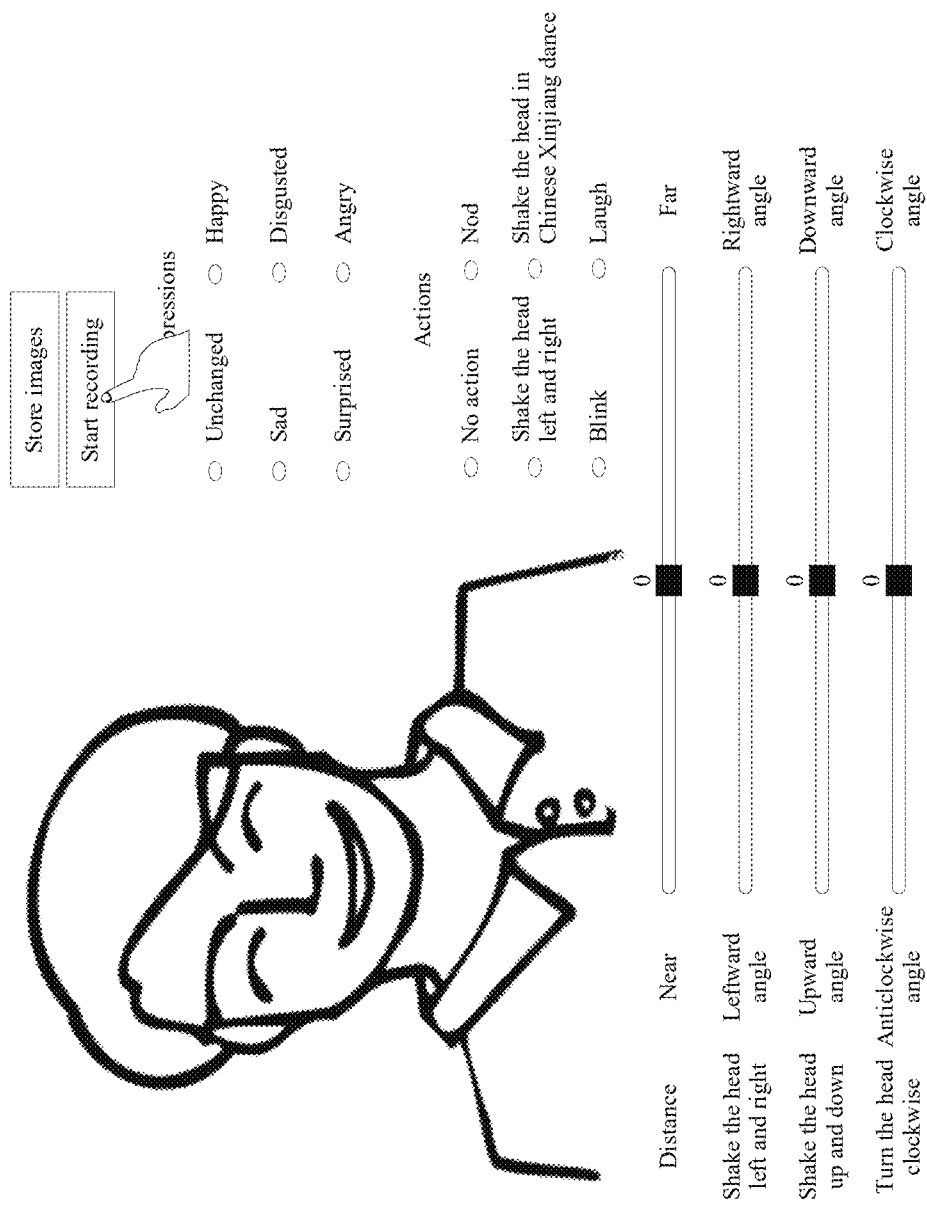
Figure 13I:
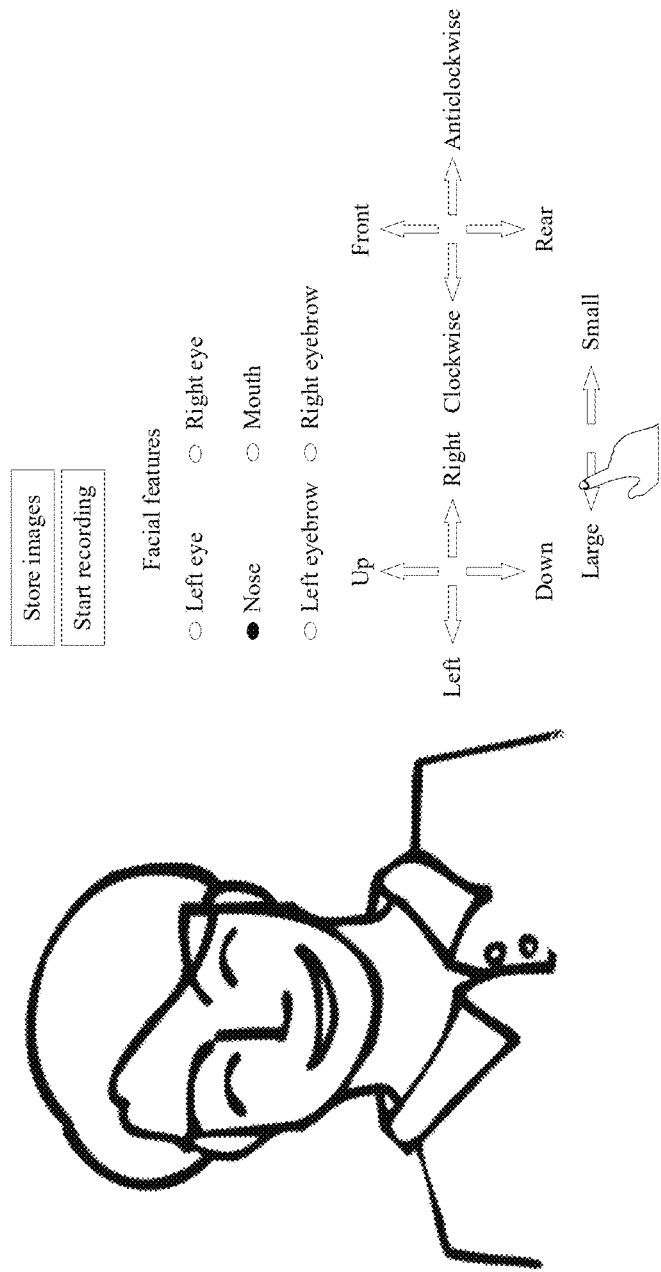
Figure 13J:
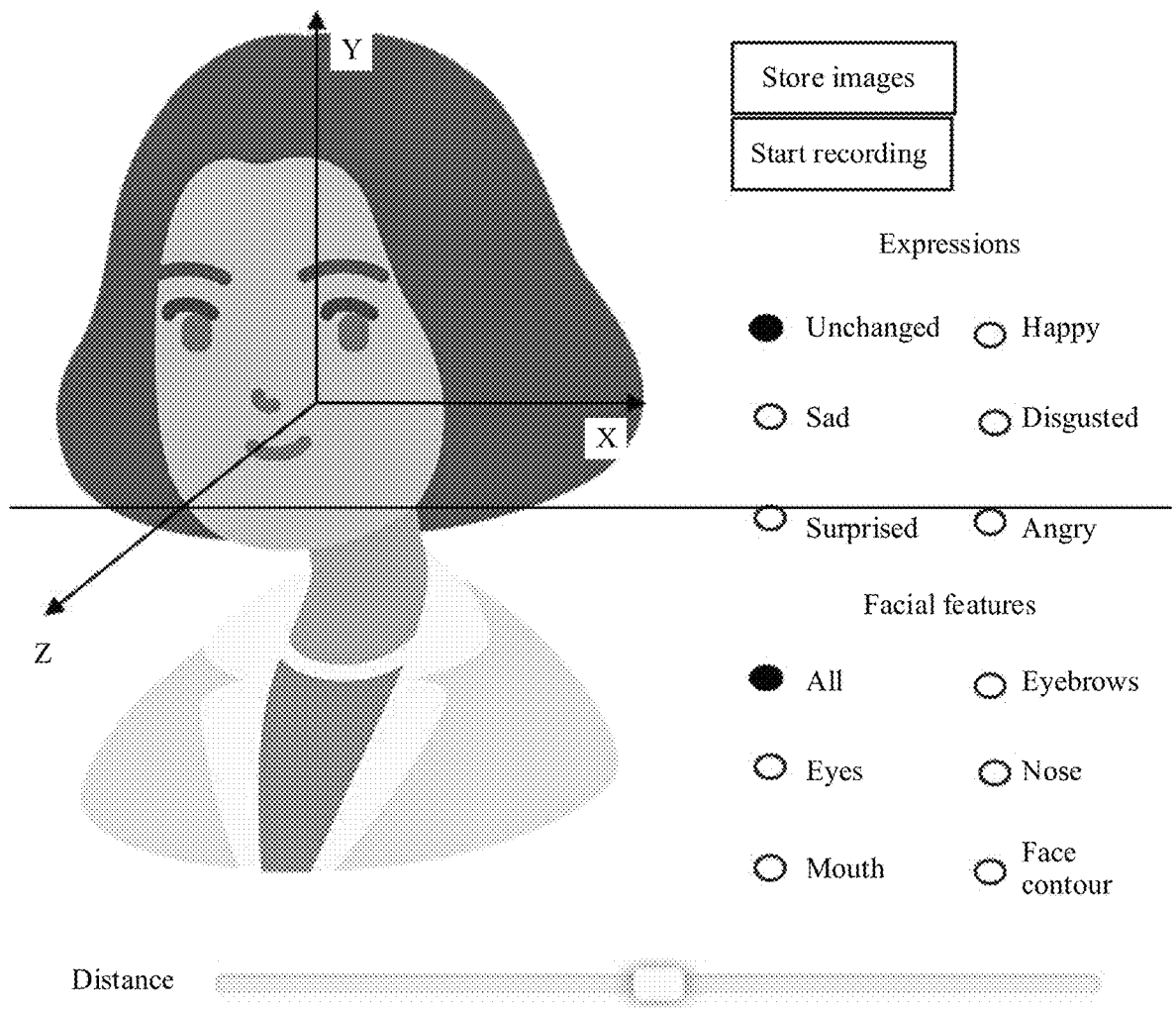
Figure 13K:
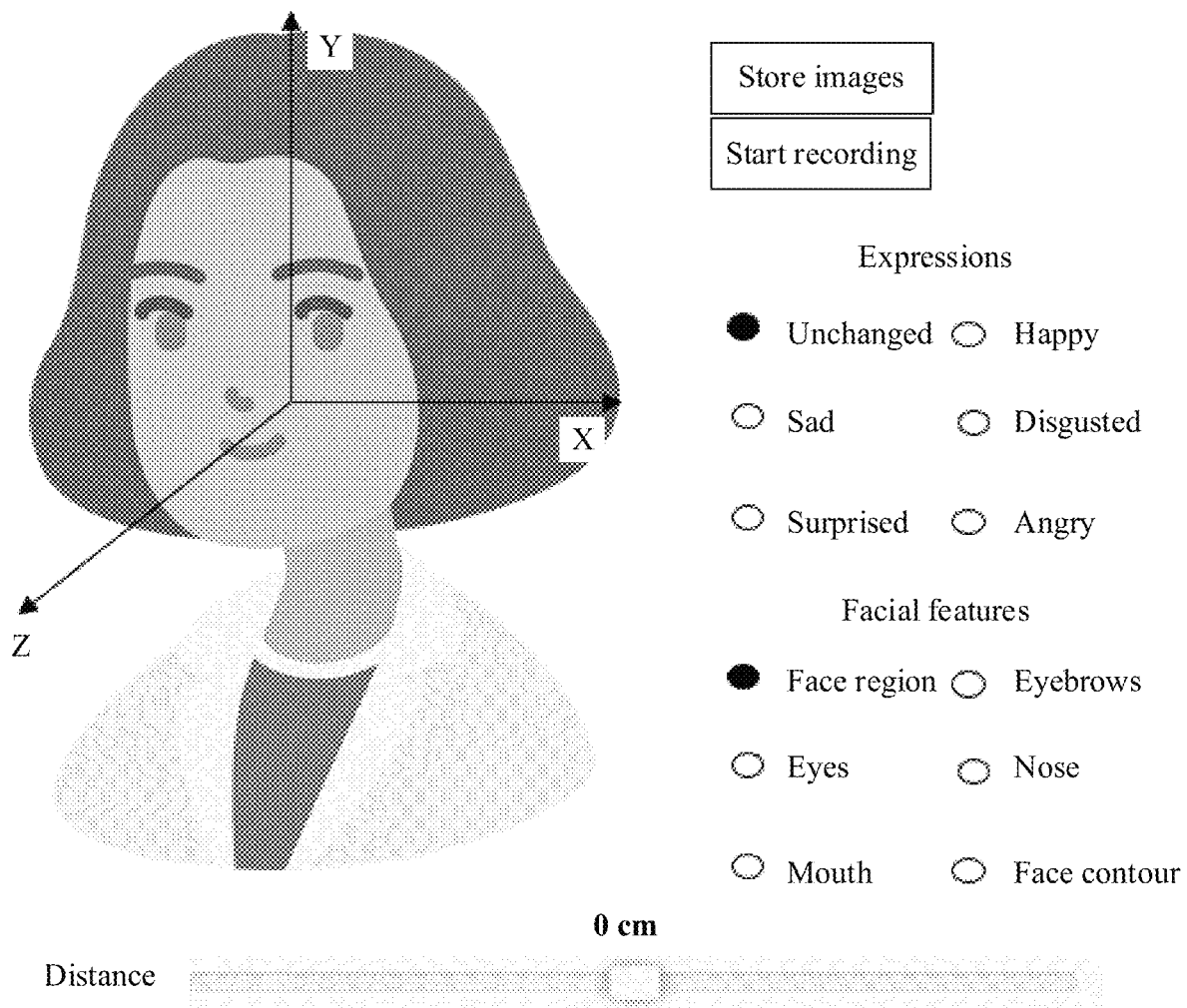

The distortion correction function menu may be shown in FIG. 11 or FIG. 13I.

When the distortion correction function menu is initially displayed, the value of the transformation parameter in each option on the menu may be a default value, or may be a pre-calculated value. For example, a slider corresponding to a distance may be initially located at a position whose value is 0, as shown in FIG. 11. Alternatively, the terminal obtains an adjustment value of the distance according to an image transformation algorithm, and displays a slider at a position of a value corresponding to the adjustment value, as shown in FIG. 13D.

As shown in FIG. 13E, the user may adjust the distance by dragging the slider corresponding to the distance. As shown in FIG. 13F, the user may further select, by using the triggering control, an expression (happiness) that the user wants to change. For this process, refer to the method in the embodiment shown in FIG. 10. Details are not described herein again.

As shown in FIG. 13G, when the user is satisfied with a transformation result, the image storage control may be triggered. When receiving an instruction for storing an image, the terminal stores the currently obtained image in the gallery.

As shown in FIG. 13H, before selecting the transformation parameter, the user may trigger the recording start control. After receiving a recording start instruction, the terminal enables screen recording, to record the process of obtaining the second image. In this process, the recording start control changes to the recording stop control. After the user triggers the recording stop control, the terminal stops screen recording.

Embodiment 3: FIG. 13I illustrates another example of the distortion correction function menu.

As shown in FIG. 13I, the distortion correction function menu includes controls for selecting facial features and adjusting positions. The user first selects a nose control (the elliptical nose control turns black), and then taps a control indicating that the nose becomes larger. Each time the user taps the control, the terminal enlarges the nose of the target person at a specified step by using the method in the embodiment shown in FIG. 10.

It should be noted that the embodiments shown in FIG. 11, FIG. 12A to FIG. 12F, FIG. 13A to FIG. 13H, and FIG. 13I in the present disclosure are all examples, but do not constitute a limitation on the desktop, the distortion correction function menu, a photographing interface, and the like of the terminal. This is not specifically limited in the present disclosure.

Figure 14A:
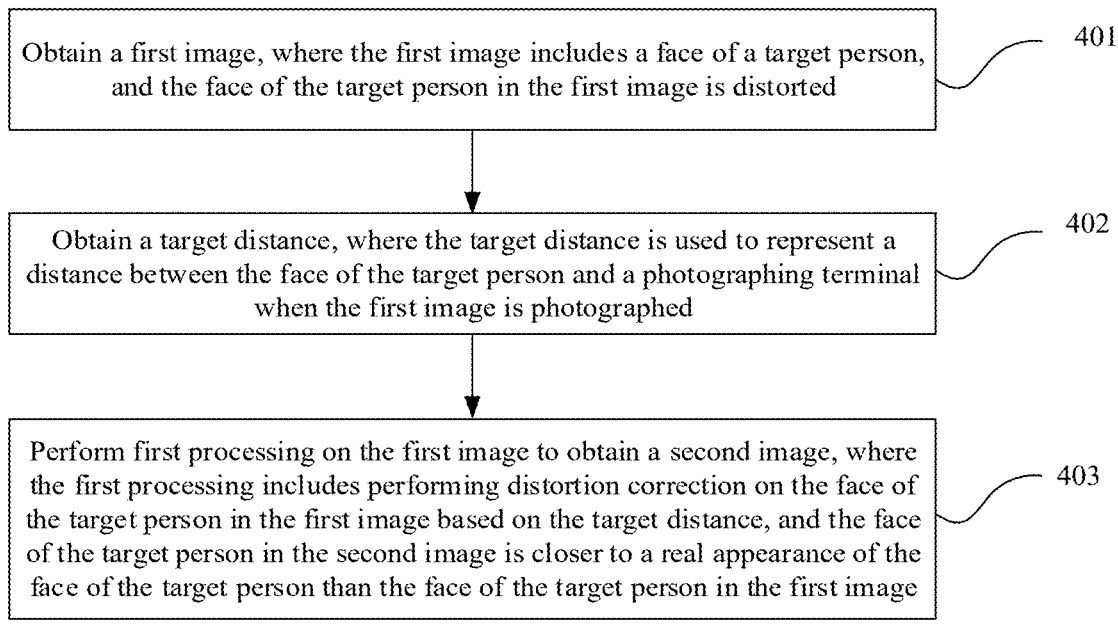
FIG. 14A is a flowchart of an image processing method according to an embodiment of the present disclosure.

With reference to the foregoing embodiments, the present disclosure may further provide an implementation of distortion correction. Refer to FIG. 14A. The method may include the following steps.

Step 401: Obtain a first image. The first image includes a face of a target person. The face of the target person in the first image is distorted.

Optionally, a manner of obtaining the first image includes but is not limited to one of the following manners:

Manner 1: Capture a frame of image for a target scenario by using a camera, and obtain the first image based on the frame of image.

Manner 2: Capture a plurality of frames of images for a target scenario by using a camera, and synthesize the plurality of frames of images into the first image.

Manner 3: Invoke the first image from images stored locally or on a cloud. For example, a user selects an image from a gallery of a terminal. The image includes the face of the target person (that is, the user), and the image is usually photographed at a short distance.

It should be understood that image capturing in Manner 1 and Manner 2 belongs to a real-time photographing scenario, and may occur when a shutter is touched. In this case, specific ISP processing, for example, black level correction, single-frame denoising/multi-frame denoising, demosaicing, and white balancing may be performed on the one or more captured images to obtain a frame of image, that is, the first image. Before the user touches the shutter, a preview stream of the photographing scenario is displayed on a viewfinder screen. For example, the first image is obtained by a front-facing camera of the terminal in a scenario in which the user takes a selfie. Optionally, an FOV of the front-facing camera is set to 70° to 110°, for example 90°. Optionally, the front-facing camera is a wide-angle lens, and an FOV may be greater than 90°, for example, 100° or 115°. This is not exhaustively described or limited in the present disclosure. A depth sensor, such as a structured light sensor or a TOF sensor, may also be disposed next to the front-facing camera. A pixel of the sensor of the camera may have a mainstream pixel value in the industry, for example, 10 M, 12 M, 13 M, or 20 M.

Optionally, to reduce power consumption, distortion correction may not be performed on a preview image. After the shutter is touched, the step 401 is performed to capture an image, and distortion correction same as that in step 403 is performed on the captured image. Therefore, the preview image may be inconsistent with a target image obtained in the step 403 after the user touches the shutter.

It should be understood that the camera may be a front-facing camera or a rear-facing camera. For the reason that the face is distorted, refer to related descriptions in the foregoing embodiments.

In some embodiments, the target person is a person whose image on the preview image is located in a central region or an approximate central region. The target person of interest to the user usually faces or approximately faces the camera when photographed. Therefore, the target person is usually located in the central region on the preview image. In some other embodiments, a quantity of pixels or a screen-to-body ratio of the target person is greater than a preset threshold. The target person of interest to the user usually faces the camera and is close to the camera, especially when the front-facing camera is used to take a selfie, so that the target person is close to the central region on the preview image and the area is greater than the preset threshold. In some other embodiments, the target person is a person whose image on the preview image is close to the central region and whose depth is the smallest. When persons whose images on the preview image are close to the central region include a plurality of individual persons with different depths, the target person is the person whose depth is the smallest. In some embodiments, the terminal determines by default that a target object includes only one target person. It may be understood that the photographing terminal may further determine the target person in a plurality of manners. This manner is not specifically limited in this embodiment of the present disclosure. In the photographing preview stream, the terminal may circle the target person or the face by using a circle, a rectangular box, a person box, or a face box.

Step 402: Obtain a target distance. The target distance is used to represent a distance between the face of the target person and the photographing terminal when the first image is photographed. The target distance may also be understood as a photographing distance between the photographing terminal and the target person when the first image is photographed.

Optionally, the distance between the face of the target person and the photographing terminal may be but is not limited to a distance between the photographing terminal and a most front part, a central position, an eyebrow, an eye, a nose, a mouth, or an ear on the face of the target person. The photographing terminal may be a current terminal, or may be another terminal or a current terminal when the invoked first image is photographed.

Specifically, a manner of obtaining the target distance includes but is not limited to the following manners:

Manner 1: Obtain a screen-to-body ratio of the face of the target person in the first image, and obtain the target distance based on the screen-to-body ratio and a FOV of the first image. The field of view of the first image is related to a field of view of the camera and a zoom magnification. This manner may be applied to an image photographed in real time or an invoked historical image.

Manner 2: Obtain the target distance based on EXIF information of the first image. Especially for an image which is not obtained by photographing in real time, for example, an invoked historical image, the target distance may be determined based on photographing distance information or related information recorded in EXIF information.

Manner 3: Obtain the target distance by using a distance sensor. The distance sensor includes a TOF ranging sensor, a structured light sensor, or a binocular sensor. This manner may be applied to an image photographed in real time. In this case, the current photographing terminal needs to have a distance sensor.

The foregoing manners have been described in the foregoing embodiments. Details are not described herein again.

Step 403: Perform first processing on the first image to obtain a second image. The first processing includes performing distortion correction on the first image based on the target distance. The face of the target person in the second image is closer to a real appearance of the face of the target person than the face of the target person in the first image.

The present disclosure provides but is not limited to the following two processing ideas for performing first processing on the first image to obtain the second image.

Idea 1: Obtain a correction distance, and perform distortion correction on the first image based on the target distance and the correction distance. It should be understood that, for a same target distance, a larger value of the correction distance indicates a greater distortion correction degree. The correction distance needs to be greater than the target distance.

This idea is mainly used to perform distortion correction on the entire face.

Optionally, a method for obtaining the correction distance includes but is not limited to the following two optional manners:

Manner 1: Obtain, based on a correspondence between a preset photographing distance and the correction distance, the correction distance corresponding to the target distance. For example, the correspondence may be that a ratio of the target distance to the correction distance is 1:N. N may include but is not limited to a value, greater than 1, such as 2, 2.5, 3, 4, or 5. Optionally, the correspondence may alternatively be a preset correspondence table. The following uses two tables as examples for description:

TABLE 1

| Photographing distance | Correction distance |
|---|---|
| . . . | . . . |
| 20 cm | 30 cm |
| 25 cm | 50 cm |
| 30 cm | 60 cm |
| 35 cm | 70 cm |
| 40 cm | 70 cm |
| 45 cm | 60 cm |
| 50 cm | 50 cm |
| . . . | . . . |

TABLE 2

| Photographing distance | Correction distance |
|---|---|
| . . . | . . . |
| 15 cm | 15 cm |
| 20 cm | 30 cm |
| 30 cm | 50 cm |
| 40 cm | 55 cm |
| 50 cm | 60 cm |
| 60 cm | 65 cm |
| 70 cm | 70 cm |
| . . . | . . . |

Optionally, Table 1 may indicate a greatest correction strength within a photographing range of 25 cm to 35 cm, and correction may not be performed when the photographing range is greater than 50 cm. Table 2 may indicate a great correction strength within a photographing range of 20 cm to 40 cm, and correction may not be performed when the photographing range is greater than 70 cm. A ratio of the correction distance to the photographing distance indicates the correction strength at the photographing distance. A larger ratio indicates a greater correction strength. In addition, from the entire photographing distance distribution, different photographing distances correspond to different correction strengths.

Manner 2: Display a distortion correction function menu, and receive a control adjustment instruction entered by the user based on the distortion correction function menu. The control adjustment instruction is used to determine the correction distance. The control adjustment instruction may clearly determine the correction distance. Alternatively, the terminal may further calculate the correction distance based on an increment of the target distance. Specifically, a distortion correction control is displayed. The distortion correction control is configured to open the distortion correction function menu. The distortion correction function menu is displayed in response to enabling of the distortion correction control by the user. The distortion correction function menu may include a control for determining the correction distance, and/or a control for selecting a region of interest, and/or a control in an expression adjustment option. Specifically, for a form and use of the menu, refer to related descriptions in FIG. 11 and FIG. 13A to FIG. 13H in the foregoing embodiments. Optionally, for some distortion correction function menus, refer to FIG. 13I to FIG. 13N. It should be understood that, in an actual implementation process, the distortion correction function menu may include, for example, more or less content or more or fewer elements in the example shown in the figure. This is not limited in the present disclosure. Optionally, the distortion correction function menu may be displayed or rendered in the first image, or each of the distortion correction function menu and the first image may occupy a part of screen space. This is not limited in the present disclosure.

Based on Idea 1, a method for performing distortion correction on the first image may include:

The face of the target person in the first image is fitted with a standard face model based on the target distance to obtain a first three-dimensional model. The first three-dimensional model is a three-dimensional model corresponding to the face of the target person, to be specific, represents a shape of the real face of the target person, and a position and a posture in three-dimensional space. Coordinate transformation is performed on the first three-dimensional model based on the correction distance to obtain a second three-dimensional model. Perspective projection is performed on the first three-dimensional model based on a coordinate system of the first image to obtain a first group of projected points. Perspective projection is performed on the second three-dimensional model based on the coordinate system of the first image to obtain a second group of projected points. A displacement vector (field) is obtained, and the displacement vector (field) is obtained by aligning the first group of projected points with the second group of projected points. The first image is transformed based on the displacement vector (field) to obtain the second image.

Figure 13L:
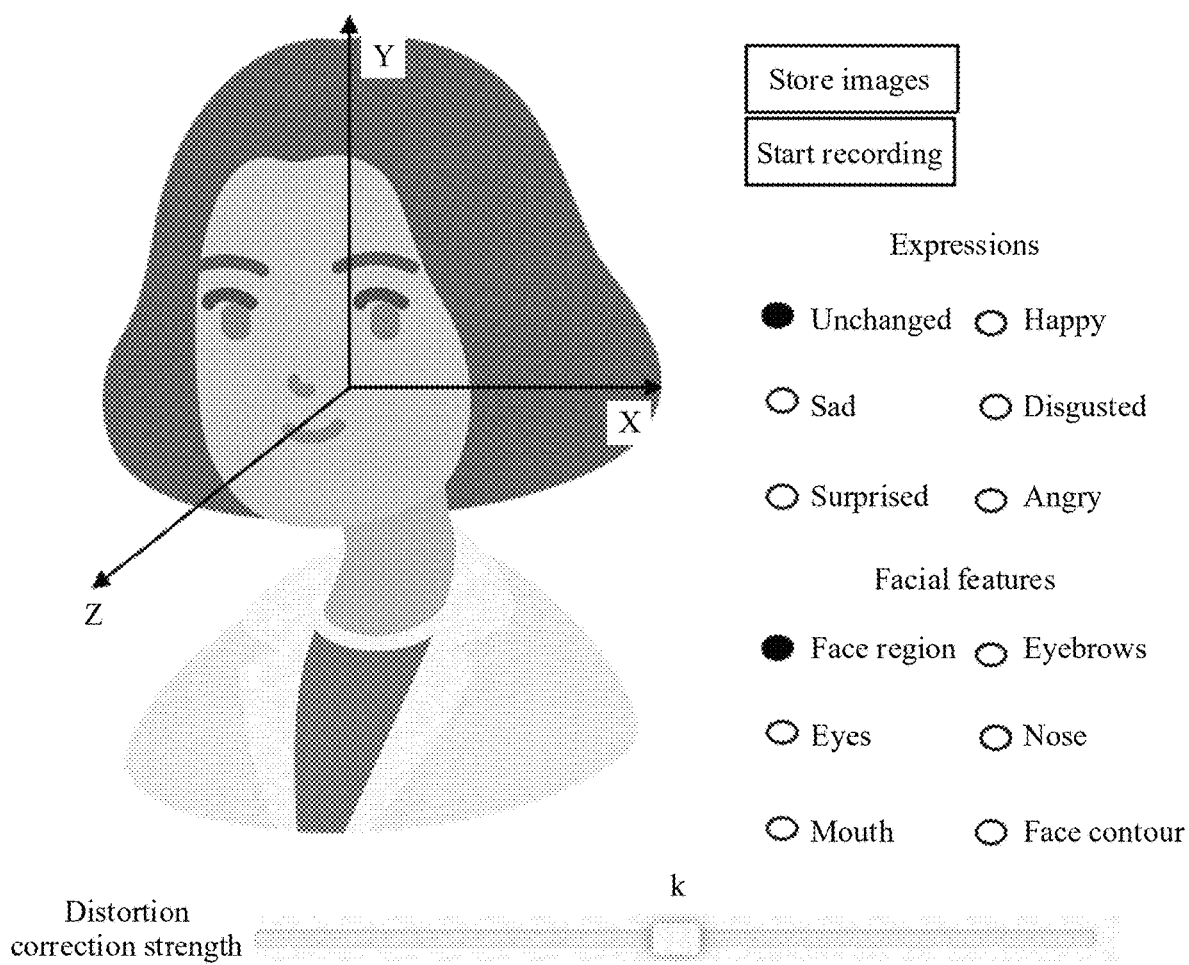
Figure 13M:
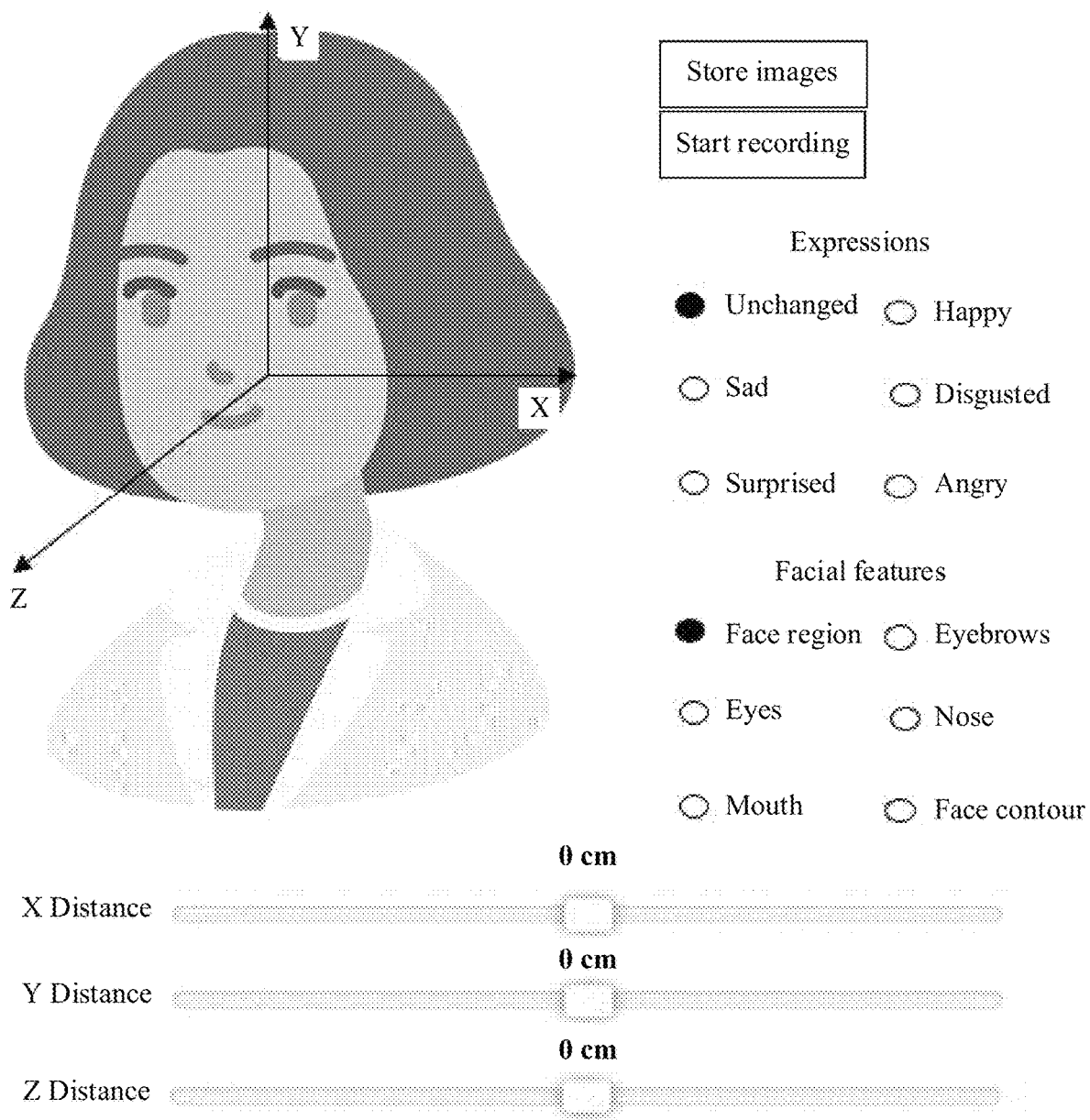

For performing coordinate transformation on the first three-dimensional model based on the correction distance to obtain the second three-dimensional model, there are possible implementations as follows:

In a possible implementation, one photographing distance corresponds to one correction distance, and the ratio of the correction distance to the photographing distance is k. If spatial coordinates of any pixel on the first three-dimensional model are (x, y, z), coordinates of the pixel mapped to the second three-dimensional model are (kx, ky, kz). A value of k may be determined based on the correspondence between the photographing distance and the correction distance in Manner 1, or may be determined by adjusting the distortion correction control in Manner 2. Optionally, refer to FIG. 13K. The user may determine a distance change control on a preview interface. A slider in FIG. 13K may be used to increase or decrease the current photographing distance, for example, a rightward direction indicates an increase, and a leftward direction indicates a decrease. The terminal may determine the correction distance based on the photographing distance of the current image and an operation performed by the user on the slider control. A midpoint of a progress bar or a left start point of the progress bar may indicate that the correction distance is the same as the photographing distance of the first image. In a simpler example, as shown in FIG. 13L, there is a control for more directly adjusting the distortion correction strength on the interface, and k is the ratio of the correction distance to the photographing distance. For example, from left to right, a value of k gradually increases, and the distortion correction strength gradually becomes greater. The midpoint of the progress bar may be k=1, or the left start point of the progress bar may be k=1. It should be understood that, when k is less than 1, interesting distortion magnification may be implemented.

Figure 13N:
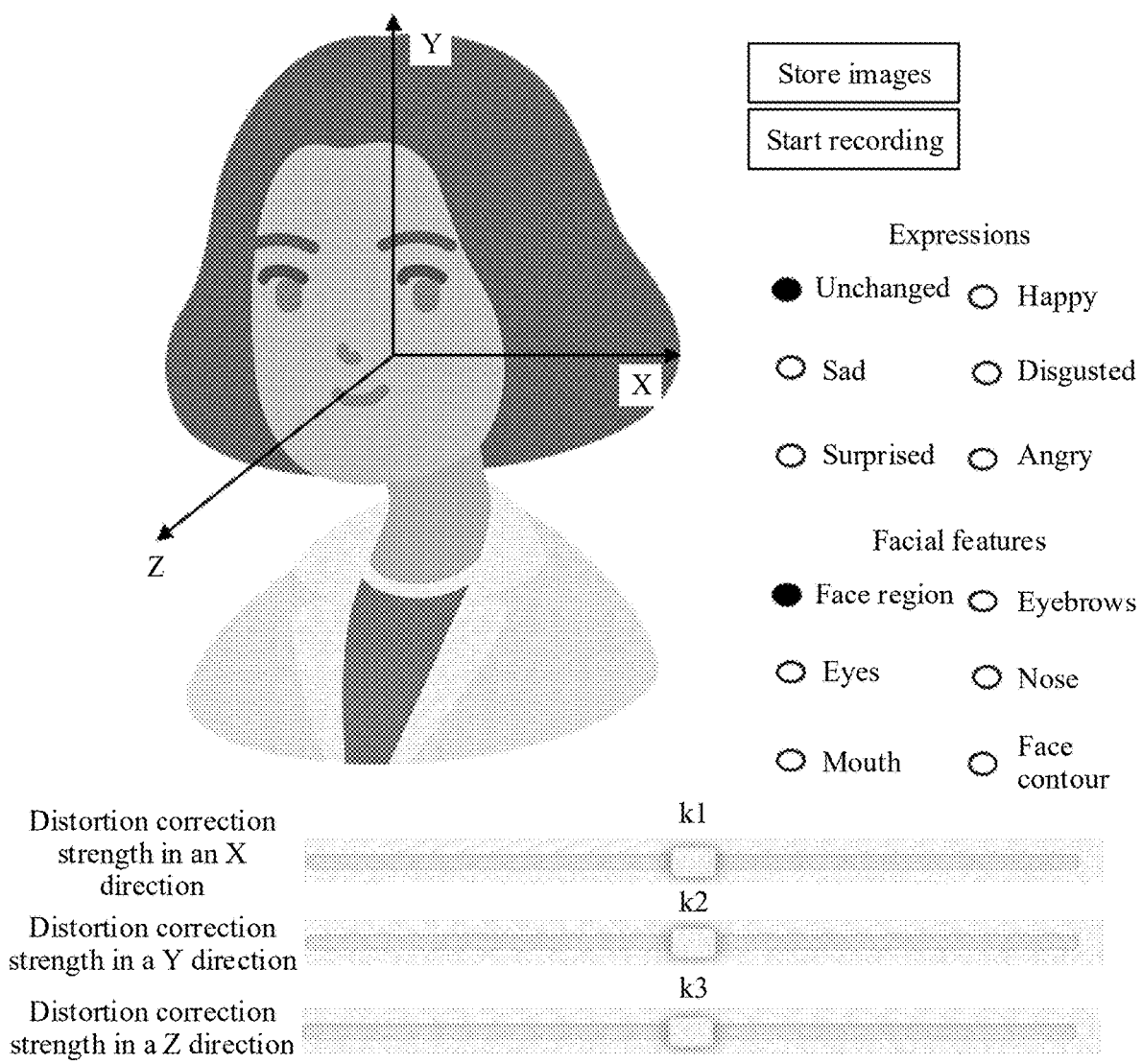

In the other possible implementation, one photographing distance corresponds to one correction distance. The photographing distance and the correction distance are three-dimensional vectors and may be respectively represented as (dx1, dy1, dz1) and (dx2, dy2, dz2). If spatial coordinates of any pixel on the first three-dimensional model are (x, y, z), coordinates of the pixel mapped to the second three-dimensional model are (k1*x, k2*y, k3*z), where k1=dx2/dx1, k2=dy2/dy1, and k3=dz2/dz1. The three-dimensional vectors and the spatial coordinates correspond to a same reference coordinate system, and coordinate axes also correspond to each other. Values of k1, k2, and k3 may be determined based on the correspondence between the photographing distance and the correction distance in Manner 1. In this case, k1, k2, and k3 may be equal. Values of k1, k2, and k3 may alternatively be determined by adjusting the distortion correction control in Manner 2. Optionally, refer to FIG. 13M, the user may determine a distance change control on a preview interface. A slider in FIG. 13M may be used to increase or decrease the current photographing distance in three dimensions (xyz) of a preset coordinate system, for example, a rightward direction indicates an increase, and a leftward direction indicates a decrease. The terminal may determine the correction distance based on the photographing distance of the current image and an operation performed by the user on the slider control. A midpoint of a progress bar or a left start point of the progress bar may indicate that the correction distance is the same as the photographing distance of the first image. In a simpler example, as shown in FIG. 13N, there is a control for more directly adjusting the distortion correction strength on the interface, and the values of k1, k2, and k3 are ratios of the correction distance to the photographing distance in three dimensions. For example, for a same progress bar, from left to right, the value of k1, k2, or k3 gradually increases, and the distortion correction strength in the dimension gradually becomes greater. The midpoint of the progress bar may be k1=1, k2=1, or k3=1, or the left start point of the progress bar may be k1=1, k2=1, or k3=1. It should be understood that, when k1, k2, or k3 is less than 1, interesting distortion magnification in one dimension may be implemented.

Optionally, the coordinate system based on the first image may be understood as a coordinate system established by using a central point of the first image as an origin, a horizontal direction as an x axis, and a vertical direction as a y axis. It is assumed that a width and a height of the image are W and H, coordinates in the upper right corner may be (W/2, H/2).

Specifically, for some related operations, refer to related descriptions in the foregoing embodiments.

Idea 2: Obtain a correction distance and obtain a region of interest. The region of interest includes at least one region of an eyebrow, an eye, a nose, a mouth, or an ear. Distortion correction is performed on the first image based on the target distance, the region of interest, and the correction distance. It should be understood that, for a same target distance, a larger value of the correction distance indicates a greater distortion correction degree. The correction distance needs to be greater than the target distance.

This idea is mainly used to perform distortion correction on the region of interest in the face. For a method for obtaining the correction distance, refer to Manner 1 and Manner 2 in Idea 1.

In this case, a method for performing distortion correction on the first image may include:

The face of the target person in the first image is fitted with a standard face model based on the target distance to obtain a first three-dimensional model. The first three-dimensional model is a three-dimensional model corresponding to the face of the target person. Coordinate transformation is performed on the first three-dimensional model based on the correction distance to obtain a second three-dimensional model. Perspective projection is performed on a model region that is in the first three-dimensional model and that corresponds to the region of interest to obtain a first group of projected points. Perspective projection is performed on a model region that is in the second three-dimensional model and that corresponds to the region of interest obtain a second group of projected points. A displacement vector (field) is obtained, and the displacement vector (field) is obtained by aligning the first group of projected points with the second group of projected points. The first image is transformed based on the displacement vector (field) to obtain the second image.

For a specific method for performing coordinate transformation on the first three-dimensional model based on the correction distance to obtain the second three-dimensional model, refer to related descriptions in Idea 1. Details are not described herein again. It should be noted that the distortion correction function menu includes an option for a region of interest. For details, refer to options for facial features in FIG. 13J to FIG. 13M. Distortion correction may be performed on the region of interest in response to a user's selection, for example, a selection of the eyebrow, the eye, the nose, the mouth, the ear, or a face contour.

For the foregoing two ideas, when the target distance is within a first preset distance range, a smaller target distance, that is, a smaller actual photographing distance, indicates a greater distortion correction strength may be needed, that is, a correction distance with a higher relative proportion needs to be determined to perform corresponding algorithm processing, to achieve better correction effect. The first preset distance range is less than or equal to a preset distortion photographing distance. For example, the first preset distance range may include [30 cm, 40 cm] or [25 cm, 45 cm]. In addition, a larger angle at which the face of the target person deviates from a frontal face indicates a smaller distortion correction strength may be needed, that is, a correction distance with a lower relative proportion needs to be determined to perform corresponding algorithm processing, to achieve better correction effect.

Specifically, for some related operations, refer to related descriptions in the foregoing embodiments.

In a specific implementation process, distortion correction does not need to be performed on all images. Therefore, after the first image is obtained, distortion correction may be triggered by determining some triggering conditions for distortion correction. The triggering condition for distortion correction includes but is not limited to determining that one or more of the following conditions are met:

Condition 1: In the first image, integrity of the face of the target person is greater than a preset integrity threshold. Alternatively, it is determined that facial features of the face of the target person are complete, that is, the terminal can identify a face scenario in which distortion correction can be performed.

Condition 2: A pitch angle at which the face of the target person deviates from the frontal face is within a first angle range, and a yaw angle at which the face of the target person deviates from the frontal face is within a second angle range. For example, the first angle range is [−30°, 30°], and the second angle range is [−30°, 30°]. That is, a face image on which distortion correction is performed needs to be as close as possible to the frontal face.

Condition 3: Face detection is performed in a current photographing scenario. Only one valid face is detected, and the valid face is the face of the target person. That is, distortion correction may be performed for only one person subject.

Condition 4: It is determined that the target distance is less than or equal to the preset distortion photographing distance. The photographing distance is usually an important element for generating person distortion. For example, the distortion photographing distance is not greater than 60 cm, for example, 60 cm or 50 cm.

Condition 5: It is determined that a camera currently being enabled by the terminal is the front-facing camera. The front-facing camera is configured to capture the first image. Front-facing photographing is also an important cause for person distortion.

Condition 6: A current photographing mode of the terminal is a preset photographing mode, for example, a portrait photographing mode, a default photographing mode, or another specific photographing mode; or a distortion correction function is enabled; or the terminal enables a distortion correction function.

The present disclosure provides an image processing method for distortion correction. It is not only applicable to real-time photographing, but also helps the user perform quick and convenient interesting correction and editing when viewing a gallery, thereby bringing better user experience to the user.

Figure 14B:
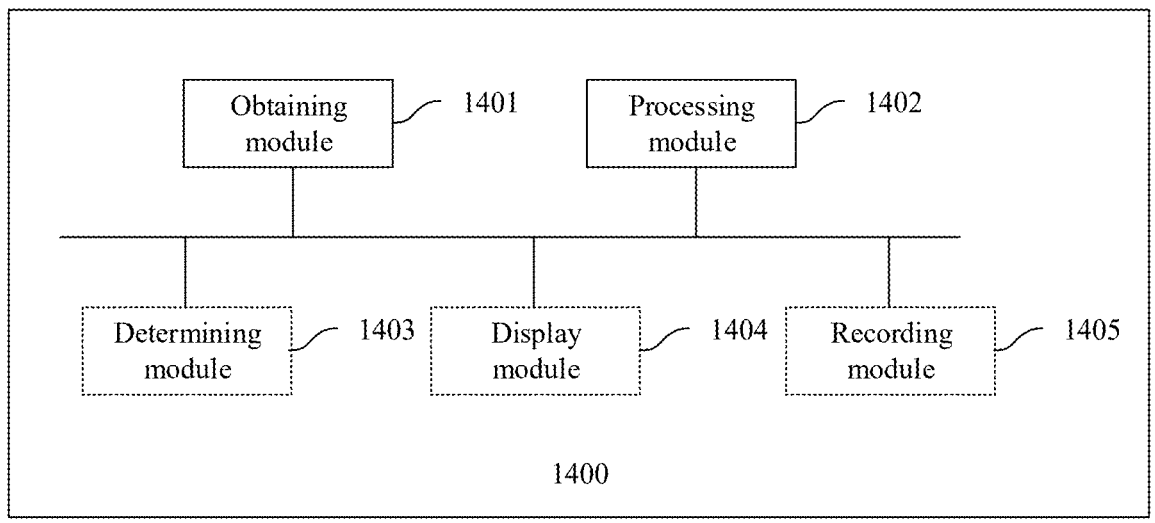
FIG. 14B is a schematic diagram of a structure of an image processing apparatus according to an embodiment of the present disclosure.

Correspondingly, the present disclosure further provides an image processing apparatus. As shown in FIG. 14B, the apparatus 1400 includes an obtaining module 1401 and a processing module 1402.

The obtaining module 1401 is configured to obtain a first image. The first image includes a face of a target person. The face of the target person in the first image is distorted. The obtaining module 1401 is further configured to obtain a target distance. The target distance is used to represent a distance between the face of the target person and a photographing terminal when the first image is photographed.

In a specific implementation process, the obtaining module 1401 is further configured to perform the methods mentioned in the step 401 and the step 402 and methods that can be equivalently replaced.

The processing module 1402 is configured to perform first processing on the face of the target person in the first image to obtain a second image. The first processing includes performing distortion correction on the first image based on the target distance. The face of the target person in the second image is closer to a real appearance of the face of the target person than the face of the target person in the first image.

In a specific implementation process, the processing module 1402 is further configured to perform the method mentioned in the step 403 and a method that can be equivalently replaced.

In addition, the apparatus 1400 may further include a determining module 1403 configured to determine whether one or more of Condition 1 to Condition 6 is/are met; a display module 1404 configured to display various interfaces and images described above; and a recording module 1405 configured to record a process segment of the distortion correction described above or a part or all of processes in which a user uses a camera or edits an image to generate a video or gif.

The foregoing specific method embodiments and interpretations, descriptions, and extensions of technical features in the embodiments are also applicable to method execution in the apparatus, and details are not described in the apparatus embodiments.

There are numerous implementations and application scenarios in the present disclosure, which cannot be enumerated in detail one by one. Optional implementations in the present disclosure may be freely combined and changed without violating the laws of nature, which shall fall within the protection scope of the present disclosure.

Figure 15:
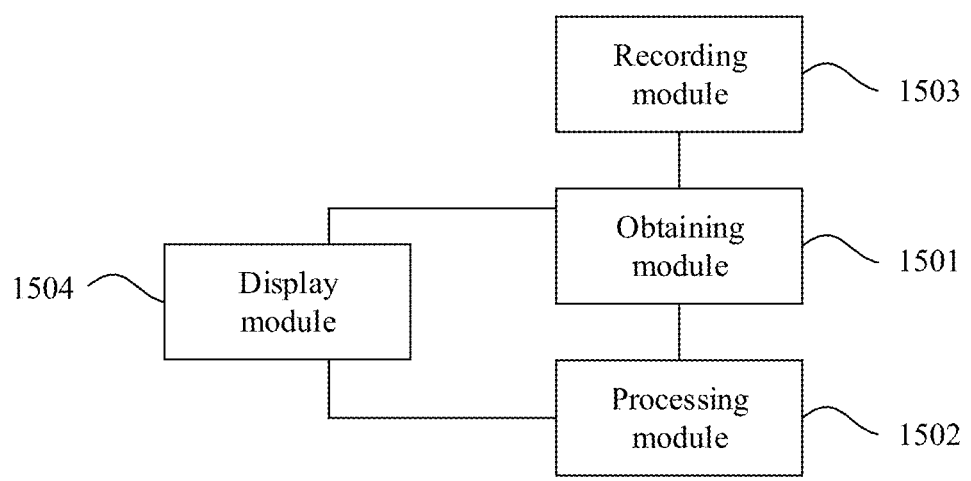
FIG. 15 is a schematic diagram of a structure of an image transformation apparatus according to an embodiment of the present disclosure.

FIG. 15 is a schematic diagram of a structure of an embodiment of an image transformation apparatus according to the present disclosure. As shown in FIG. 15, the apparatus in this embodiment may be applied to the terminal shown in FIG. 2. The image transformation apparatus includes an obtaining module 1501, a processing module 1502, a recording module 1503, and a display module 1504.

In a selfie scenario, the obtaining module 1501 is configured to: obtain a first image for a target scenario by using a front-facing camera, where the target scenario includes a face of a target person; and obtain a target distance between the face of the target person and the front-facing camera. The processing module 1502 is configured to: when the target distance is less than a preset threshold, perform first processing on the first image to obtain a second image. The first processing includes performing distortion correction on the first image based on the target distance. The face of the target person in the second image is closer to a real appearance of the face of the target person than the face of the target person in the first image.

In a possible implementation, the target distance includes a distance between a most front part on the face of the target person and the front-facing camera, or a distance between a specified part on the face of the target person and the front-facing camera, or a distance between a central position on the face of the target person and the front-facing camera.

In a possible implementation, the obtaining module 1501 is further configured to obtain a screen-to-body ratio of the face of the target person in the first image, and obtain the target distance based on the screen-to-body ratio and a FOV of the front-facing camera.

In a possible implementation, the obtaining module 1501 is further configured to obtain the target distance by using a distance sensor. The distance sensor includes a TOF ranging sensor, a structured light sensor, or a binocular sensor.

In a possible implementation, the preset threshold is less than 80 cm.

In a possible implementation, the second image includes a preview image or an image obtained after a shutter is triggered.

In a possible implementation, that the face of the target person in the second image is closer to the real appearance of the face of the target person than the face of the target person in the first image includes: relative proportions of facial features of the target person in the second image are closer to relative proportions of the facial features of the face of the target person than relative proportions of the facial features of the target person in the first image; and/or relative positions of the facial features of the target person in the second image are closer to relative positions of the facial features of the face of the target person than relative positions of the facial features of the target person in the first image.

In a possible implementation, the processing module 1502 is further configured to fit the face of the target person in the first image and a standard face model based on the target distance to obtain depth information of the face of the target person, and perform perspective distortion correction on the first image based on the depth information to obtain the second image.

In a possible implementation, the processing module 1502 is further configured to establish a first three-dimensional model of the face of the target person, transform a pose and/or a shape of the first three-dimensional model to obtain a second three-dimensional model of the face of the target person, obtain a pixel displacement vector field of the face of the target person based on the depth information, the first three-dimensional model, and the second three-dimensional model, and obtain the second image based on the pixel displacement vector field of the face of the target person.

In a possible implementation, the processing module 1502 is further configured to perform perspective projection on the first three-dimensional model based on the depth information to obtain a first coordinate set, where the first coordinate set includes coordinate values corresponding to a plurality of pixels in the first three-dimensional model; perform perspective projection on the second three-dimensional model based on the depth information to obtain a second coordinate set, where the second coordinate set includes coordinate values corresponding to a plurality of pixels in the second three-dimensional model; and calculate a coordinate difference between a first coordinate value and a second coordinate value to obtain the pixel displacement vector field of the target object. The first coordinate value includes a coordinate value that is in the first coordinate set and that corresponds to a first pixel. The second coordinate value includes a coordinate value that is in the second coordinate set and that corresponds to the first pixel. The first pixel includes any one of a plurality of same pixels included in the first three-dimensional model and the second three-dimensional model.

In a scenario in which distortion correction is performed on an image based on a transformation parameter entered by a user, the obtaining module 1501 is configured to obtain a first image. The first image includes a face of a target person. The face of the target person in the first image is distorted. The display module 1504 is configured to display a distortion correction function menu. The obtaining module 1501 is further configured to obtain the transformation parameter entered by the user on the distortion correction function menu. The transformation parameter includes at least an equivalent simulation photographing distance. The equivalent simulation photographing distance is used to simulate a distance between the face of the target person and a camera when a photographing terminal photographs the face of the target person. The processing module 1502 is configured to perform first processing on the first image to obtain a second image. The first processing includes performing distortion correction on the first image based on the transformation parameter. The face of the target person in the second image is closer to a real appearance of the face of the target person than the face of the target person in the first image.

In a possible implementation, the reason that the face of the target person in the first image is distorted is that: when a second terminal photographs the first image, a target distance between the face of the target person and the second terminal is less than a first preset threshold. The target distance includes a distance between a most front part on the face of the target person and the front-facing camera, or a distance between a specified part on the face of the target person and the front-facing camera, or a distance between a central position on the face of the target person and the front-facing camera.

In a possible implementation, the target distance is obtained based on a screen-to-body ratio of the face of the target person in the first image and an FOV of a camera of the second terminal. Alternatively, the target distance is obtained based on an equivalent focal length in EXIF information of the first image.

In a possible implementation, the distortion correction function menu includes an option for adjusting an equivalent simulation photographing distance. The obtaining module 1501 is further configured to obtain the equivalent simulation photographing distance based on an instruction triggered by an operation performed by the user on a control or a slider in the option for adjusting an equivalent simulation photographing distance.

In a possible implementation, when the distortion correction function menu is initially displayed, a value of the equivalent simulation photographing distance in the option for adjusting an equivalent simulation photographing distance includes a default value or a pre-calculated value.

In a possible implementation, the display module 1504 is further configured to: display a pop-up window when the face of the target person is distorted, where the pop-up window is used to provide a control for selecting whether to perform distortion correction; and when the user taps a distortion correction control in the pop-up window, respond to an instruction generated by a user operation.

In a possible implementation, the display module 1504 is further configured to: display a distortion correction control when the face of the target person is distorted, where the distortion correction control is used to open the distortion correction function menu; and when the user taps the distortion correction control, respond to an instruction generated by a user operation.

In a possible implementation, the reason that the face of the target person in the first image is distorted is that: when the second terminal photographs the first image, the FOV of the camera is greater than a second preset threshold and a pixel distance between the face of the target person and an edge of the FOV is less than a third preset threshold. The pixel distance includes a quantity of pixels between the most front part on the face of the target person and the edge of the FOV, or a quantity of pixels between the specified part on the face of the target person and the edge of the FOV, or a quantity of pixels between the central position on the face of the target person and the edge of the FOV.

In a possible implementation, the FOV is obtained based on the EXIF information of the first image.

In a possible implementation, the second preset threshold is 90°, and the third preset threshold is a quarter of a length or a width of the first image.

In a possible implementation, the distortion correction function menu includes a displacement distance adjustment option. The obtaining module 1501 is further configured to obtain an adjustment direction and a displacement distance based on an instruction triggered by an operation performed by the user on a control or a slider in the displacement distance adjustment option.

In a possible implementation, the distortion correction function menu includes an option for adjusting relative positions and/or relative proportions of facial features. The obtaining module 1501 is further configured to obtain an adjustment direction, a displacement distance, and/or facial dimensions based on an instruction triggered by an operation performed by the user on a control or a slider in the option for adjusting relative positions and/or relative proportions of facial features.

In a possible implementation, the distortion correction function menu includes an angle adjustment option. The obtaining module 1501 is further configured to obtain an adjustment direction and an adjustment angle based on an instruction triggered by an operation performed by the user on a control or a slider in the angle adjustment option. Alternatively, the distortion correction function menu includes an expression adjustment option. The obtaining module 1501 is further configured to obtain a new expression template based on an instruction triggered by an operation performed by the user on a control or a slider in the expression adjustment option. Alternatively, the distortion correction function menu includes an action adjustment option. The obtaining module 1501 is further configured to obtain a new action template based on an instruction triggered by an operation performed by the user on a control or a slider in the action adjustment option.

In a possible implementation, that the face of the target person in the second image is closer to the real appearance of the face of the target person than the face of the target person in the first image includes: relative proportions of facial features of the target person in the second image are closer to relative proportions of the facial features of the face of the target person than relative proportions of the facial features of the target person in the first image; and/or relative positions of the facial features of the target person in the second image are closer to relative positions of the facial features of the face of the target person than relative positions of the facial features of the target person in the first image.

In a possible implementation, the processing module 1502 is further configured to fit the face of the target person in the first image and a standard face model based on the target distance to obtain depth information of the face of the target person, and perform perspective distortion correction on the first image based on the depth information and the transformation parameter to obtain the second image.

In a possible implementation, the processing module 1502 is further configured to establish a first three-dimensional model of the face of the target person; transform a pose and/or a shape of the first three-dimensional model based on the transformation parameter to obtain a second three-dimensional model of the face of the target person; obtain a pixel displacement vector field of the face of the target person based on the depth information, the first three-dimensional model, and the second three-dimensional model; and obtain the second image based on the pixel displacement vector field of the face of the target person.

In a possible implementation, the processing module 1502 is further configured to perform perspective projection on the first three-dimensional model based on the depth information to obtain a first coordinate set, where the first coordinate set includes coordinate values corresponding to a plurality of pixels in the first three-dimensional model; perform perspective projection on the second three-dimensional model based on the depth information to obtain a second coordinate set, where the second coordinate set includes coordinate values corresponding to a plurality of pixels in the second three-dimensional model; and calculate a coordinate difference between a first coordinate value and a second coordinate value to obtain the pixel displacement vector field of the target object. The first coordinate value includes a coordinate value that is in the first coordinate set and that corresponds to a first pixel. The second coordinate value includes a coordinate value that is in the second coordinate set and that corresponds to the first pixel. The first pixel includes any one of a plurality of same pixels included in the first three-dimensional model and the second three-dimensional model.

In a possible implementation, the apparatus further includes a recording module 1503. The obtaining module is further configured to obtain a recording instruction based on a triggering operation performed by the user on a recording control. The recording module 1503 is configured to start, based on the recording instruction, recording of a process of obtaining the second image until a recording stop instruction generated by a triggering operation performed by the user on a recording stop control is received.

In a possible implementation, the display module 1504 is configured to: display a distortion correction function menu on a screen, where the distortion correction function menu includes one or more sliders and/or one or more controls; and receive a distortion correction instruction. The distortion correction instruction includes a transformation parameter generated when a user performs a touch operation on the one or more sliders and/or the one or more controls. The transformation parameter includes at least an equivalent simulation photographing distance. The equivalent simulation photographing distance is used to simulate a distance between the face of the target person and a camera when a photographing terminal photographs the face of the target person. The processing module 1502 is configured to perform first processing on the first image based on the transformation parameter to obtain the second image. The first processing includes performing distortion correction on the first image. The face of the target person in the second image is closer to the real appearance of the face of the target person than the face of the target person in the first image.

The apparatus in this embodiment may be used to execute the technical solutions of the method embodiment shown in FIG. 3 or FIG. 10. The implementation principles and technical effect are similar, and are not further described herein.

In an implementation process, the steps in the foregoing method embodiments may be completed by using a hardware integrated logic circuit in the processor, or by using instructions in a form of software. The processor may be a general-purpose processor, a DSP, an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of the present disclosure may be directly presented as being performed and completed by a hardware encoding processor, or performed and completed by a combination of hardware and a software module in an encoding processor. A software module may be located in a mature storage medium in the art, such as a random-access memory (RAM), a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM, used as an external cache. Through example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a SynchLink DRAM (SLDRAM), and a direct Rambus RAM (DR RAM). It should be noted that the memory in the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of embodiments.

In addition, functional units in embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in the present disclosure essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of the present disclosure. The foregoing storage medium includes any medium that can store program code, such as a USB flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a first terminal, the method comprising:
    obtaining a first image comprising a face of a target person;
    determining a target distance by calculating a screen-to-body ratio of the face of the target person in the first image, wherein the screen-to-body ratio is a ratio of a first pixel area of the face of the target person to a second pixel area of the first image;
    determining that the face of the target person in the first image is distorted when the target distance between the face of the target person and a camera capturing the first image is less than a threshold distance;
    displaying, in response to having determined that the face of the target person is distorted, a distortion correction function menu;
    obtaining a transformation parameter from the distortion correction function menu, wherein the transformation parameter comprises at least an equivalent simulation photographing distance simulating a distance between the face of the target person and a camera when a photographing terminal photographs the face of the target person; and
    performing distortion correction on the first image based on the transformation parameter to obtain a second image.

2. The method according to claim 1, wherein the distortion correction function menu comprises an option for adjusting the equivalent simulation photographing distance, and wherein obtaining the transformation parameter from the distortion correction function menu comprises obtaining the equivalent simulation photographing distance based on a control or a slider in the option for adjusting the equivalent simulation photographing distance.

3. The method according to claim 1, wherein prior to displaying the distortion correction function menu, the method further comprises:
    displaying a pop-up window when the face of the target person is distorted, wherein the pop-up window provides a control for selecting whether to perform a distortion correction; and
    responding to an instruction generated in response to receiving an input from the control.

4. The method according to claim 1, wherein prior to displaying the distortion correction function menu, the method further comprises:
    displaying a distortion correction control when the face of the target person is distorted; or
    displaying the distortion correction function menu in response to receiving an input from the distortion correction control.

5. The method according to claim 1, wherein the distortion correction function menu comprises a displacement distance adjustment option, and wherein obtaining the transformation parameter from the distortion correction function menu comprises obtaining an adjustment direction and a displacement distance based on a control or a slider of the displacement distance adjustment option.

6. The method according to claim 1, wherein the distortion correction function menu comprises an option for adjusting relative positions or relative proportions of facial features, and wherein obtaining the transformation parameter from the distortion correction function menu comprises obtaining an adjustment direction, a displacement distance, or facial dimensions based on a control or a slider of the option.

7. The method according to claim 1, wherein the distortion correction function menu comprises an angle adjustment option, an expression adjustment option, or an action adjustment option, and wherein obtaining the transformation parameter from the distortion correction function menu comprises obtaining an adjustment direction and an adjustment angle based on a first control or a first slider in the angle adjustment option, obtaining a new expression template based on a second control or a second slider in the expression adjustment option, or obtaining a new action template based on a third control or a third slider in the action adjustment option.

8. The method according to claim 1, wherein performing the distortion correction on the first image based on the transformation parameter comprises:
    fitting the face of the target person in the first image and a standard face model to obtain depth information of the face of the target person; and
    performing perspective distortion correction on the first image based on the depth information and the transformation parameter to obtain the second image.

9. The method according to claim 8, wherein performing the perspective distortion correction on the first image based on the depth information and the transformation parameter to obtain the second image comprises:
    establishing a first three-dimensional model of the face of the target person;
    transforming a pose or a shape of the first three-dimensional model based on the transformation parameter to obtain a second three-dimensional model of the face of the target person;

obtaining a pixel displacement vector field of the face of the target person based on the depth information, the first three-dimensional model, and the second three-dimensional model; and obtaining the second image based on the pixel displacement vector field.

10. An apparatus comprising:
a memory configured to store instructions; and
a processor coupled to the memory and configured to execute the instructions to cause the apparatus to:
   obtain a first image comprising a face of a target person;
   determine a target distance by calculating a screen-to-body ratio of the face of the target person in the first image, wherein the screen-to-body ratio is a ratio of a first pixel area of the face of the target person to a second pixel area of the first image;
   determine that the face of the target person in the first image is distorted;
   display, in response to having determined that the face of the target person is distorted, a distortion correction function menu;
   obtain a transformation parameter from the distortion correction function menu, wherein the transformation parameter comprises at least an equivalent simulation photographing distance simulating a distance between the face of the target person and a camera when a photographing terminal photographs the face of the target person; and
   perform distortion correction on the first image based on the transformation parameter to obtain a second image.

11. The apparatus according to claim 10, wherein the distortion correction function menu comprises an option for adjusting the equivalent simulation photographing distance; and
wherein the processor is further configured to execute the instructions to cause the apparatus to obtain the equivalent simulation photographing distance based on a control or a slider in the option for adjusting the equivalent simulation photographing distance.

12. The apparatus according to claim 10, wherein the processor is further configured to execute the instructions to cause the apparatus to:
   display a pop-up window when the face of the target person is distorted, wherein the pop-up window provides a control for selecting whether to perform a distortion correction; and
   respond to an instruction in response to receiving an input from the control.

13. The apparatus according to claim 10, wherein the processor is further configured to execute the instructions to cause the apparatus to:
   display a distortion correction control when the face of the target person is distorted; or
   display the distortion correction function menu in response to receiving an input from the distortion correction control.

14. The apparatus according to claim 10, wherein the distortion correction function menu comprises a displacement distance adjustment option; and wherein the processor is further configured to execute the instructions to cause the apparatus to obtain an adjustment direction and a displacement distance based on a control or a slider of the displacement distance adjustment option.

15. The apparatus according to claim 10, wherein the distortion correction function menu comprises an option for adjusting relative positions or relative proportions of facial features; and the processor is further configured to execute the instructions to cause the apparatus to obtain an adjustment direction, a displacement distance, or facial dimensions based on a control or a slider of the option.

16. The apparatus according to claim 10, wherein the distortion correction function menu comprises an angle adjustment option, an expression adjustment option, or an action adjustment option, and wherein the processor is further configured to execute the instructions to cause the apparatus to obtain an adjustment direction and an adjustment angle based on a first control or a first slider of the angle adjustment option, obtain a new expression template based on a second control or a second slider of the expression adjustment option, or obtain a new action template based on a third control or a third slider of the action adjustment option.

17. The apparatus according to claim 10, wherein the processor is further configured to execute the instructions to cause the apparatus to:
   fit the face of the target person in the first image and a standard face model to obtain depth information of the face of the target person; and
   perform perspective distortion correction on the first image based on the depth information and the transformation parameter to obtain the second image.

18. A computer program product comprising computer-executable instructions stored on a non-transitory computer-readable storage medium, wherein the computer-executable instructions when executed by a processor of an apparatus, cause the apparatus to:
   obtain a first image comprising a face of a target person;
   determine a target distance by calculating a screen-to-body ratio of the face of the target person in the first image, wherein the screen-to-body ratio is a ratio of a first pixel area of the face of the target person to a second pixel area of the first image;
   determine that the face of the target person in the first image is distorted;
   display, in response to having determined that the face of the target person is distorted, a distortion correction function menu;
   obtain a transformation parameter from the distortion correction function menu, wherein the transformation parameter comprises at least an equivalent simulation photographing distance simulating a distance between the face of the target person and a camera when a photographing terminal photographs the face of the target person; and
   perform distortion correction on the first image based on the transformation parameter to obtain a second image.

19. The computer-readable storage medium according to claim 18, wherein the distortion correction function menu comprises an option for adjusting an equivalent simulation photographing distance; and
   the obtaining a transformation parameter entered by a user on the distortion correction function menu comprises:
   obtaining the equivalent simulation photographing distance based on a control or a slider in the option for adjusting an equivalent simulation photographing distance.

20. The computer program product according to claim 19, wherein the computer-executable instructions when executed by the processor of the apparatus further causes the apparatus to:

display a pop-up window when the face of the target person is distorted, wherein the pop-up window provides a control for selecting whether to perform distortion correction; and respond to an instruction in response to receiving an input from the control.

* * * * *